(12) United States Patent
Kato

(10) Patent No.: US 9,191,528 B2
(45) Date of Patent: Nov. 17, 2015

(54) INFORMATION PROVIDING APPARATUS, TRANSMISSION SYSTEM, INFORMATION PROVIDING METHOD, AND RECORDING MEDIUM STORING INFORMATION PROVIDING PROGRAM

(75) Inventor: Yoshinaga Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 107 days.

(21) Appl. No.: 13/605,056

(22) Filed: Sep. 6, 2012

(65) Prior Publication Data
US 2013/0070297 A1 Mar. 21, 2013

(30) Foreign Application Priority Data

Sep. 16, 2011 (JP) .................................. 2011-202991
Jul. 6, 2012 (JP) .................................. 2012-152976

(51) Int. Cl.
H04N 1/00 (2006.01)
H04N 1/32 (2006.01)

(52) U.S. Cl.
CPC ......... *H04N 1/00225* (2013.01); *H04N 1/0023* (2013.01); *H04N 1/00217* (2013.01); *H04N 1/32112* (2013.01); *H04N 2201/006* (2013.01); *H04N 2201/0055* (2013.01); *H04N 2201/0074* (2013.01); *H04N 2201/0094* (2013.01); *H04N 2201/3226* (2013.01); *H04N 2201/3254* (2013.01); *H04N 2201/3273* (2013.01); *H04N 2201/3274* (2013.01)

(58) Field of Classification Search
CPC combination set(s) only.
See application file for complete search history.

(56) References Cited

U.S. PATENT DOCUMENTS

| 7,859,694 | B2 * | 12/2010 | Inada | 358/1.15 |
| 2004/0246762 | A1 * | 12/2004 | Inada | 365/145 |
| 2006/0152575 | A1 * | 7/2006 | Amiel et al. | 348/14.01 |
| 2008/0141169 | A1 * | 6/2008 | Sakura et al. | 715/810 |
| 2009/0052348 | A1 | 2/2009 | Kato et al. | |
| 2009/0174762 | A1 * | 7/2009 | Takahashi | 348/14.02 |
| 2010/0182640 | A1 * | 7/2010 | Daigo | 358/1.15 |
| 2010/0323758 | A1 * | 12/2010 | Amano | 455/557 |
| 2012/0069132 | A1 | 3/2012 | Kato | |

FOREIGN PATENT DOCUMENTS

JP 2009-135865 6/2009

* cited by examiner

Primary Examiner — Ashish K Thomas
Assistant Examiner — Keara Harris
(74) Attorney, Agent, or Firm — Oblon, McClelland, Maier & Neustadt, L.L.P.

(57) ABSTRACT

An information providing apparatus sends an image forming instruction to an image forming apparatus to cause the image forming apparatus to form an image to generate image data and transmit the image data to the information providing apparatus, stores the image data received from the image forming apparatus in a memory area of a memory, and stores identification information that uniquely identifies the image data and information indicating the memory area to which the image data is stored in association with each other to generate management information in the memory.

17 Claims, 34 Drawing Sheets

| DATA NO | TERMINAL ID |
|---------|-------------|
| 1 | TRANSMISSION TERMINAL 10aa |
| 2 | TRANSMISSION TERMINAL 10ba |
| 3 | TRANSMISSION TERMINAL 10ca |
| ... | ... |

| USER ID | PASSWORD |
|---------|----------|
| communication | ++++++ |
| triangle | ------ |
| ricoh-100 | ****** |
| ... | ... |

FIG. 10

| NO. | FILE |
|---|---|
| 1 | ¥conference¥doc¥strategy.pdf |
| 2 | ¥conference¥doc¥balance_sheet.pdf |
| 3 | ¥conference¥doc¥competitor_list.pdf |
| ... | ... |

FIG. 11

| AUTHENTICATION ID | PRINTER ID | SCANNER ID |
|---|---|---|
| person 1 | Y | Y |
| person 2 | N | Y |
| ⋮ | ⋮ | ⋮ |

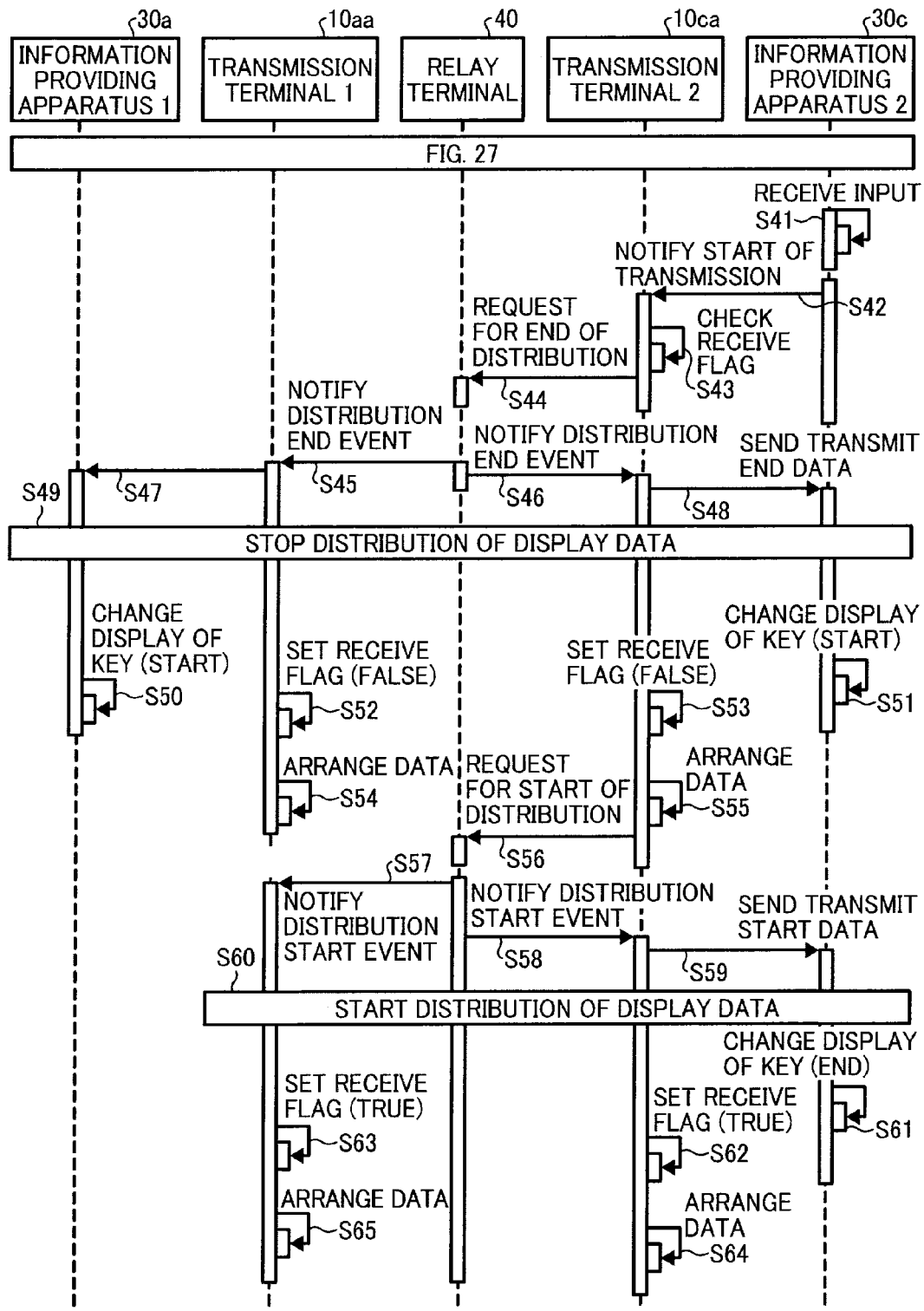

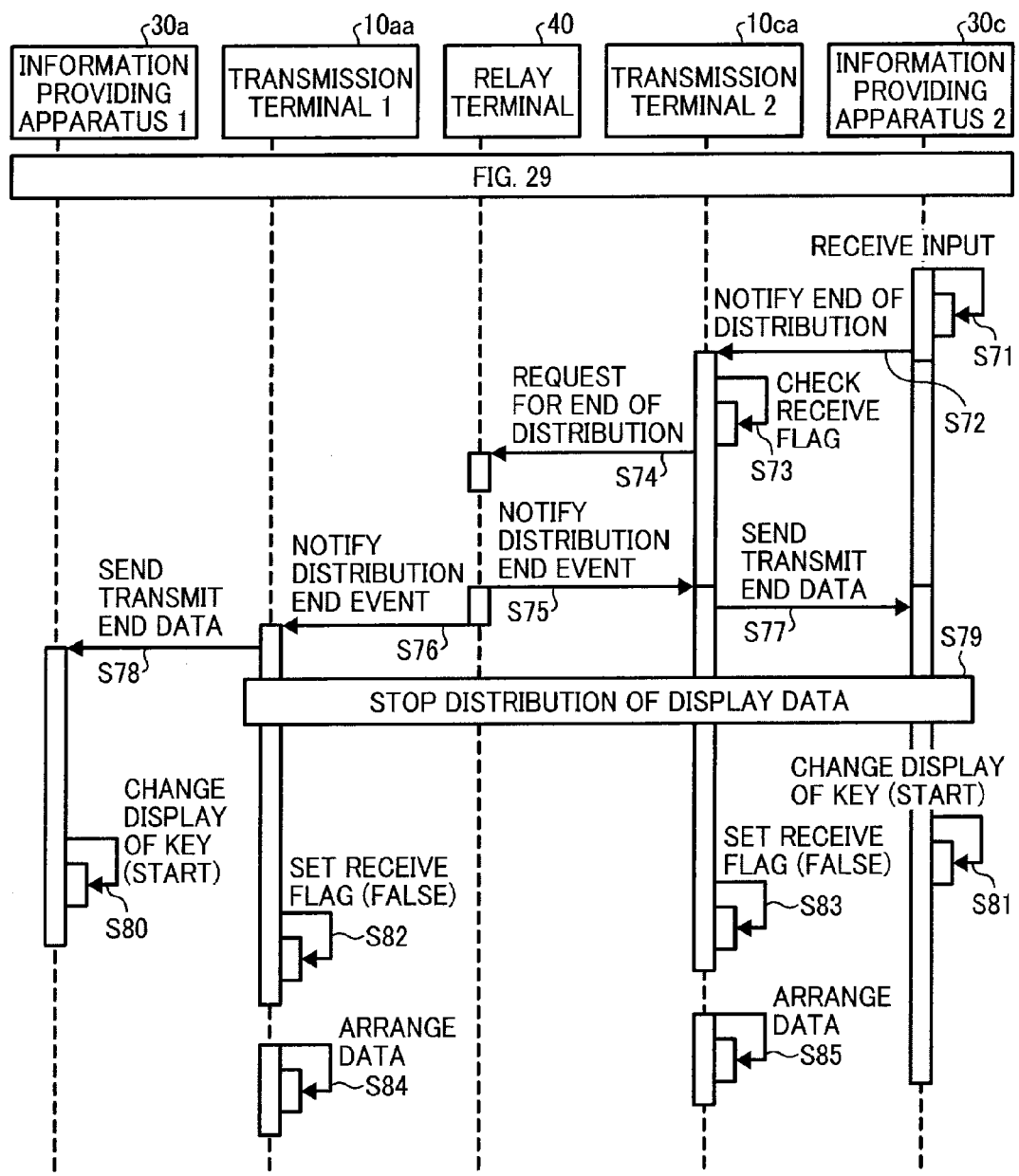

| LOCATION DATA NO. | LOCATION DATA | SHARED FLAG |
|---|---|---|
| 1 | VIEW_MULTI | UNSHARED |
| 2 | SHARED_MULTI | SHARED |

| LOCATION DATA | AREA 1 | AREA 2 | AREA 3 | AREA 4 |
|---|---|---|---|---|
| VIEW_MULTI | IMAGE DATA 1 | IMAGE DATA 2 | ·· | |
| SHARED_MULTI | DISPLAY DATA | IMAGE DATA 1 | IMAGE DATA 2 | ·· |

FIG. 35

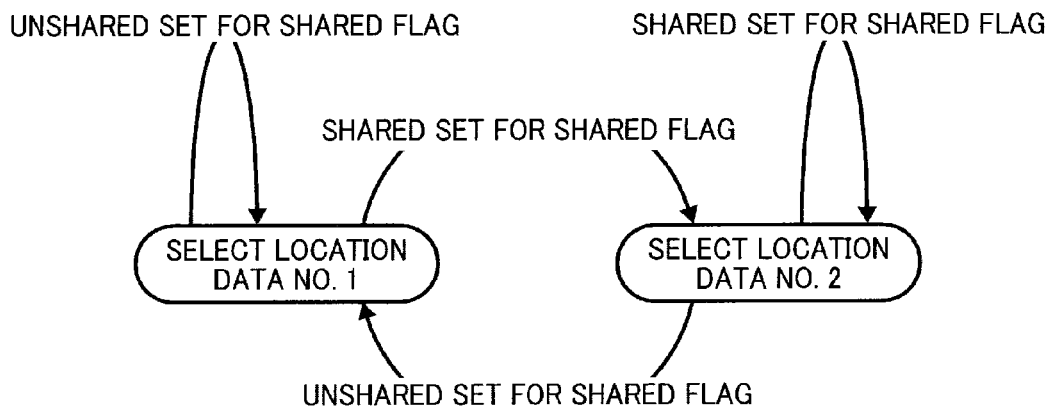

FIG. 36

| EVENT TYPE | SHARED FLAG | DISPLAY CONTROL FLAG |
|---|---|---|
| DISTRIBUTION START EVENT | SHARED | SHARED |
| DISTRIBUTION START FROM ANOTHER EVENT | SHARED | SHARED_ANOTHER |
| DISTRIBUTION END EVENT | UNSHARED | UNSHARED |
| DISTRIBUTION END FROM ANOTHER EVENT | UNSHARED | UNSHARED |

| DISPLAY CONTROL FLAG | | SHARED STATE |
|---|---|---|
| SHARED | | DISPLAY SHARED |
| SHARED_ANOTHER | | OTHER DISPLAY IS SHARED |
| UNSHARED | | DISPLAY NOT SHARED |

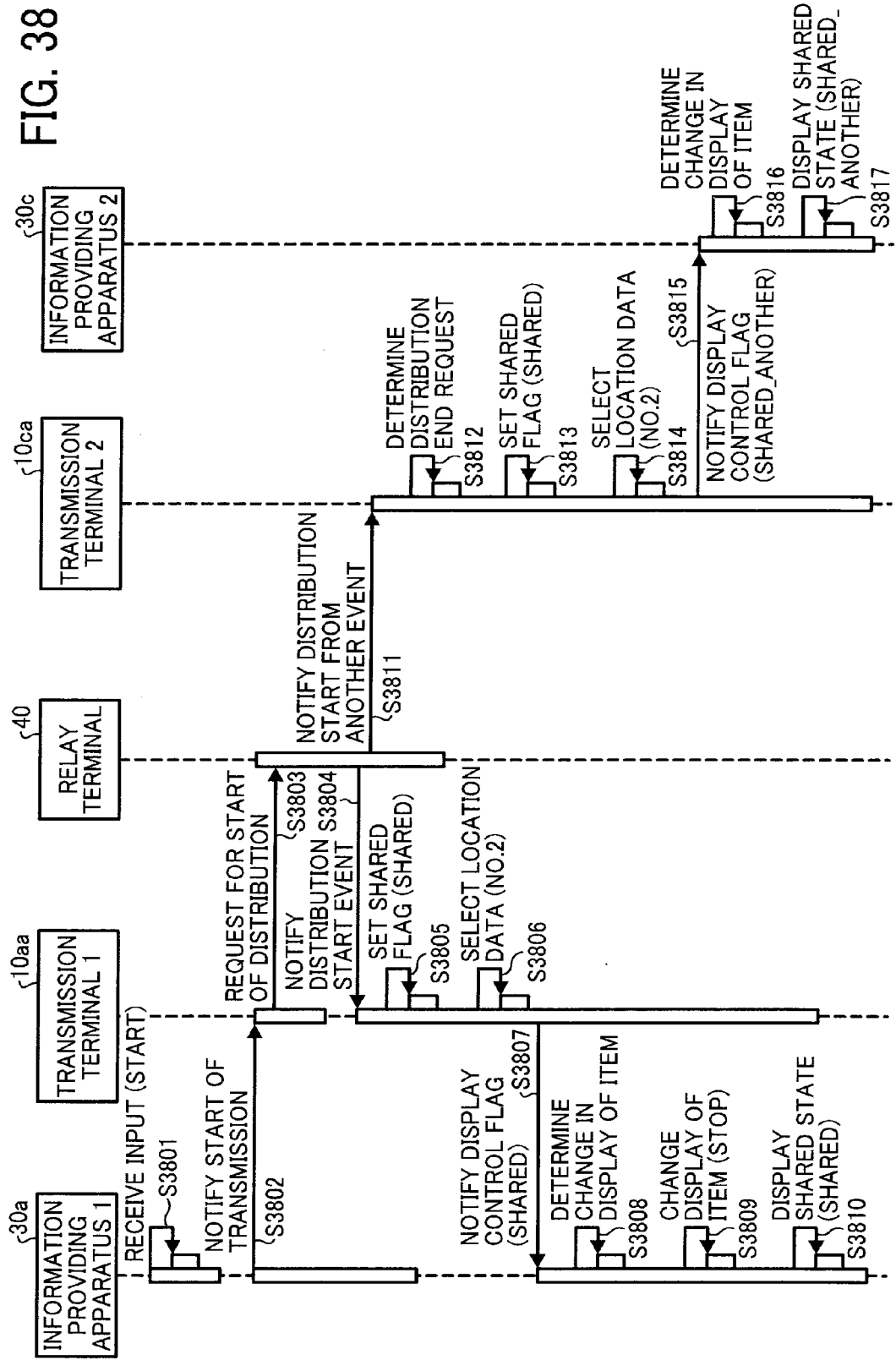

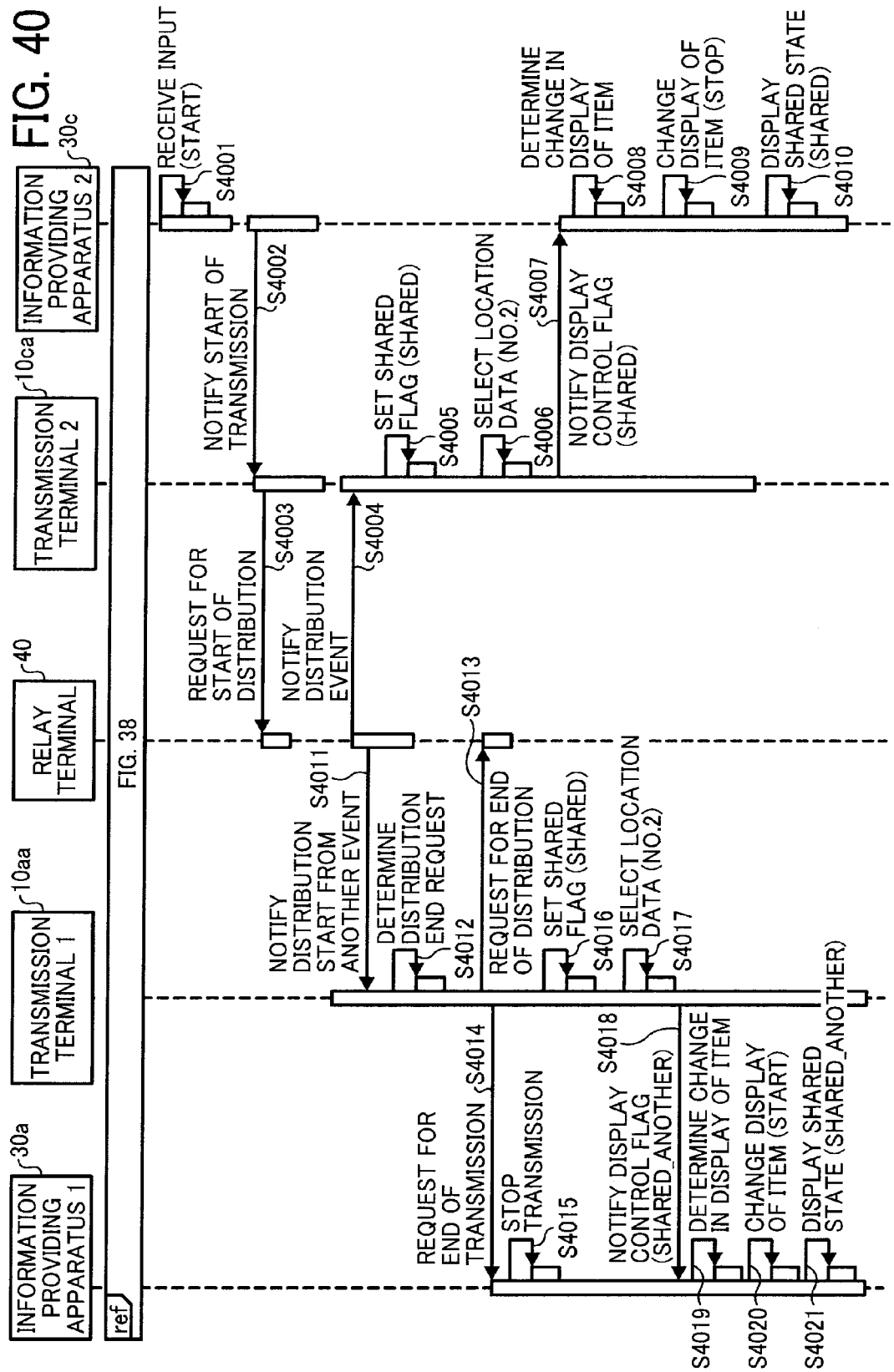

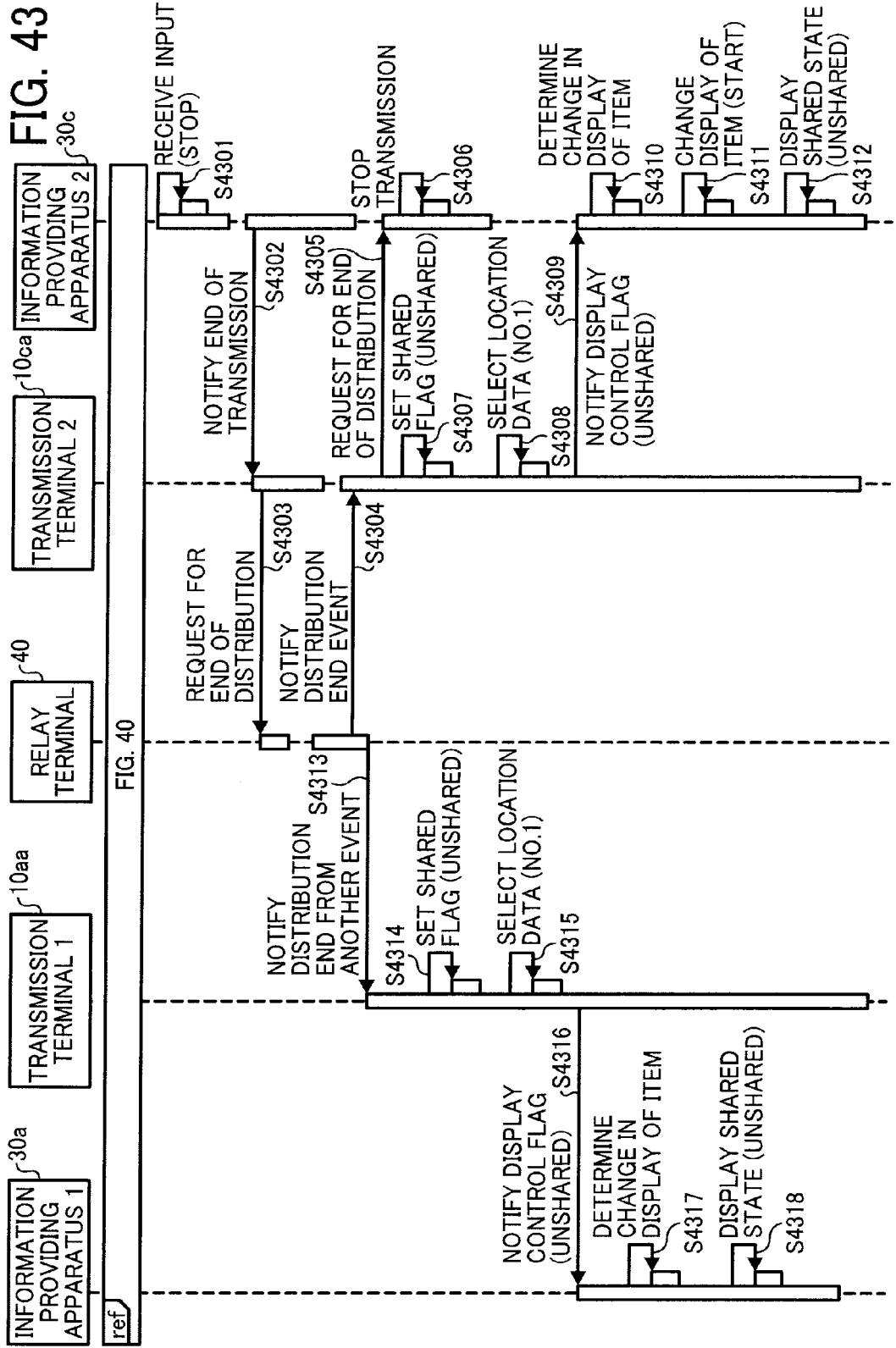

INFORMATION PROVIDING APPARATUS, TRANSMISSION SYSTEM, INFORMATION PROVIDING METHOD, AND RECORDING MEDIUM STORING INFORMATION PROVIDING PROGRAM

CROSS-REFERENCE TO RELATED APPLICATIONS

This patent application is based on and claims priority pursuant to 35 U.S.C. §119 to Japanese Patent Application Nos. 2011-202991, filed on Sep. 16, 2011, and 2012-152976, filed on Jul. 6, 2012, in the Japan Patent Office, the entire disclosure of which is hereby incorporated herein by reference.

BACKGROUND

1. Field

The present invention generally relates to an information providing apparatus, a transmission system including the information providing apparatus, an information providing method, and an information providing program stored in a recording medium.

2. Background

The recent communication system allows transmission of data among a plurality of communication terminals that are remotely located from one another through a relay device to facilitate communication among the plurality of communication terminals through a communication network such as the Internet. The communication system transmits image data that is captured at each terminal using a camera and sound data that is collected at each terminal using a microphone, from one communication terminal to the other communication terminal.

In addition to the image data and the sound data, the communication system may transmit a screen of presentation materials that is displayed at one communication terminal, to the other communication terminal such that data of the screen being displayed at one terminal is shared with the other terminal.

For example, Japanese Patent Application Publication No. 2009-135865, and the corresponding U.S. Patent Application Publication No. 2009/0052348 disclose an image processing apparatus, which can easily establish wireless communication with a mobile terminal such that the mobile terminal transmits data to be shared to the image processing apparatus.

SUMMARY

The inventor of the present invention has discovered that, while the above-described technique allows the user to easily transmit the image data displayed at the mobile terminal to the communication terminal, the user may want to share image data of a paper document with the other users of the communication system. In such case, the user needs to scan the paper document into scanned image data using a network scanner, enter a destination address to which the scanned image data is transmitted such as an address of the mobile terminal, and causes the network scanner to transmit the scanned image data to the mobile terminal. The user needs to further search through a memory of the mobile terminal for the scanned image data, and transmits the scanned image data to the communication terminal. Accordingly, sharing the scanned image data with the other users has been cumbersome, especially when the user realizes that there is a presentation material to be shared with the other users in the middle of videoconference.

In view of the above, one aspect of the present invention is to provide an information providing apparatus, a transmission system, an information providing method, and an information providing program stored in a recording medium, each of which allows the user to easily obtain scanned image data of an original document and distribute the scanned image data to the other users.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is an example data structure of a management table, managed by the transmission terminal of FIG. 5;

FIG. 7 is an example data structure of an authentication table, managed by the transmission terminal of FIG. 5;

FIG. 10 is an example data structure of a file management table, managed by the information providing apparatus of FIG. 5;

FIG. 11 is an example data structure of an authentication table, managed by the image forming apparatus of FIG. 5;

FIG. 29 is a data sequence diagram illustrating operation of switching display data to be transmitted, performed by the transmission system of FIG. 5, according to an example embodiment of the present invention;

FIG. 30 is a data sequence diagram illustrating operation of stopping transmission of display data, performed by the transmission system of FIG. 5, according to an example embodiment of the present invention;

FIG. 34 is an example data structure of association information indicating an association between the location data and layout of image data to be displayed on the screen of FIG. 33;

FIG. 35 is an illustration for explaining the transitional change in state of location data;

FIG. 36 is an example data structure of an event flag table, managed by the terminal of FIG. 31;

FIG. 38 is a data sequence diagram illustrating operation of starting transmission of display data from the information providing apparatus to the terminal, performed by the transmission system of FIG. 31, according to an example embodiment of the present invention;

FIG. 40 is a data sequence diagram illustrating operation of switching display data to be transmitted, performed by the transmission system of FIG. 31, according to an example embodiment of the present invention;

FIG. 43 is a data sequence diagram illustrating operation of stopping transmission of display data, performed by the transmission system of FIG. 31, according to an example embodiment of the present invention.

Figure 1:
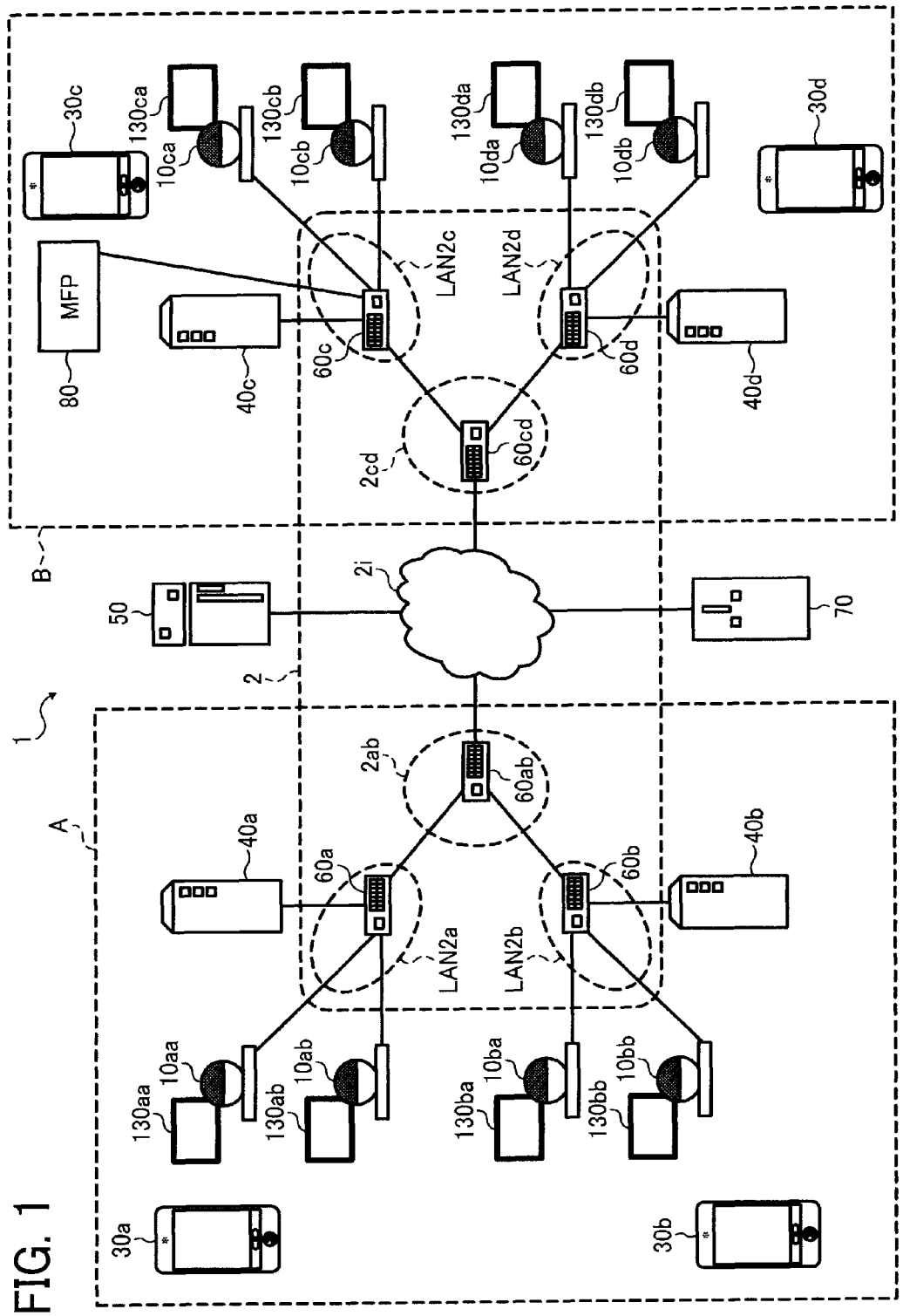
FIG. 1 is a schematic block diagram illustrating a configuration of a transmission system, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIGS. 1 to 30, a transmission system is explained according to an example embodiment of the present invention.

FIG. 1 illustrates a configuration of a transmission system 1 according to an example embodiment of the present invention. The transmission system 1 includes a plurality of transmission terminals, which are remotely located and are connected through a network.

In one example, the transmission system 1 functions as a data providing system that transmits electronic data from one transmission terminal to another transmission terminal in one direction through a transmission management system 50. In another example, the transmission system 1 functions as a two-way communication system that exchanges various information including image data and/or sound data that is used to convey human's feelings between or among two or more of a plurality of transmission terminals 10 each of which functioning as a communication terminal, through the transmission management system 50 that functions as a communication management system. When functioning as the communication system, the transmission system 1 may be implemented as a videoconference system, video teleconference system, voice conference system, voice teleconference system, or personal computer screen sharing system.

In the following examples, it is assumed that the transmission system 1 of FIG. 1 is implemented as the videoconference system, which is one example structure of the communication system. Based on this assumption, the transmission management system 50 is implemented as the videoconference communication management system, which is one example structure of the communication management system. Further, the transmission terminal 10 is implemented as the videoconference communication terminal, which is one example structure of the communication terminal. However, the use of transmission system 1 is not limited to the following examples such that the transmission system 1 may be implemented as the transmission system or the communication system as described above.

The transmission system 1 of FIG. 1 includes a plurality of transmission terminal 10aa, 10ab, 10ba, 10bb, 10ca, 10cb, 10da, and 10db, and a plurality of displays 130aa, 130ab, 130ba, 130bb, 130ca, 130cb, 130da, and 130db, a plurality of information providing apparatuses 30a, 30b, 30c, and 30d, a plurality of relay devices 40a, 40b, 40c, and 40d, an image forming apparatus 80, the transmission management system 50, a plurality of routers 60a, 60b, 60ab, 60c, 60d, and 60cd, and a program providing system 70.

For the descriptive purposes, in this example, any number of the plurality of terminals 10aa to 10db may be collectively or each referred to as the terminal 10. Any number of the plurality of displays 130aa to 130db may be collectively or each referred to as the display 130. Any number of the plurality of information providing apparatuses 30a, 30b, 30c, and 30d may be collectively or each referred to as the information providing apparatus 30. Any number of the plurality of relay devices 40a, 40b, 40c, and 40d may be collectively or each referred to as the relay device 40. Any number of the plurality of routers 60a to 60cd may be collectively or each referred to as the router 60. The transmission management system 50 may be referred to as the "management system" 50.

The transmission terminal 10 transmits or receives conference data such as image data (captured image data or display data) and/or sound data to or from another transmission terminal 10. The information providing apparatus 30 provides conference data such as display data in cooperation with the transmission terminal 10. The image forming apparatus 80 is implemented by a multifunctional peripheral (MFP) such that it may be referred to as the MFP 80.

In this example, the conference data includes any data or information that may be shared among the terminals 10, for example, during videoconference. Examples of the conference data include image data of an object such as a sample product to be displayed to participating users, image data of the participating users such as captured image data, image data of presentation materials that may be distributed to the participating users in the paper form, image data of presentation materials to be displayed through a display of the transmission system 1, and sound data collected by the terminal 10 such as voices of the participating users. As the conference data, any one of image data and sound data is transmitted. In case only the image data is transmitted, sounds such as voices of the user who is speaking may be displayed in text data, such as in the form of subtitle or caption along with the image data of the user. Further, in this example, it is assumed that a moving image is transmitted as the image data. Alternatively, a still image, or both of the still image and the moving image, may be transmitted as the image data.

The information providing apparatus 30 may be implemented by any desired portable device including, for example, a portable phone, a note personal computer (PC), a smart phone, a digital camera, a digital video camera, a game machine, etc. The information providing apparatus 30 communicates with the transmission terminal 10 and the MFP 80 using different types of communication method, and transmits display data to the terminal 10. In this example, the display data is any image data that reflects a screen being displayed on a display of the information providing apparatus 30 including, for example, image data that is selected by the user at the information providing apparatus 30 as conference data to be shared among the terminals 10. For example, the information providing apparatus 30 may be previously installed with application software such as document creation application, spreadsheet application, presentation application, email generating application, or browser application. Using the application available to the information providing apparatus 30, the information providing apparatus 30 displays a screen specifying or showing image data to be shared among the terminals 10 on a display 306 (FIG. 3), for example, as a still image or a moving image. In this example illustrated in FIG. 1, there is only one information providing apparatus 30 for each site, or for each office. Alternatively, any desired number of information providing apparatus 30 may be provided at one site at a time, as the information providing apparatus 30, which is a portable device in this example, moves as the user moves from one site to another. Further, one information providing apparatus 30 may be communicated with any desired terminal 10.

Further, for the descriptive purposes, any image data that is obtained by the terminal 10 is referred to as the image data. Any image data that is provided by the information providing apparatus 30 to the terminal 10 is referred to as the display data. Any one of the image data and the display data may be shared among the terminals 10 as conference data.

The MFP 80 is provided with a plurality of functions including copy function, scanner function, printer function, facsimile transmission/reception function, and data storage function (document box function). Alternatively, the image forming apparatus 80 may be implemented by any other desired image forming apparatus provided with the scanner function such as a scanner apparatus, or the MFP provided with the scanner function and the printer function.

In this example, the user remotely controls the MFP 80 using the information providing apparatus 30 to instruct the MFP 80 to perform specific processing on specific image data. In one example, the user requests the MFP 80 to scan a paper document into scanned image data, and send the scanned image data to the information providing apparatus 30, through the information providing apparatus 30. For example, in order to instruct the MFP 80 through the information providing apparatus 30, the user brings the information providing apparatus 30 into close proximity to the MFP 80 or touches the MFP 80 with the information providing apparatus 30. The information providing apparatus 30 stores the scanned image data, received from the MFP 80, in a predetermined memory area of the information providing apparatus 30. The information providing apparatus 30 registers a file name of the scanned image data and information indicating the predetermined memory area in which the data is stored, in a file management table in a manner that are associated with each other. At any desired time, the user selects the scanned image data from the predetermined memory area as image data to be shared with the other users, and instructs the information providing apparatus 30 to transmit the selected data to the terminal 10. For example, the user brings the information providing apparatus 30 into close proximity to the terminal 10 or touches the terminal 10 with the information providing apparatus 30, and instructs the information providing apparatus 30 to transmit the selected data to the terminal 10 as image data to be shared. The terminal 10 manages the data received from the information providing apparatus 30 as conference data to be shared among a plurality of terminals 10 during videoconference.

The relay device 40 relays communication between or among the terminals 10. For example, during videoconference, the relay device 40 relays conference data to be shared between or among the terminals 10. Further, in this example, when the relay device 40 detects any delay in reception of conference data that is transmitted from one terminal 10 via the relay device 10 at the counterpart terminal 10, the relay device 40 changes resolution of image data to be transmitted, and transmits conference data including the lower-resolution image data to the counterpart terminal 10. As a size of data to be transmitted is reduced, delay in reception of conference data can be suppressed such that conference data, especially, image data is displayed more seamlessly.

The management system 50 centrally manages the terminal 10 and the relay device 40. More specifically, the management system 50 manages various information such as the operation state of the terminal 10 and the operation state of the relay device 40. For example, the management system 50 registers the terminal 10 to the transmission system 1, manages a terminal ID and an IP address of the terminal 10, manages data regarding the charge fee for the terminal 10, sends information regarding candidate counterpart terminals 10 to the terminal 10 before the terminal 10 starts videoconference, keeps update of the operation state of the terminal 10, and sends information regarding the operation state of the terminal 10 to another terminal 10. The operation state of the terminal 10 indicates, for example, whether the terminal 10 is online or offline, the terminal 10 is having videoconference, or the terminal 10 is in the error state.

The router 60 connects a plurality of networks, and selects a route that is most suitable for transmitting conference data such as image data and sound data.

The program providing system 70 includes a hard disk device (HD), which stores a terminal control program that causes the terminal 10 to perform various functions or operations. For example, the program providing system 70 sends the terminal control program to the terminal 10 through the Internet 2i to cause the terminal 10 to install the terminal control program. Further, the HD of the program providing system 70 may store an information providing control program that causes the information providing apparatus 30 to perform various functions or operations such as providing data to the outside apparatus. The program providing system 70 sends the information providing control program to the information providing apparatus 30 through the Internet 2i to cause the information providing apparatus 30 to install the information providing control program. Further, the HD of the program providing system 70 may store a relay control program that causes the relay device 40 to perform various functions or operations. For example, the program providing system 70 sends the relay control program to the relay device 40 through the Internet 2i to cause the relay device 40 to install the relay control program. Further, the BD 204 of the program providing system 70 may store a transmission management program that causes the management system 50 to perform various functions or operations. For example, the program providing system 70 sends the transmission management program to the management system 50 to cause the management system 50 to install the transmission management program.

Still referring to FIG. 1, the terminals 10aa and 10ab, the relay device 40a, and the router 60a are connected to a local area network (LAN) 2a. The terminals 10ba and 10bb, the relay device 40b, and the router 60b are connected to a LAN 2b. The LAN 2a and the LAN 2b are connected to a leased line 2ab in which the router 60ab is provided. It is assumed that these devices including the terminals 10aa to 10bb are located in an area A. For example, assuming that the area is any area in Japan, the LAN 2a could be located within an office in a city such as Tokyo, and the LAN 2b could be located within an office in another city such as Osaka.

The terminals 10ca and 10cb, the MFP 80, the relay terminal 40c, and the router 60c are connected to a LAN 2c. The terminals 10da and 10db, the relay device 40d, and the router 60d are connected to a LAN 2d. The LAN 2c and the LAN 2d are connected to a leased line 2cd in which the router 60cd is provided. It is assumed that these devices including the terminals 10ca to 10db are located in an area B apart from the area A. For example, assuming that the area is any area in the United States, the LAN 2c could be located within an office in a city such as New York, and the LAN 2d could be located within an office in another city such as Washington, D.C. The area A and the area B are connected through the Internet 2i, via the routers 60ab and 60cd.

In FIG. 1, the MFP 80 is located in the area B. Alternatively, the MFP 80 may be located in the area A. As long as the MFP 80 can be communicated with the information providing apparatus 30, the MFP 80 may be provided as a stand-alone machine without being connected to the LAN 2c. In such case, the MFP 80 may be communicated with another device in the system through a wireless network.

The management system 50 and the program providing system 70 are connected through the Internet 2i to the terminal 10 and the relay device 40. Any one of the management system 50 and the program providing system 70 may be located at any location within or outside any one of the area A and the area B.

In this example, the communication network 2 includes the LAN 2a, LAN 2b, leased line 2ab, Internet 2i, leased line 2cd, LAN 2c, and LAN 2d. Any one or any portion of these lines or any other lines that may be included in the communication network 2 may be implemented as wired network or wireless network such as Wireless Fidelity (WiFi) network or Bluetooth network.

Now, hardware structures of the terminal 10, the information providing apparatus 30, and the MFP 80 are respectively described below.

Figure 2:
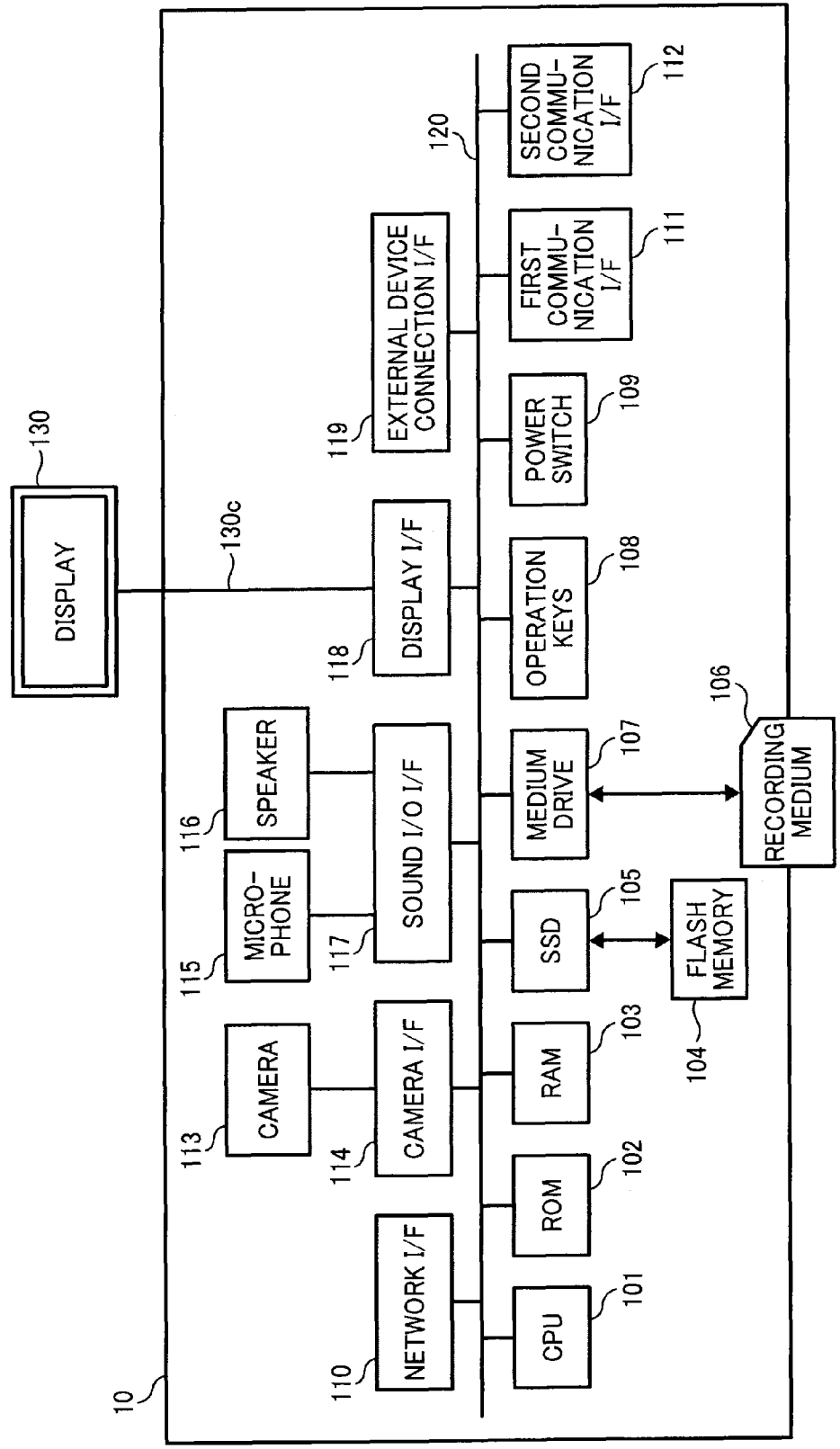
FIG. 2 is a hardware structure of a transmission terminal of the transmission system of FIG. 1, according to an example embodiment of the present invention.

FIG. 2 illustrates an example hardware structure of the terminal 10. As illustrated in FIG. 2, the terminal 10 includes a central processing unit (CPU) 101, a read only memory (ROM) 102, a random access memory (RAM) 103, a flash memory 104, a solid state drive (SSD) 105, a medium drive 107, an operation button (keys) 108, a power switch 109, a network interface (I/F) 110, a first communication interface (I/F) 111, a second communication I/F 112, a camera 113, a camera interface (I/F) 114, a microphone 115, a speaker 116, a sound input/output interface (I/O I/F) 117, a display interface (I/F) 118, and an external device connection interface (I/F) 119, which are electrically connected through a bus 120 such as an address bus or data bus.

The CPU 101 controls entire operation of the terminal 10. The ROM 102 stores therein a control program for execution by the CPU 101, such as an initial program loader (IPL). The RAM 103 functions as a work area of the CPU 101. The flash memory 104 stores therein various data such as the terminal control program, image data, or sound data such as voice data. The SSD 105 controls reading or writing of various data with respect to the flash memory 104 under control of the CPU 101. The medium drive 107 controls reading or writing of various data with respect to a removable recording medium 106 such as a flash memory or a memory card. The operation button 108 allows the user to input a user instruction, for example, by allowing the user to select a communication destination such as the counterpart terminal 10. The power switch 109 allows the user to switch on or off the power of the terminal 10. The network I/F 110 allows the terminal 10 to transmit data through the communication network 2.

The first communication I/F 111 and the second communication I/F 112 each allow the terminal 10 to transmit or receive various data to or from the outside apparatus such as the information providing apparatus 30. The first communication I/F 111 is in compliance with a non-contact IC wireless communication standards such as Near Field Communication (NFC). The second communication I/F 112 is in compliance with the Bluetooth communication standards.

The camera 113 takes an image of an object to obtain image data under control of the CPU 101. The camera I/F 114 controls operation of the camera 113, and transmit or receives image data captured by the camera 113. The camera 113 includes a plurality of devices such as a lens system, and a solid-state image sensing device that photo-electrically converts a light to generate an image of an object. For example, the solid-state image sensing device includes a complementary metal oxide semiconductor (CMOS) or a charge coupled device (CCD). In alternative to incorporating the camera 113 in the terminal 10, the camera 113 may be provided outside of the terminal 10 as an external device that may be connected to the camera I/F 114 through a Universal Serial Bus (USB) cable.

The microphone 115 catches sounds such as voice of the user at the terminal 10 or any sounds that may be collected including noises. The speaker 116 outputs sounds such as sounds generated based on voice of the user at the counterpart terminal 10. The sound I/O I/F 117 controls input or output of sound signals such as voice signals with respect to the microphone 115 and the speaker 116 under control of the CPU 101. In case the microphone 115 and the speaker 116 are provided outside the terminal 10, the microphone 115 and the speaker 116 may be connected to the sound I/O I/F 117 through such as a USB cable.

The display I/F 118 transmits image data to the display 130 under control of the CPU 101. The display 130 is connected to the display I/F 118 through a cable 130c. The cable 130c may be implemented by an analog RGB (VGA) signal cable, a component video cable, a high-definition multimedia interface (HDMI) signal cable, or a digital video interactive (DVI) signal cable. In alternative to connecting the display 130 with the display I/F 118, the terminal 10 may be connected with a projector that projects an image through the display I/F 118.

The external device connection I/F 119 controls connection of the terminal 10 to various types of outside device. The external device connection I/F 119 may be connected to an outside device such as an external camera, external microphone, or external speaker through a universal serial bus (USB) cable that is connected through a port of the terminal 10. When the external camera is connected to the terminal 10, the CPU 101 causes the terminal 10 to capture an image using the external camera, in priority to or in replace of the camera 113 that is incorporated in the terminal 10. When the external microphone or the external speaker is connected to the terminal 10, the CPU 101 causes the terminal 10 to use the external microphone or the external speaker in priority to or in replace of the incorporated microphone 115 or the incorporated speaker 116.

The recording medium 106, which can be freely attached to or detached from the terminal 10, includes any desired type of recording medium. In alternative to the flash memory 104, any nonvolatile memory that is readable and writable under control of the CPU 101 may be used such as Electrically Erasable and Programmable ROM (EEPROM).

The display 130 may be implemented by a liquid crystal display (LCD) or an organic light emitting display, which displays various data such as an image of an object or an operation icon.

The terminal control program may be written onto a recording medium that is readable by a general-purpose computer such as the recording medium 106 in any format that is installable or executable by a general-purpose computer. Once the terminal control program is written onto the recording medium, the recording medium may be distributed. Further, the terminal control program may be stored in any desired memory other than the flash memory 104, such as the ROM 102. Alternatively, the terminal control program may be downloaded from the program providing system 70 through the network I/F 110, and stored in a memory such as the flash memory 104 or the recording medium 106.

Figure 3:
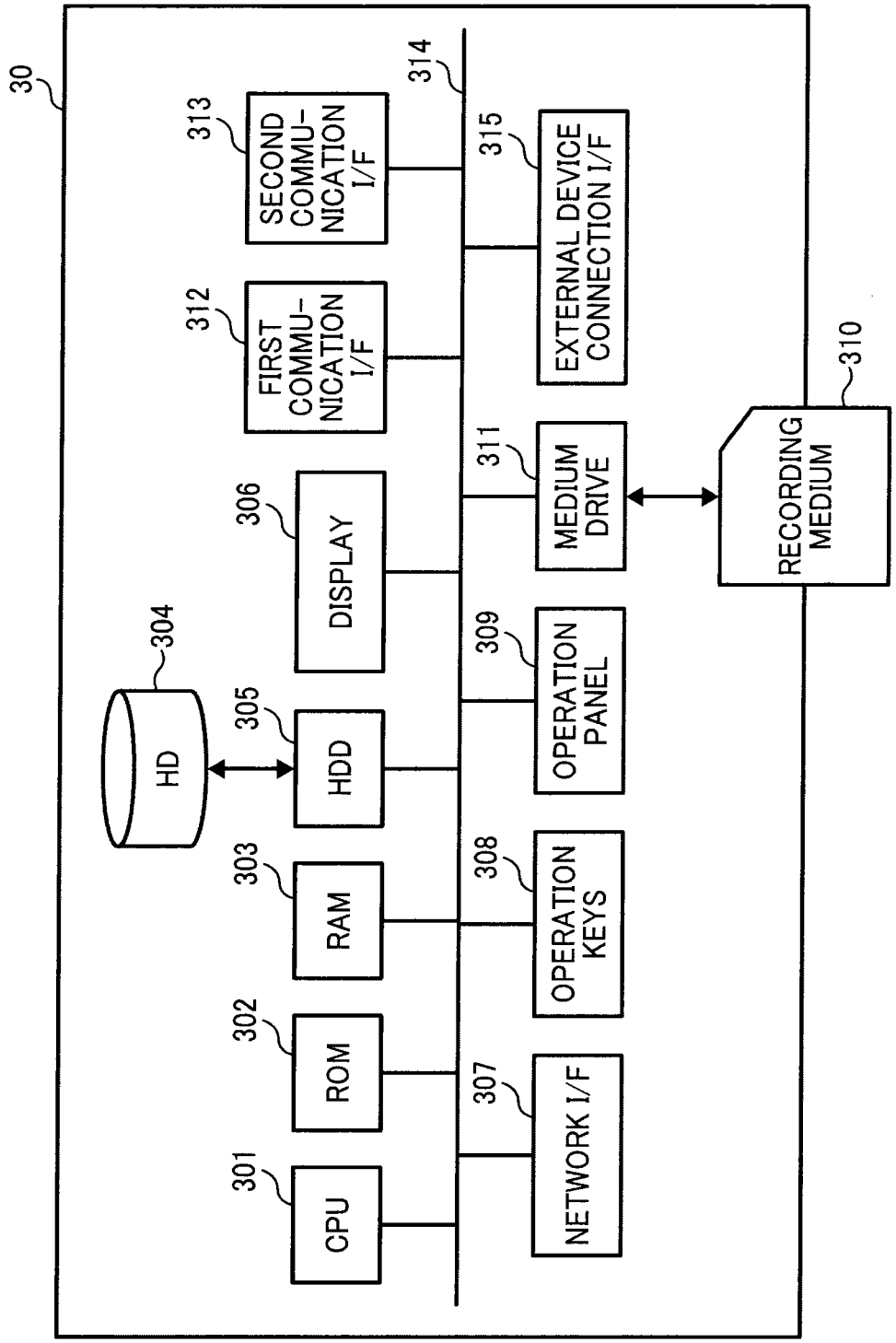
FIG. 3 is a hardware structure of an information providing apparatus of the transmission system of FIG. 1, according to an example embodiment of the present invention.

Referring now to FIG. 3, a hardware structure of the information providing apparatus 30 is explained according to an example embodiment of the present invention. As illustrated in FIG. 3, the information providing apparatus 30 includes a CPU 301, a ROM 302, a RAM 303, a hard disk (HD) 304, a hard disk drive (HDD) 305, a display 306, a network I/F 307, an operation button (keys) 308, an operation panel 309, a medium drive 311, a first communication I/F 312, a second communication I/F 313, and an external device connection I/F 315, which are electrically connected through a bus 314 such as an address bus or a data bus.

The CPU 301 controls entire operation of the information providing apparatus 30. The ROM 302 stores a control program for execution by the CPU 301, such as an IPL. The RAM 303 functions as a work area of the CPU 301. The HD 304 stores therein various data such as the information providing control program. The HDD 305 controls reading or writing of various data with respect to the HD 304 under control of the CPU 301. The display 306, which may be implemented by a LCD or an organic EL, displays various data such as a cursor, menu, window, character, or image. The network I/F 307 allows the information providing apparatus 30 to transmit data through the communication network 2. The operation button 308 allows the user to input a user instruction including, for example, selection or execution of a specific instruction, selection of an area to be processed, and instruction of cursor movement. The operation panel 309 allows the user to input a user instruction including, for example, selection or execution of a specific instruction, selection of an area to be processed, and instruction of cursor movement, through a touch panel. The medium drive 311 controls reading or writing of various data with respect to a recording medium 310, which can be freely attached to or detached from the information providing apparatus 30. The external device connection I/F 315 allows the information providing apparatus 30 to connect with an outside device.

The first communication I/F 312 and the second communication I/F 313 each allow the information providing apparatus 30 to transmit or receive various data to or from the outside apparatus such as the terminal 10. The first communication I/F 312 is in compliance with the non-contact IC wireless communication standards such as NFC. The second communication I/F 313 is incompliance with the Bluetooth communication standards.

The external device connection I/F 315 allows the information providing apparatus 30 to connect with various types of outside device through such as a USB cable. In this example, it is assumed that the information providing apparatus 30 communicates with the terminal 10 through the first communication I/F 312 or the second communication I/F 313. Alternatively, the information providing apparatus 30 may communicate with the terminal 10 via the external device connection I/F 315 through the USB cable.

The information providing control program may be written onto a recording medium that is readable by a general-purpose computer such as the recording medium 310 in any format that is installable or executable by a general-purpose computer. Once the information providing control program is written onto the recording medium, the recording medium may be distributed. Further, the information providing control program may be stored in any desired memory other than the HD 304, such as the ROM 302. Alternatively, the information providing control program may be downloaded from the program providing system 70 through the network I/F 307, and stored in a memory such as the HD 304 or the recording medium 310.

The relay device 40, the management system 50, and the program providing system 70 are each implemented by a general-purpose computer functioning as a server, which includes a processor, a memory, and a network interface.

More specifically, the relay device 40 is installed with the relay device control program that is used for controlling the relay device 40. The relay device control program may be written onto any desired memory or recording medium that is readable by a general-purpose computer in any format that is installable or executable by the general-purpose computer. Once the relay device control program is written onto the recording medium, the recording medium may be distributed.

The management system 50 is installed with the management program that is used for controlling the management system 50. The management program may be written onto any desired memory or recording medium that is readable by a general-purpose computer in any format that is installable or executable by the general-purpose computer. Once the management program is written onto the recording medium, the recording medium may be distributed.

The program providing system 70 is installed with the program providing program that is used for controlling the program providing system 90. The program providing program may be written onto any desired memory or recording medium that is readable by a general-purpose computer in any format that is installable or executable by the general-purpose computer. Once the program providing program is written onto the recording medium, the recording medium may be distributed.

Figure 4:
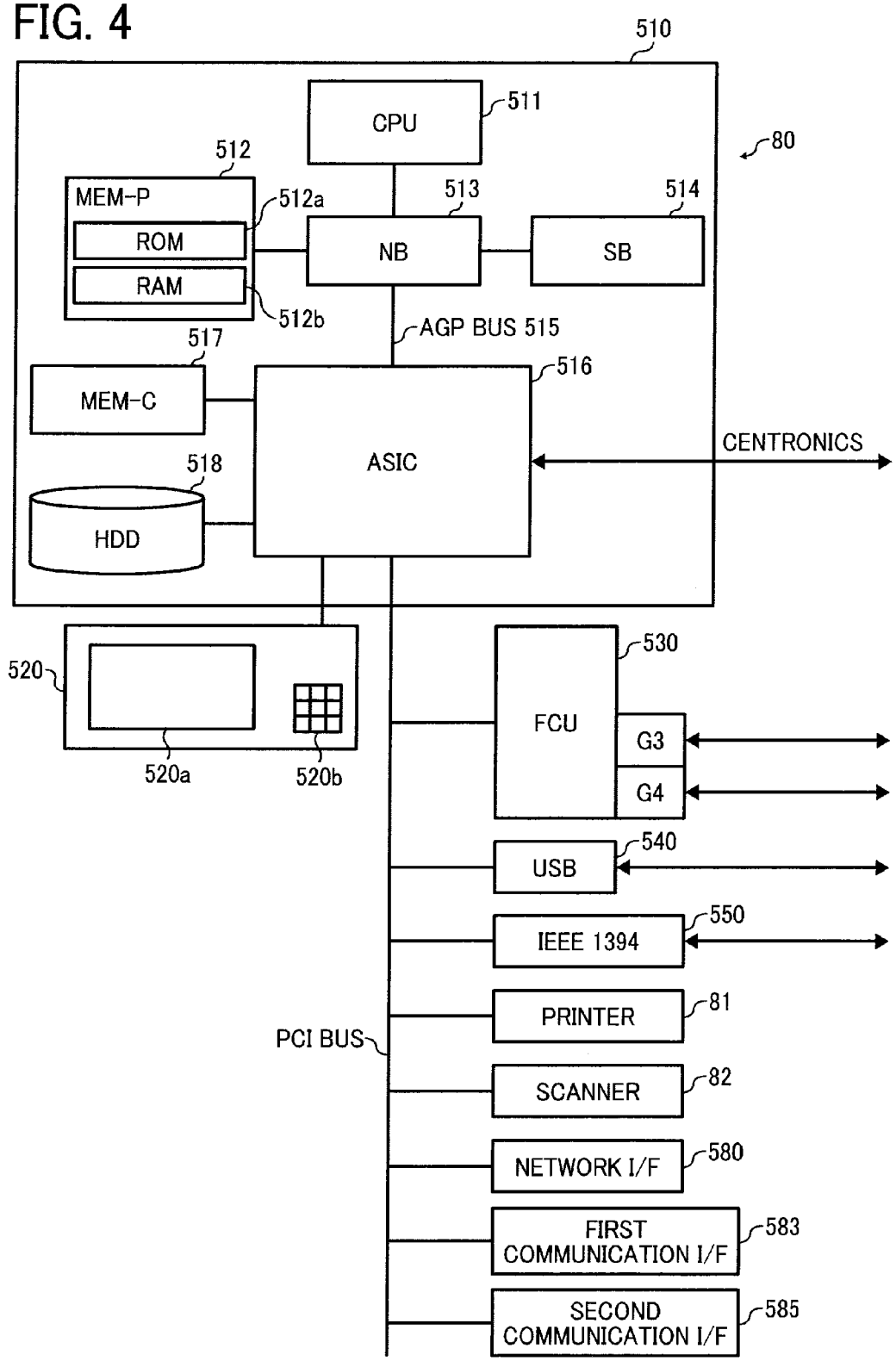
FIG. 4 is a hardware structure of an image forming apparatus of the transmission system of FIG. 1, according to an example embodiment of the present invention.

Referring now to FIG. 4, a hardware structure of the MFP 80 is explained according to an example embodiment of the present invention. As illustrated in FIG. 4, the MFP 80 includes a controller 510, a printer 81, and a scanner 82, which are connected through a Peripheral Component Interconnect (PCI) bus. The controller 510 controls entire operation of the MFP 80 including drawing, communicating, or receiving an instruction through an operation panel 520. The printer 81 and the scanner 82 are each provided with an image processing circuit such as an image processing circuit that performs error diffusion for binarization, and an image processing circuit that performs gamma conversion for tone correction. The operation panel 520 includes a display 520a and an input device 520b. The display 520a, which may be implemented by a LCD, displays various data such as scanned image data obtained by the scanner 82, and receives a user instruction through a touch panel screen. The input device 520b, which may be implemented by a plurality of keys, receives a user instruction.

According to a user instruction that selects specific application, which is input through the input device 520b, the MFP 80 selects one of the plurality of functions including the data storage function (document box function), the copy function, the printer function, the scanner function, and the facsimile transmission/reception function. More specifically, when the user selects the data storage function, the MFP 80 changes its mode to a data storage mode. When the user selects the copy function, the MFP 80 changes its mode to a copy mode. When the user selects the printer function, the MFP 80 changes its mode to a printer mode. When the user selects the scanner function, the MFP 80 changes its mode to a scanner mode. When the user selects the facsimile function, the MFP 80 changes its mode to a facsimile mode.

The controller 510 includes a CPU 511, a system memory (MEM-P) 512, a north bridge (NB) 513, a south bridge (SB) 514, an Application Specific Integrated Circuit (ASIC) 516, a local memory (MEM-C) 517, and a hard disk drive (HDD) 518. The NB 513 and the ASIC 516 are connected through an Accelerated Graphics Port (AGP) bus 515. The MEM-P 512 includes a read only memory (ROM) 512a and a random access memory (RAM) 512b.

The CPU 511 controls entire operation of the MFP 80, and is connected with the other devices through a chip set including the NB 513, the MEM-P 512, and the SB 514.

The NB 513 is a bridge that connects the CPU 511 with the MEM-P 512, SB 514, and AGP bus 515. The NB 513 includes a memory controller that controls reading or writing of data with respect to the MEM-P 512, a PCI master, and an AGP target.

The MEM-P 512 is a system memory that functions as a data storage memory for storing programs or data, a data deployment memory for deploying programs or data, or a drawing memory for print processing. The ROM 512a is a read only memory for storing control programs that control operation of the CPU 511 or data. The RAM 512b is a readable and writable memory, which functions as a data deployment memory for deploying programs or data, or a drawing memory for print processing.

The SB 514 is a bridge that connects the NB 513 with a PCI device or peripheral device. The SB 514 is connected with the NB 513 through the PCI bus, to which a network I/F 580 is connected.

The ASIC 516 is an integrated circuit (IC) specially designed for image processing such that the ASIC 516 includes an image processing circuit. The ASIC 516 functions as a bridge that connects the AGP bus 515, PCI bus, HDD 518, and MEM-C 517. The ASIC 516 includes a PCI target, an AGP master, an arbiter (ARB), a memory controller that controls the MEM-C 517, a plurality of direct memory access controllers (DMACs) that performs image rotation using such as a hardware logic, and a PCI unit that transfers data with the printer 81 and the scanner 82 though the PCI bus. As illustrated in FIG. 4, the ASIC 516 is connected with a facsimile control unit (FCU) 530, a universal serial bus (USB) 540, the Institute of Electrical and Electronics Engineers (IEEE) 1394 interface 550, a first communication I/F 583, and a second communication I/F 585, through the PCI bus. The first communication I/F 583 is a communication interface that is in compliance with the NFC communication standards. The second communication I/F 585 is a communication interface that is in compliance with the Bluetooth communication standards.

The MEM-C 517 is a local memory that may be used as a copy image buffer or an encoding buffer. The HDD 518 functions as a storage, which stores therein various data, various control programs for execution by the CPU 511, font data, and form data.

The AGP bus 515 is a bus interface designed for graphics accelerator card, for example, to improve the processing speeds. By directly accessing the MEM-P 512 by high throughput, processing with the graphic accelerator card can be performed with increased speeds.

Figure 5:
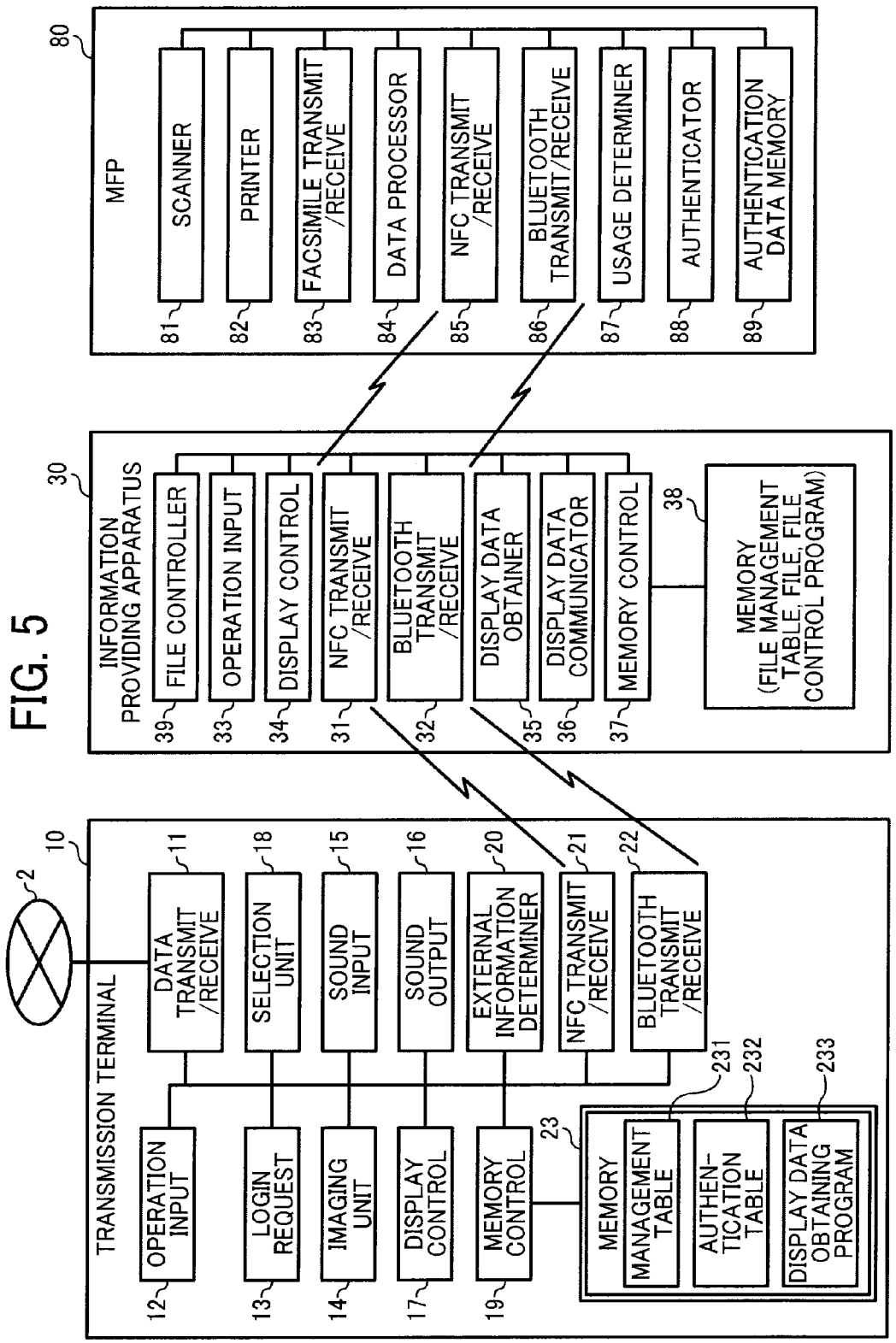
FIG. 5 is a functional structure of the transmission terminal, the information providing apparatus, and the image forming apparatus of the transmission system of FIG. 1, according to an example embodiment of the present invention.

Next, referring to FIG. 5, functional structures of the terminal 10, information providing apparatus 30, and MFP 80 are explained according to an example embodiment of the present invention.

As illustrated in FIG. 5, the terminal 10 includes a data transmit/receive 11, an operation input 12, a login request 13, an imaging unit 14, a sound input 15, a sound output 16, a display control 17, a selection unit 18, a memory control 19, an external information determiner 20, a NFC transmit/receive 21, and a Bluetooth transmit/receive 22. These units shown in FIG. 5 correspond to a plurality of functions or functional modules, which are executed according to an instruction of the CPU 101 (FIG. 2) that is generated according to the terminal control program being loaded from the flash memory 104 onto the RAM 103. The terminal 10 further includes a memory 23, which may be implemented by the SSD 105 of FIG. 2.

The data transmit/receive 11, which may be implemented by the network I/F 110 (FIG. 2) under control of the CPU 101, transmits or receives various data or information to or from another terminal, device, or system, through the communication network 2. When communication is established with counterpart terminal 10 through the relay device 40, the data transmit/receive 11 registers the terminal ID of the counterpart terminal 10 in a management table 231 stored in the memory 23, and manages the terminal ID of the counterpart terminal 10. The terminal ID of the terminal 10 may be any identification information that uniquely identifies each terminal such as a host name or an IP address uniquely assigned to the terminal 10.

The operation input 12 receives a user instruction input by the user through the operation button 108 or the power switch 109 (FIG. 2), under control of the instructions received from the CPU 101. For example, when the user selects a counterpart terminal 10 using a selection screen being displayed on the display 130 and confirms this selection, the operation input 12 receives the terminal ID or the IP address of the selected terminal 10 as the counterpart terminal 10. In another example, the user may input an instruction for changing the layout of a screen such as the change in arrangement of an image being displayed on the screen or the change in size of the image being displayed on the screen, using the operation button 180. When the operation button 180 is selected, the operation input 12 receives the user instruction for changing the layout of the screen.

The operations or functions of the login request 13 are performed according to an instruction received from the CPU 101 (FIG. 2). For example, when the power of the terminal 10 is turned on, the login request 13 automatically causes the data transmit/receive 11 to send login request information that requests the login process, and a current IP address of the terminal 10, to the management system 50 through the communication network 2. The login request information includes at least the terminal ID of the terminal 10. The management system 50 manages the login request information including the terminal ID and the IP address, which are received from the terminal 10.

The operations or functions of the imaging unit 14 of the terminal 10 are performed by the camera 113 and the camera I/F 114 according to an instruction received from the CPU 101 (FIG. 2). The imaging unit 14 takes an image of an object to output image data of the object. For example, the object may be one or more users in a conference room.

The operations or functions of the sound input 15 of the terminal 10 are performed by the sound I/O I/F 117 according to an instruction received from the CPU 101, in cooperation with the microphone 115. After the microphone 115 converts sounds such as voice of the user at the terminal 10 to a voice signal, the sound input 15 inputs the sound signal in the form of sound data for further processing. The operations or functions of the sound output 16 of the terminal 10 are performed by the sound I/O I/F 117 according to an instruction received from the CPU 101, in cooperation with the speaker 116. The sound output 16 outputs a sound signal of sound data that is received from the counterpart terminal 10 through the speaker 115.

The operations or functions of the display control 17 of the terminal 10 of FIG. 5 are performed by the display I/F 118 (FIG. 2) according to an instruction received from the CPU 101. The display control 17 controls transmit of image data such as display data to the display 130.

The operations or functions of the selection unit 18 may be performed according to an instruction received from the CPU 101 (FIG. 2) in cooperation with the network I/F 110. The selection unit 18 selects one of the relay devices 40 that is suitable for communication to start videoconference. More specifically, the selection unit 18 obtains date and time information indicating the date and time at which the data transmit/receive 11 of the terminal 10 receives preparatory transmit information when the preparatory transmit information is transmitted from the counterpart terminal 10 through each one of the candidate relay devices 40. The selection unit 18 calculates a time period between the time when the preparatory transmit information is transmitted by the counterpart terminal 10 and the time when the preparatory transmit information is received at the terminal 10, based on the difference between the time and date information included in the preparatory transmit information and the time and date obtained by the selection unit 18. The selection unit 18 selects one of the candidate relay devices 40 having the minimum value of the calculated time period. Alternatively, for each one of the candidate relay devices 40, the selection unit 18 may calculate a time period between the time when the terminal 10 transmits preparatory transmit information to the relay device 40 and the time when the terminal 10 receives a response (ACK) to the preparatory transmit information from the relay device 40. The selection unit 18 selects one of the candidate relay devices 40 having the minimum value of the calculated time period. The time period may be calculated in milliseconds.

The memory control 19 is implemented by the SSD 105 of FIG. 2 according to an instruction received from the CPU 101. The memory control 19 stores various data in the memory 23, or reads out various data from the memory 23.

The memory 23 stores the management table 231 (FIG. 6) that manages terminal IDs of counterpart terminals 10, and an authentication table 232 (FIG. 7) that stores authentication information (a user ID and a password) to be used for authenticating the information providing apparatus 30. The memory 23 further stores therein display data obtaining program 233 and a driver used for data transmission or reception. When the memory 23 is mounted, the CPU 301 (FIG. 3) executes operation according to the display data obtaining program 233 to interact with the outside apparatus to obtain display data. More specifically, the display data obtaining program 233 of the terminal 10 causes the information providing apparatus 30 to additionally have a display data obtainer 35, which obtains and transmits display data to the terminal 10.

FIG. 6 illustrates an example data structure of the management table 231 stored in the memory 23. The management table 231 stores, for each one of counterpart terminals 10, a data number and a terminal ID in association with each other. In this example, the terminal ID of the counterpart terminal 10, such as the terminal IDs of the terminals 10aa, 10ba, and 10ca are stored in association with the data numbers 1, 2, and 3. The data number may be used to manage the terminal ID of each terminal 10. The data number may be further used to specify an area of a screen that displays image data transmitted from the counterpart terminal 10 having the terminal ID.

FIG. 7 illustrates an example data structure of the authentication table 232 stored in the memory 23. The authentication table 232 stores a user ID and a password for each one of the users who are authorized to use the information providing apparatus 30. Since the information providing apparatus 30 is a portable device, it is assumed that each information providing apparatus 30 is assigned with a pair of user ID and password of the user who is authorized to use the information providing apparatus 30.

Referring back to FIG. 5, the external information determiner 20, which may be implemented by the CPU 101 (FIG. 2), determines whether transmission or reception of data with respect to the outside apparatus such as the information providing apparatus 30 is detected. In this example, it is assumed that the terminal 10 communicates with the information providing apparatus 30.

The NFC transmit/receive 21, which may be implemented by the first communication I/F 111 (FIG. 2) under control of the CPU 101, communicates data with a NFC data transmit/receive 31 of the information providing apparatus 30 in compliance with the NFC communication standards.

The NFC data transmit/receive 21 is capable of transmitting or receiving data to or from the information providing apparatus 30 within a distance that is shorter than a distance that can be communicated by the Bluetooth data transmit/receive 22, for example, within a distance of about 10 cm or less. Further, the data transfer rate of the NFC data transmit/receive 21 in compliance with the NFC communication standards is 424 kbps at maximum, compared to the maximum data transfer rate of 24 Mbps that can be achieved by the Bluetooth data transmit/receive 22 based on the Bluetooth communication standards. Since the data transfer rate of the NFC transmit/receive 21 is less than that of the Bluetooth transmit/receive 22, the NFC transmit/receive 21 is mainly used to communicate data with a smaller data size.

In alternative to using the NFC communication standards, any other communication standards that allow the terminal 10 to communicate with the outside apparatus within a communication range that is narrower than that of the Bluetooth communication may be used.

When the NFC transmit/receive 21 detects that the information providing apparatus 30 is at a location within the communication range of the NFC transmit/receive 21, the NFC transmit/receive 21 communicates with a NFC transmit/receive 31 of the information providing apparatus 30 based on the NFC communication standards. The NFC transmit/receive 21 further receives authentication information of the information providing apparatus 30 from the NFC transmit/receive 31. When authentication of the information providing apparatus 30 is successful, the NFC transmit/receive 21 transmits connection settings information to the NFC data transmit/receive 31. The connection settings information, which is required for establishing the Bluetooth communication, includes a Bluetooth Device (BD) address or a path phrase that is assigned to the second communication I/F 112. The connection settings information may be stored in the NFC transmit/receive 21. Alternatively, the NFC transmit/receive 21 may read out the connection settings information from the second communication I/F 112.

The Bluetooth transmit/receive 22, which may be implemented by the second communication I/F 112 (FIG. 2) under control of the CPU 101, communicates with a Bluetooth data transmit/receive 32 of the information providing apparatus 30 in compliance with the Bluetooth communication standards. As described above, the Bluetooth transmit/receive 22 is capable of transmitting or receiving data to or from the outside apparatus within a distance of about 10 to 100 m, which is wider than that of the NFC data transmit/receive 21. Further, the data transfer rate of the Bluetooth data transmit/receive 22 is about 24 Mbps at maximum, which is faster than that of the NFC data transmit/receive 21.

The Bluetooth transmit/receive 22 establishes the Bluetooth communication with the information providing apparatus 30, using the connection settings information that is sent by the NFC transmit/receive 21 to the information providing apparatus 30.

In alternative to using the Bluetooth communication standards, any other communication standards that allow the terminal 10 to communicate with the outside apparatus within a communication range that is wider than that of the NFC communication may be used. For example, a communication I/F in compliance with the Wireless Fidelity (WiFi) standards such as the IEEE802.11a/IEEE802.11b may be used. In such case, in replace of the Bluetooth transmit/receive 22, a WiFi transmit/receive is provided in the terminal 10, which includes a network board that transmits or receives data based on the IEEE802.11a/b/g/n standards, and a communication controller that controls establishment of the IEEE802.11a/b/g/n wireless communication or data transmission or reception.

In another example, a communication I/F in compliance with the wireless USB standards may be used. If a distance between the apparatuses is equal to or less than 3 m based on the Ultra Wide Band (UWB) communication protocol, the wireless USB communication may be used, which is capable of transferring data in 480 Mbps, which is substantially the same transfer rate of the wired USB 2.0 communication. In such case, in replace of the Bluetooth transmit/receive 22, a wireless USB transmit/receive is provided in the terminal 10, which includes a UWB device that transmits or receives data in compliance with the wireless USB standards, and a communication controller that controls establishment of USB wireless communication or data transmission or reception.

Still referring to FIG. 5, the information providing apparatus 30 includes the NFC transmit/receive 31, the Bluetooth transmit/receive 32, an operation input 33, a display control 34, the display data obtainer 35, a display data communicator 36, a memory control 37, and a file controller 39. These units shown in FIG. 5 correspond to a plurality of functions or functional modules, which are executed according to an instruction of the CPU 301 (FIG. 3) that is generated according to the information providing control program being loaded from a memory such as the ROM 302 onto the RAM 303. The information providing apparatus 30 further includes a memory 38, which may be implemented by the HDD 305 of FIG. 3.

The NFC transmit/receive 31, which may be implemented by the first communication I/F 312 (FIG. 3) under control of the CPU 301, communicates with the NFC transmit/receive 21 of the terminal 10 or a NFC transmit/receive 85 of the MFP 80 using the non-contact IC NFC communication standards.

When the NFC transmit/receive 31 detects that the information providing apparatus 30 is moved to a location close to a communication range of the NFC transmit/receive 21 of the terminal 10, the NFC transmit/receive 31 establishes the NFC communication with the NFC transmit/receive 21 of the terminal 10 to start transmission or reception of various data with the terminal 10. More specifically, when the NFC communication is established with the NFC transmit/receive 21 of the terminal 10, the NFC transmit/receive 31 transmits the authentication information of the information providing apparatus 30 to the terminal 10, and receives connection settings information required for the Bluetooth communication from the terminal 10. In this example, the authentication information to be transmitted is previously entered by the user at the information providing apparatus 30. Based on the authentication information, the terminal 10 determines whether the user at the information providing apparatus 30 is authenticated.

When the NFC transmit/receive 31 detects that the information providing apparatus 30 is moved to a location close to a communication range of a NFC transmit/receive 85 of the MFP 80, the NFC transmit/receive 31 establishes the NFC communication with the NFC transmit/receive 85 of the MFP 80 to start transmission or reception of various data with the MFP 80. More specifically, when the NFC communication is established with the NFC transmit/receive 85 of the MFP 80, the NFC transmit/receive 31 transmits authentication information such as an authentication ID, a function ID, function settings information, and communication settings information that is required for establishing the Bluetooth communication, to the NFC transmit/receive 85 MFP 80.

The Bluetooth transmit/receive 32, which may be implemented by the second communication I/F 313 (FIG. 3) under control of the CPU 301, communicates with the Bluetooth transmit/receive 22 of the terminal 10 or a Bluetooth transmit/receive 86 of the MFP 80 using the Bluetooth communication standards. When the communication with the Bluetooth transmit/receive 22 of the terminal 10 is established, the Bluetooth transmit/receive 32 of the information providing apparatus 30 transmits display data obtained by the display data obtainer 35 to the terminal 10. The Bluetooth transmit/receive 32 further receives information regarding sharing of the display data from the Blue transmit/receive 22 of the terminal 10. When the Bluetooth communication is established with the Bluetooth transmit/receive 86 of the MFP 80, the transmit/receive 32 receives image data, such as the scanned image data, from the MFP 80.

Figure 8:
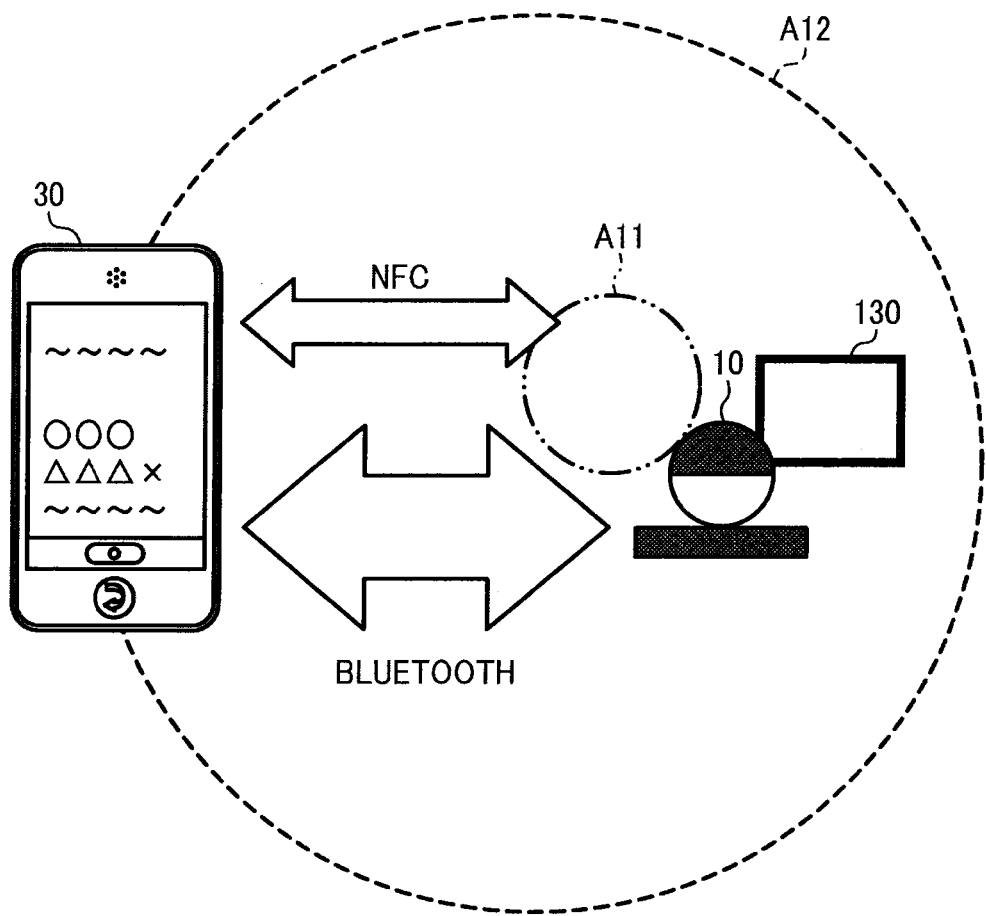
FIG. 8 is an illustration for explaining a communication range of two types of communication established between the transmission terminal and the information providing apparatus.
Figure 9:
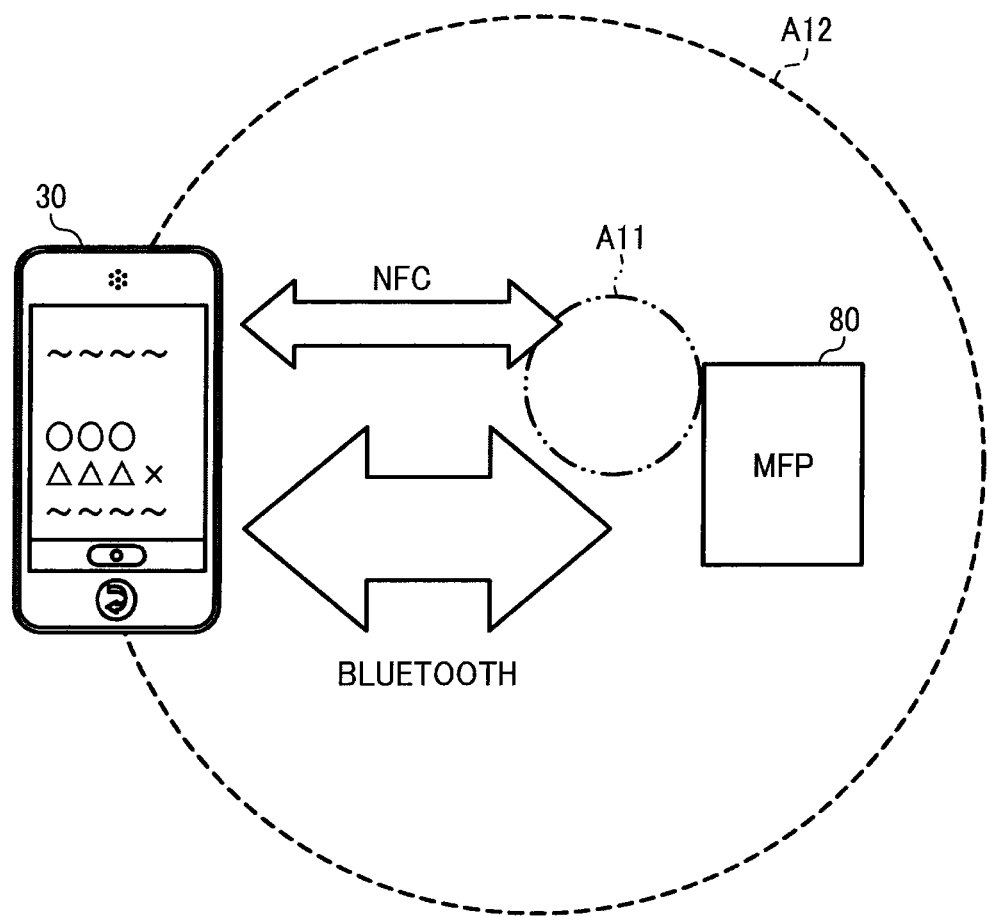
FIG. 9 is an illustration for explaining a communication range of two types of communication established between the image forming apparatus and the information providing apparatus.

FIG. 8 is an illustration for explaining a communication range of two types of wireless communication, which may be established between the terminal 10 and the information providing apparatus 30. FIG. 9 is an illustration for explaining a communication range of two types of wireless communication, which may be established between the information providing apparatus 30 and the MFP 80.

Referring to FIGS. 8 and 9, a communication range A11 indicated by the two-dashed line is a communication range of the NFC communication, which may be established between the NFC transmit/receive 21 and the NFC transmit/receive 31, or between the NFC transmit/receive 31 and the NFC transmit/receive 85. A communication range A12 indicated by the dashed line is a communication range of the Bluetooth communication, which may be established between the Bluetooth transmit/receive 22 and the Bluetooth transmit/receive 32, or between the Bluetooth transmit/receive 32 and the Bluetooth transmit/receive 86. As illustrated in FIGS. 8 and 9, the communication range A12 of the Bluetooth communication is wider than the communication range A11 of the NFC communication.

When each of the NFC transmit/receive 21 and the NFC transmit/receive 31, or each of the NFC transmit/receive 31 and the NFC transmit/receive 85 determines that it is in the communication range A11, the NFC communication is automatically established to start transmission or reception of various data such as authentication information or connection settings information. When the terminal 10 authenticates the information providing apparatus 30 based on authentication information received from the information processing apparatus 30, the Bluetooth communicating is established between the Bluetooth transmit/receive 22 and the Bluetooth transmit/receive 32. When the MFP 80 authenticates the information providing apparatus 30 based on authentication information received from the information processing apparatus 30, the Bluetooth communication is established between the Bluetooth transmit/receive 32 and the Bluetooth transmit/receive 86.

As described above, the information providing apparatus 30 communicates with the terminal 10 and the MFP 80, respectively, through the NFC communication to obtain connection settings information to be used for the Bluetooth communication. More specifically, the information providing apparatus 30 can easily obtain the connection settings information that is required to establish the Bluetooth communication, as the user brings the information providing apparatus 30 into close proximity to the terminal 10 or the MFP 80. Accordingly, the user or the information providing apparatus 30 does not have to perform any other operation to specify the terminal 10 or the MFP 80 to start communicating with the terminal 10 or the MFP 80 using the Bluetooth communication standards.

Referring back to FIG. 5, the operation input 33 receives a user instruction input by the user through the operation button 308 or the operation panel 309, under control of the instructions received from the CPU 301 (FIG. 3).

The operations or functions of the display control 34 are performed by the display 306 (FIG. 3) according to an instruction received from the CPU 301. The display control 34 causes the display 306 to display various data such as a curser, menu, window, character, or image.

The display data obtainer 35, which may be implemented by the CPU 301 (FIG. 3) in cooperation with the display data obtaining program 233 that is stored in the memory 23 of the terminal 10, obtains display data to be shared among the terminals 10 under control of the display control 34.

The display data communicator 36, which may be implemented by the second communication I/F 313 according to an instruction received from the CPU 301 (FIG. 3), transmits the display data obtained by the display data obtainer 35 to the terminal 10 through the Bluetooth transmit/receive 32. The display data communicator 36 receives various data, which may be transmitted from the terminal 10 so as to notify the information providing apparatus 30 of the changes in operation state of the terminal 10.

The memory control 37 is implemented by the HDD 305 of FIG. 3 according to an instruction from the CPU 301. The memory control 37 stores various data in the memory 38 or reads out various data from the memory 38. The memory 38 stores conference data such as presentation data to be transmitted to the terminal 10 for distribution to the terminals 10, and various application programs for displaying the presentation data such as word processor application, spreadsheet application, or presentation application. Further, in this example, the memory 38 stores a file control program, which causes the CPU 301 to function as the file controller 39.

The presentation data may be obtained by the MFP 80, for example, by scanning. For example, when the information providing apparatus 30 receives the scanned image data from the MFP 80, the memory control 37 stores the scanned image data in a predetermined memory area of the memory 38 for later use.

The file controller 39 generates or manages a file management table, which stores a file name and information indicating the memory area in which data is stored, for each one of one or more files of the image data received from the MFP 80. In alternative to using the file name, any other identification information that uniquely identifies a specific data file may be used. For example, when the file control program stored in the memory 38 is loaded onto the RAM 303, the CPU 301 functions as the file controller 39 to manage electronic data stored in the information providing apparatus 30 using the file management table.

FIG. 10 is an example data structure of the file management table stored in the memory 38. Referring to FIG. 10, information indicating the memory area in which specific data is stored and the file name are expressed as a path, which is used as association information that associates the information indicating the memory area and the file name. In the example case of "¥conference¥doc¥strategy.pdf", the information indicating the memory area is "¥conference¥doc¥" and the file name is "strategy.pdf".

Referring back to FIG. 5, the display control 34 may cause the display 306 to display a list of one or more file names for one or more data files that are registered in the file management table, for selection by the user. When the operation input 33 receives a user instruction for selecting specific data, the memory control 37 reads out the selected data by specifying the memory area that is associated with the selected file name. The display data communicator 36 transmits the selected data to the terminal 10 through the Bluetooth transmit/receive 32 as display data to be shared.

The MFP 80 includes a scanner 81, a printer 82, a facsimile transmit/receive 83, a data processor 84, the NFC transmit/receive 85, the Bluetooth transmit/receive 86, a usage determiner 87, an authenticator 88, and an authentication data memory 89.

The NFC transmit/receive 85 communicates with the outside apparatus such as the information providing apparatus 30 in compliance with the non-contact IC NFC communication standards. The NFC transmit/receive 85 is provided with a reader or writer, or a tag, which incorporates a communication control program that reads information transmitted from the NFC transmit/receive 31 of the information providing apparatus 30. The NFC transmit/receive 85 transmits or receives data to or from the outside apparatus within a communication range of about 0 to 10 cm, which is narrower than a communication range of the Bluetooth communication performed by the Bluetooth transmit/receive 86. The data transfer rate of the NFC transmit/receive 85 is about 100 to 400 kbps, which is less than the data transfer rate of the Bluetooth transmit/receive 86 of about 1 to 2 Mbps. For this reasons, as described above, the NFC transmit/receive 85 is used for transmitting data with a relatively small data size. In alternative to using the NFC communication standards, the NFC transmit/receive 85 may use any other communication standards having a communication range that is narrower than that of the Bluetooth communication standards such as the Infrared Data Association (IrDA) communication standards.

When the NFC transmit/receive 85 detects that the information providing apparatus 30 is moved into a close proximity to the MFP 80 such that it is in the communication range of the NFC transmit/receive 85, the NFC transmit/receive 85 establishes communication with the NFC transmit/receive 31 using the NFC communication standards. The NFC transmit/receive 85 receives various information such as an authentication ID, a function ID, communication settings information, and function settings information, from the information providing apparatus 30. The authentication ID is authentication information, which is used to determine whether the information providing apparatus 30 is authorized to use the MFP 80. For example, the authentication ID may be user identification information that uniquely identifies the user of the information providing apparatus 30 or specific information that uniquely identifies the information providing apparatus 30. In one example, the user identification information may be an employee ID of the user based on assumption that the MFP 80 is used in the office environments. The function ID is information indicating a specific function of the MFP 80, which is previously assigned for each function of the MFP 80. Using the function ID, the user at the information providing apparatus 30 is able to request specific processing to be performed by the MFP 80. In case the user at the information providing apparatus 30 requests for the printer function of the MFP 80, the function ID indicating the print function, such as the "print ID" is used as the function ID. In case the user at the information providing apparatus 30 requests for the scanner function of the MFP 80, the function ID indicating the scanner function, such as the "scanner ID" is used as the function ID.

The communication settings information indicates parameter values that are initially set and required by the outside apparatus to start wireless communication through the Bluetooth transmit/receive 86 with the MFP 80. As described above, as the information providing apparatus 30 is moved into close proximity to the MFP 80, the MFP 80 starts communicating with the information providing apparatus 30 using the NFC communication standards to receive authentication information from the information providing apparatus 30. When the information providing apparatus 30 is authenticated, the MFP 80 transmits the communication settings information to the information providing apparatus 30 using the NFC communication to allow the information providing apparatus 30 to start communicating with the MFP 80 through the Bluetooth communication. Accordingly, the user at the information providing apparatus 30 does not have to perform any operation other than moving the information providing apparatus 30 to the MFP 80 to start the Bluetooth communication.

The function settings information indicates various parameters regarding the specific function to be performed by the MFP 80. In case the function ID indicates the printer function, the function settings information includes, for example, a parameter value "on" or "off" for the double-side printing and a parameter value "on" or "off" for the aggregate printing. In case the function ID indicates the scanner function, the function settings information includes, for example, a parameter value "300 dpi" for the image resolution of the scanned image data.

The authenticator 88 determines whether the authentication ID, which is received from the information providing apparatus 30, indicates that the information providing apparatus 30 is an authenticated apparatus that is allowed to use the MFP 80. More specifically, the authenticator 88 determines whether the authentication ID received by the NFC transmit/receive 85 matches an authentication ID stored in the memory 89.

The usage determiner 87 determines whether the authentication ID received from the information providing apparatus 30 indicates that the information providing apparatus 30 is an authenticated apparatus that is allowed to use a requested function of the MFP 80, which is specified by the function ID received from the information providing apparatus 30. More specifically, the usage determiner 87 obtains use permission information, which is associated with the authentication ID and the function ID that are received by the NFC transmit/receive 85, from the authentication data memory 89, and determines whether the use permission information indicates that usage is allowed for each function ID.

The Bluetooth transmit/receive 86 communicates with the outside apparatus such as the information providing apparatus 30 using the Bluetooth communication standards. The Bluetooth transmit/receive 86 transmits or receives data with the information providing apparatus with the data transfer rate of 1 to 10 Mbps, which is greater than the data transfer rate of the NFC transmit/receive 85. Further, the Bluetooth transmit/receive 86 is able to communicate with the information providing apparatus 30 with a communication range of about 10 m or less, which is wider than a communication range of the NFC communication.

More specifically, the Bluetooth transmit/receive 86 includes a Bluetooth I/F such as a transceiver, and a communication controller. The Bluetooth I/F transmits or receives data with the outside apparatus such as the information providing apparatus 30 according to the Bluetooth communication standards that transmits or receives data according to the Bluetooth communication standards. The communication controller exchanges communication settings information with the outside apparatus through the Bluetooth I/F to establish the Bluetooth communication. The communication settings information includes specific address information assigned to the Bluetooth I/F.

In alternative to using the Bluetooth communication standards, any other communication standards that allow the MFP 80 to communicate with the outside apparatus within a communication range that is wider than that of the NFC communication may be used. For example, a communication I/F in compliance with the wireless LAN standards such as the IEEE802.11a/IEEE802.11b/IEEE802.11n/IEEE802.11g may be used. In such case, in replace of the Bluetooth transmit/receive 86, a wireless LAN transmit/receive is provided in the MFP 80, which includes a network board that transmits or receives data based on the IEEE802.11a/IEEE802.11b standards, and a communication controller that controls establishment of the IEEE802.11a/IEEE802.11b communication or data transmission or reception.

In another example, a communication I/F in compliance with the wireless USB standards may be used. If a distance between the apparatuses is equal to or less than 3 m based on the UWB communication protocol, the wireless USB communication may be used, which is capable of transferring data in 480 Mbps, which is substantially the same transfer rate of the wired USB 2.0 communication. In such case, in replace of the Bluetooth transmit/receive 86, a wireless USB transmit/receive is provided in the MFP 80, which includes a UWB device that transmits or receives data in compliance with the wireless USB standards, and a communication controller that controls establishment of USB wireless communication or data transmission or reception.

In case the Bluetooth transmit/receive 86 establishes the Bluetooth communication with the information providing apparatus 30, based on the communication settings information received from the information providing apparatus 30 through the NFC transmit/receive 85, the Bluetooth transmit/receive 86 transmits or receives data regarding the function ID received from the information providing apparatus 30. Examples of data to be transmitted or received include various data such as image data, document data, or text data.

The scanner 81 scans a paper document into electronic data using an imaging element such as a charged coupled device (CCD). The scanner 81 may be additionally provided with an automatic document feeder (ADF), which automatically feeds the paper document, one page by one page, to an image reading section of the scanner 81.

The data processor 84 performs processing relating to the function ID and the function settings information that are received from the NFC transmit/receive 85, on electronic data that is received through the Bluetooth transmit/receive 86 or to be transmitted through the Bluetooth transmit/receive 86. For example, in case that the function ID indicating the printer function is received, the data processor 84 applies image processing relating to image density color tone or layout processing for double-sided printing or single-sided printing, to the image data according to the function settings information. In case that the function ID indicating the scanner function is received, the data processor 84 applies image processing or layout processing according to the function settings information, to the scanned image data received from the scanner 81.

The printer 82 prints an image based on the electronic data processed by the data processor 84 on a recording sheet.

The facsimile transmit/receive 83 transmits facsimile data, based on the scanned image data obtained by the scanner 81 or image data received from the information providing apparatus 30, to the outside apparatus such as another MFP, a facsimile apparatus, or a client terminal, through the network. The facsimile transmit/receive 83 receives facsimile data from the outside apparatus such as another MFP, a facsimile apparatus, or a client terminal, through the network.

The authentication data memory 89 stores use permission information, which is used to determine whether the outside apparatus is allowed to use a specific function of the MFP 80. FIG. 11 illustrates an example data structure of the use permission information stored in the authentication data memory 89. The authentication data memory 89 stores the use permission information, which indicates association between an authentication ID and one or more function IDs of the MFP 80. Referring to FIG. 11, the apparatus having the authentication ID "person1" is allowed to use the printer function ("Y" for "printer ID") and the scanner function ("Y" for "scanner ID") of the MFP 80. The apparatus having the authentication ID "person2" is allowed to use the scanner function ("Y" for "scanner ID"), but not the printer function ("NO" for "printer ID").

Now, various image data to be displayed on the display 130 of the terminal 10 is explained. Examples of image data to be displayed on the display 130 during videoconference include captured image data captured by the camera 113 and display data transmitted from the information providing apparatus 30. The captured image data is any image data captured by the camera 113 of the terminal 10, or any image data captured by the camera 113 of the counterpart terminal 10. The display data includes any data transmitted from the information providing apparatus 30, such as the scanned image data that is scanned by the MFP 80 and stored in the information providing apparatus 30, or image data reflecting a screen being displayed on the display 306 of the information providing apparatus 30.

Figure 12:
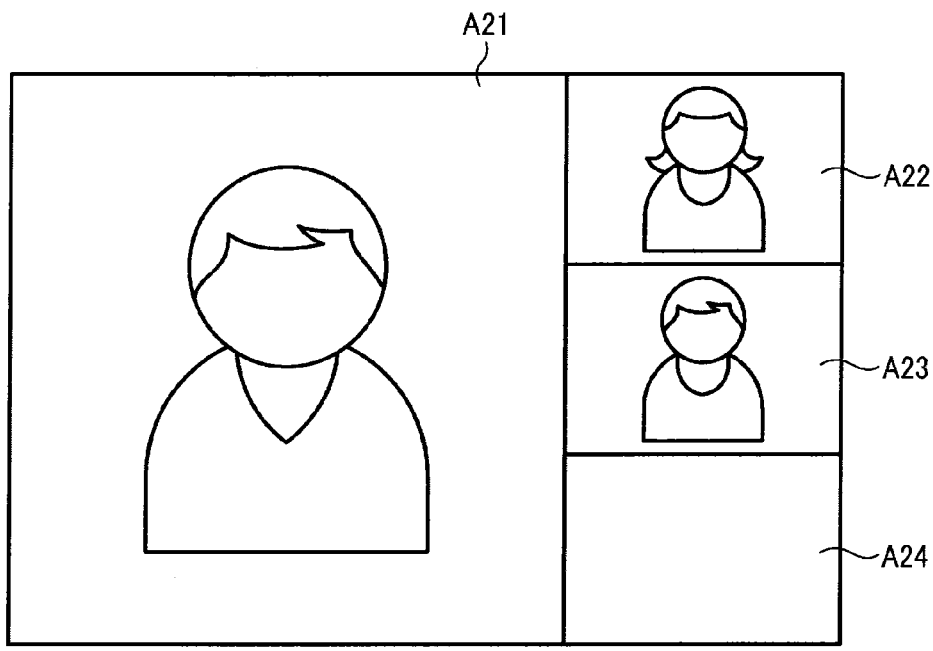
FIG. 12 is an example screen displayed on a display of the transmission terminal, which includes captured image data.

FIG. 12 illustrates an example screen, which may be displayed on the display 130 of the terminal 10. The screen of FIG. 12 is divided into four areas including a first display area A21 having a larger size that covers the left to the central sections of the screen, and three second display areas A22 to A24 that cover the upper right to the upper left of the screen. The first display area A21 displays captured image data reflecting the user who is currently speaking, which is captured by the terminal 10 that detects sounds through the microphone 115.

For the descriptive purposes, it is assumed that a user at a first terminal 10*aa* is currently speaking, when the first terminal 10*aa*, a second terminal 10*ba*, and a third terminal 10*ca* are having videoconference. In operation, the CPU 101 of the first terminal 10*aa*, functioning as the sound input 15, monitors sounds input through the sound I/O I/F 117 to detect a range of voices of the user of the first terminal 10*aa*. When the voices of the user are detected, the CPU 101 transmits the terminal ID of the first terminal 10*aa* through the network I/F 110 to the counterpart terminals 10*ba* and 10*ca* through the relay device 40. When the counterpart terminals 10*ba* and 10*ca* each receive the terminal ID of the first terminal 10*aa*, the display control 17 of each of the counterpart terminals 10*ba* and 10*ca* refers to the management table 231 of FIG. 5 to extract a data number that is associated with the first terminal 10*aa*. The display control 17 assigns the first display area A21 of the screen, to the image data that is received from the first terminal 10*aa* specified by the extracted data number, thus displaying the image data of the user who is currently speaking in the first display area A21. For each one of the counterpart terminals 10*ba* and 10*ca* other than the first terminal 10*aa*, the display control 17 assigns the second display area of the screen, to image data that is captured at the other counterpart terminal 10*ba* and 10*ca* specified by a data number of the management table 231. Since the user who is currently speaking is displayed in the first display area A21 with a larger image size at a central position, the user at each site can easily recognize the user who is currently speaking. For the counterpart terminals 10*ba* and 10*ca* other than the first terminal 10*aa* of the user who is currently speaking, assigning of the second display area may be performed in any desired order, such as an ascending or descending order based on the data number or the terminal ID.

Figure 13:
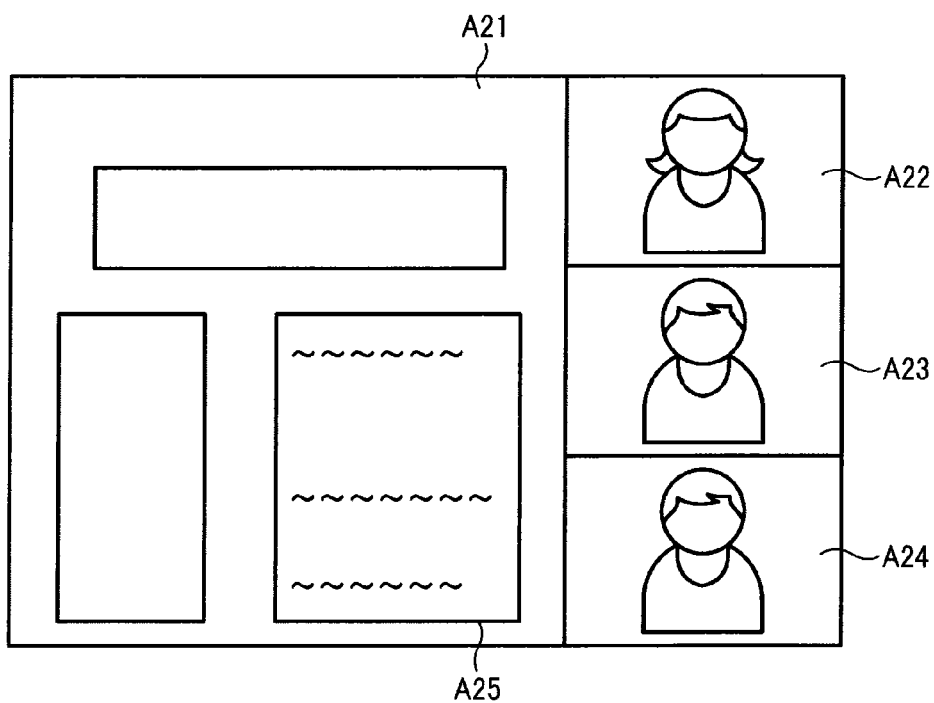
FIG. 13 is an example screen displayed on the display of the transmission terminal, which includes captured image data and display data.

In another example, as illustrated in FIG. 13, the display control 17 of the terminal 10 may display display data, which is received from the information providing apparatus 30, on a selected area A25 of the first display area A21 together with other presentation data. In such case, the image data of the first to third terminals 10*aa*, 10*ba*, and 10*ca* are respectively displayed on the second display areas A22, A23, and S24. As presentation data including the display data is displayed in the first display area A21 with a larger image size at a central position, the user can easily see the presentation data.

Figure 14:
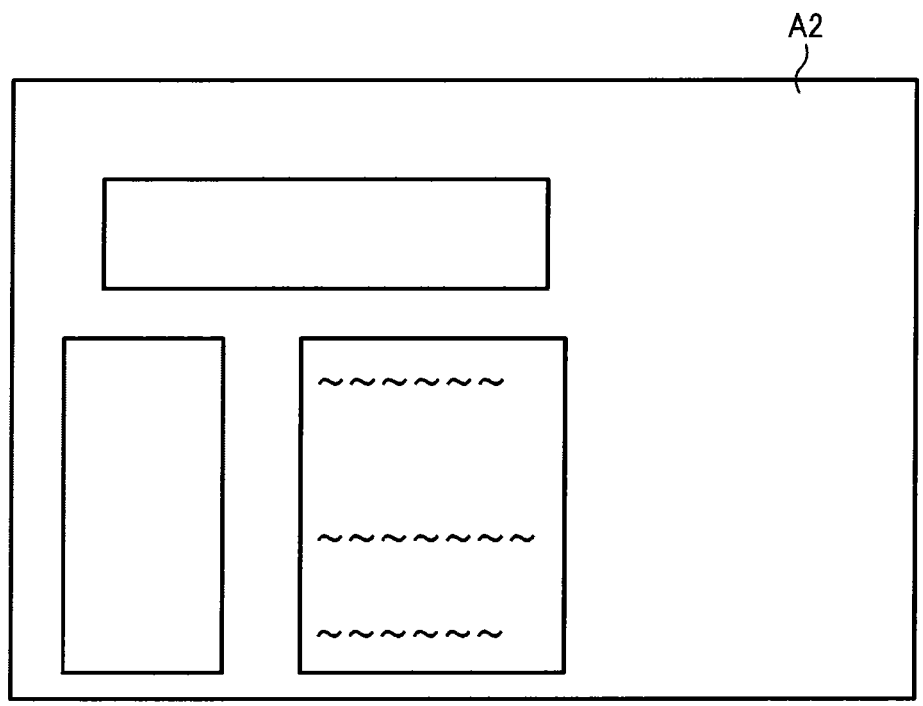
FIG. 14 is an example screen displayed on the display of the transmission terminal, which includes display data.
Figure 15:
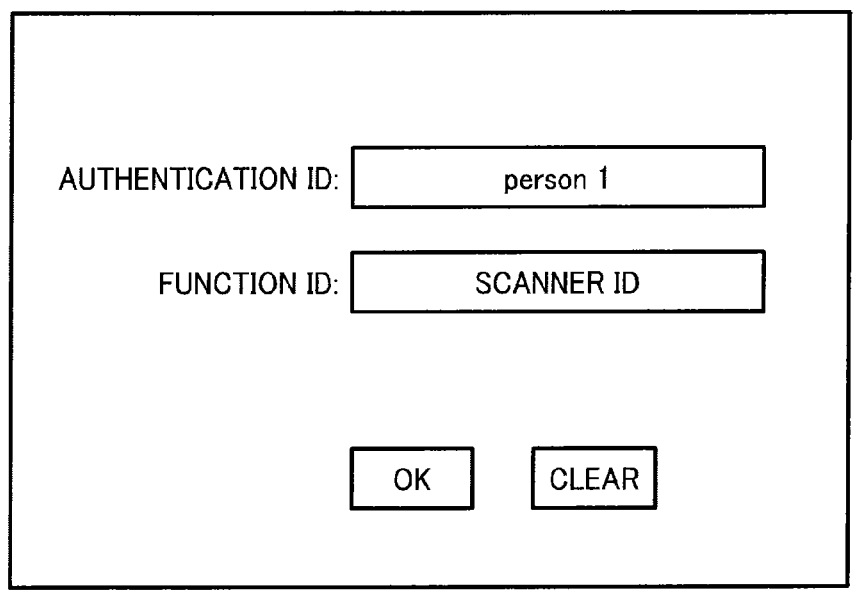
FIG. 15 is an example login screen displayed on a display of the information providing apparatus.

In another example, the display control 17 may switch a screen being displayed on the display 130, depending on the situation. For example, as illustrated in FIG. 14, when the terminal 10 is receiving the display data from the information providing apparatus 30, the display control 17 may assign the display data to an entire display area A2 of the screen. When the operation input 12 of the terminal 10 detects a user instruction for switching, such as a specific curser key of the operation button 108, the display control 17 switches the screen of FIG. 14 to the screen of FIG. 12. When the operation input 12 of the terminal further detects a user instruction for switching, such as the specific curser key of the operation button 108, the display control 17 further switches the screen of FIG. 12 to the screen of FIG. 13. In this manner, the terminal 10 is able to display a screen on the display 130 according to the user preference. For example, when the presentation data is being displayed, the user at each site may change the appearance of the screen so as to check the user at the counterpart terminal 10.

Now, operation of requesting the MFP 80 to perform specific processing, performed by the information providing apparatus 30, is explained according to an example embodiment of the present invention. More specifically, in one example, the user at the information providing apparatus 30 requests the MFP 80 to obtain scanned image data of a document, and transmits the scanned image data to the information providing apparatus 30. In another example, the user at the information providing apparatus 30 requests the MFP 80 to print image data, which may be transmitted from the information providing apparatus 30, as a printed image.

The user, who may be participating in the videoconference, requests the information processing apparatus 30 to establish communication with the MFP 80 and request the MFP 80 to perform image forming operation. More specifically, the display control 34 of the information providing apparatus 30 displays a login screen of FIG. 15 on the display 306. The user enters an authentication ID and a function ID using the login screen. In this example illustrated in FIG. 15, the scanner ID indicating the scanner function is input as the function ID.

The operation input 33 receives a user instruction, which includes the authentication ID and the function ID input through the login screen. The user brings the information providing apparatus 30 into close proximity to the MFP 80 or touch the MFP 80 with the information providing apparatus 30 to cause the information providing apparatus 30 to establish NFC communication with the MFP 80. When the operation input 33 receives the user instruction, the display control 34 displays a navigation screen of FIG. 16 on the display 306 to request the user to touch the MFP 80 with the information providing apparatus 30. The navigation screen of FIG. 16 further requests the user to input a file name to be assigned to image data that is to be generated by the MFP 80 based on the document to be scanned.

Figure 17A:
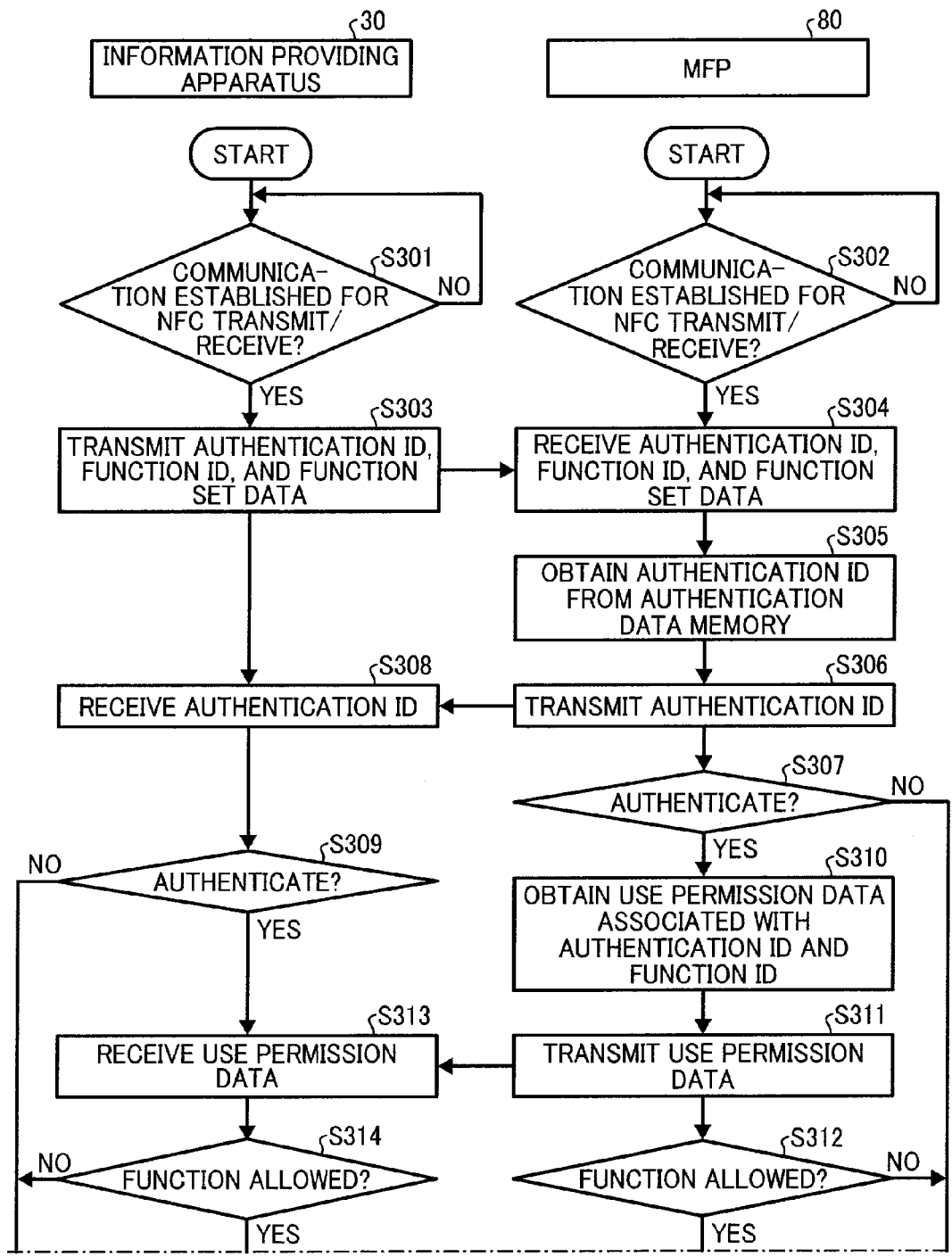
FIGS. 17A, 17B, and 18 are a flowchart illustrating operation of establishing communication and processing data, performed by the information providing apparatus and the image forming apparatus of the transmission system of FIG. 5, according to an example embodiment of the present invention.
Figure 17B:
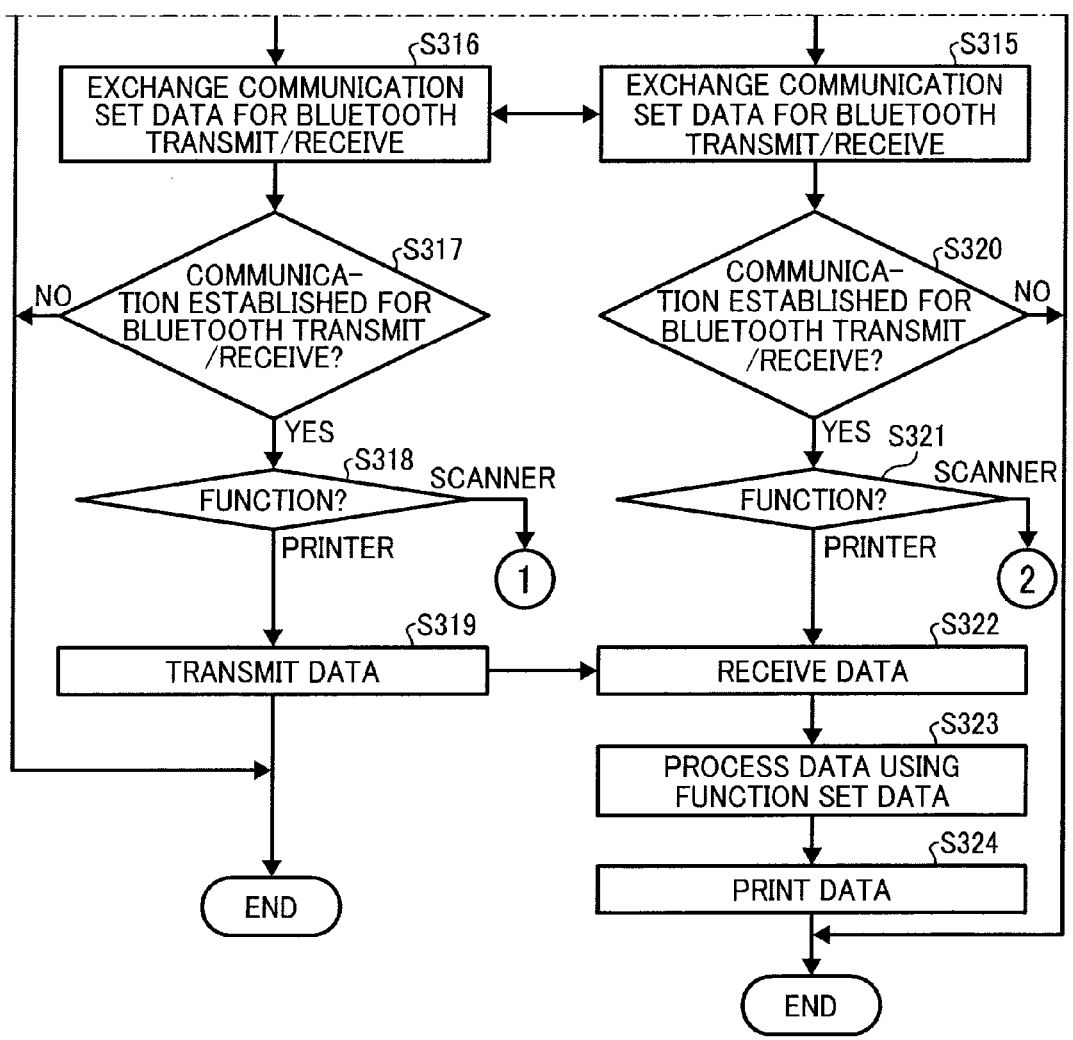
Figure 18:
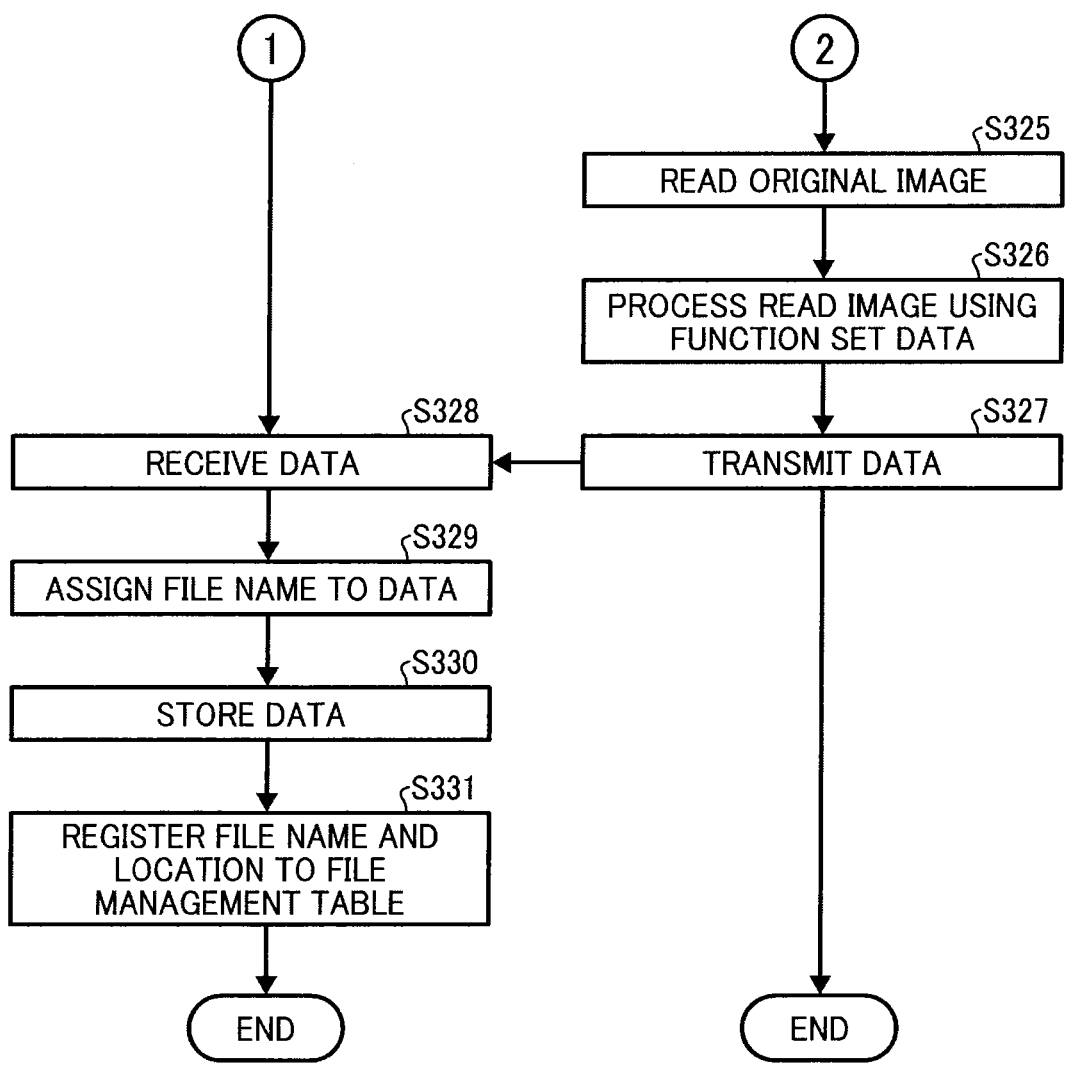
Figure 19:
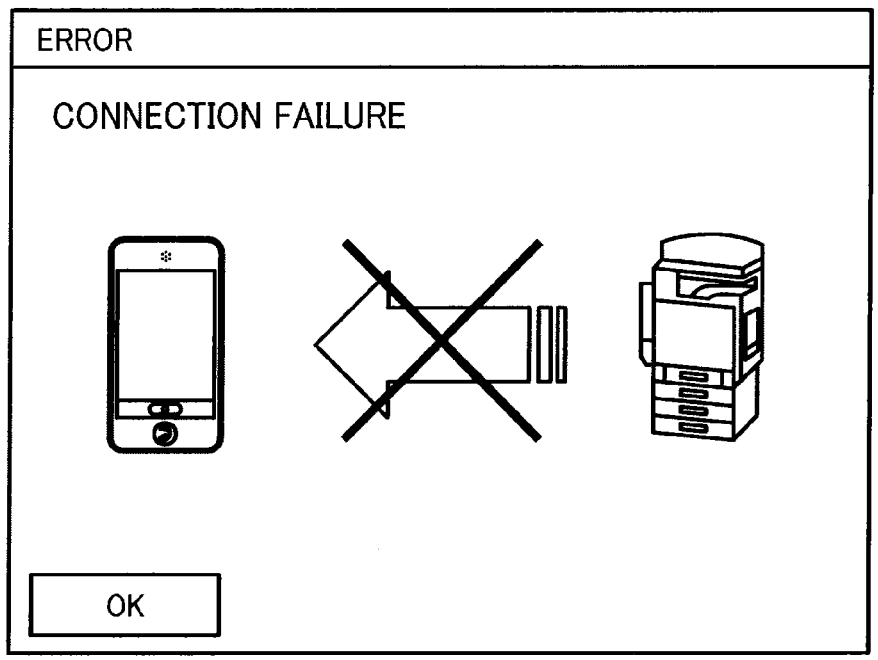
FIG. 19 is an example error screen displayed on the display of the information providing apparatus.

Referring now to FIGS. 17 and 18, operation of establishing wireless communication and processing data, performed by the information providing apparatus 30 and the MFP 80, is explained according to an example embodiment of the present invention.

At S301, the NFC transmit/receive 31 of the information providing apparatus 30 determines whether the NFC communication is established with the NFC transmit/receive 85 of the MFP 80. When it is determined that the NFC communication is not established ("NO" at S301), the operation repeats S301. At this time, the information providing apparatus 30 may display an error message indicating that the NFC communication is not established. The error message may further request the user to move the information providing apparatus 30 in close proximity to the MFP 80, as the error may be caused because the information providing apparatus 30 is not within a communication range of the MFP 80. This process is repeated until the NFC communication is established between the information providing apparatus 30 and the MFP 80.

At S302, the NFC transmit/receive 85 of the MFP 80 determines whether the NFC communication is established with the NFC transmit/receive 31 of the information providing apparatus 30. When it is determined that the NFC communication is not established ("NO" at S302), the operation repeats S302. In a substantially similar manner as described above, the MFP 80 may display an error message, or may continuously display the navigation screen of FIG. 16. This process is repeated until the NFC communication is established between the information providing apparatus 30 and the MFP 80.

When it is determined that the NFC communication is established with the MFP 80 ("YES" at S301), the operation proceeds to S303. At S303, the NFC transmit/receive 31 of the information providing apparatus 30 transmits the authentication ID, the function ID, and the function settings information ("function set data") to the NFC transmit/receive 85 of the MFP 80.

When it is determined that the NFC communication is established with the information providing apparatus ("YES" at S302), the operation proceeds to S304. At S304, the NFC transmit/receive 85 of the MFP 80 receives the authentication ID, the function ID, and the function settings information from the NFC transmit/receive 31 of the information providing apparatus 30.

At S305, the authenticator 88 obtains a plurality of authentication IDs that are stored in the authentication data memory 89.

At S306, the NFC transmit/receive 85 transmits the authentication IDs obtained from the authentication data memory 89 to the information providing apparatus 30.

At S307, the authenticator 88 determines whether any one of the authentication IDs stored in the authentication data memory 89 matches the received authentication ID received from the information providing apparatus 30. When there is no authentication ID that matches the received authentication ID, the authenticator 88 determines that the information providing apparatus 30 is not allowed to use the MFP 80 ("NO" at S308), and the operation ends in error. When there is an authentication ID that matches the received authentication ID, the authenticator 88 determines that the information providing apparatus 30 is allowed to use the MFP 80 ("YES" at S308), and the operation proceeds to S310.

At S308, the NFC transmit/receive 31 of the information providing apparatus 30 receives the authentication IDs from the MFP 80. At S309, the NFC transmit/receive 31 determines whether the MFP 80 allows the information providing apparatus 30 to use its function, based on obtained authentication IDs. When there is no authentication ID that matches the authentication ID of the information providing apparatus 30, it is determined that use of the MFP 80 is not allowed ("NO" at S309), and the operation ends in error. In such case, the display control 34 displays an error screen of FIG. 19 on the display 306. When there is an authentication ID that matches the authentication ID of the information providing apparatus 30, it is determined that use of the MFP 80 is allowed ("YES" at S309), and the operation proceeds to S313.

At S310, the usage determiner 87 obtains use permission information, which is associated with the authentication ID and the function ID, which are received from the information providing apparatus 30, from the authentication data memory 89.

At S311, the NFC transmit/receive 85 transmits the use permission information, obtained from the authentication data memory 89, to the information providing apparatus 30.

At S312, the usage determiner 87 determines whether the function specified by the function ID received from the information providing apparatus 30 is allowed by the information providing apparatus 30, using the obtained use permission information. When it is determined that the function specified by the function ID is not allowed by the information providing apparatus 30 ("NO" at S312), the operation ends in error. When it is determined that the function specified by the function ID is allowed by the information providing apparatus 30 ("YES" at S312), the operation proceeds to S315.

At S313, the NFC transmit/receive 31 of the information providing apparatus 30 receives the use permission information (use permission data), which is associated with the authentication ID and the function ID that are sent at S303, from the MFP 80.

At S314, the NFC transmit/receive 31 determines whether the MFP 80 allows the information providing apparatus 30 to use the function specified by the function ID using the use permission information. When it is determined that the MFP 80 allows the information providing apparatus 30 to use the function specified by function ID ("YES" at S314), the operation proceeds to S316. When it is determined that the MFP 80 does not allow the information providing apparatus 30 to use the function specified by the function ID ("NO" at S314), the operation ends in error.

At S315 and S316, when the use of the specific function of the MFP 80 is allowed by the information providing apparatus 30, the NFC transmit/receive 31 and the NFC transmit/receive 85 exchange communication settings information with each other. More specifically, the NFC transmit/receive 85 of the MFP 80 requests the information providing apparatus 30 for communication settings information, and receives the Bluetooth communication settings information from the NFC transmit/receive 31. In alternative to transmitting the communication settings information at S316, the NFC transmit/receive 31 of the information providing apparatus 30 may transmit the communication settings information, together with the authentication ID, the function ID, and the function settings information at S303.

At S317, the Bluetooth transmit/receive 32 of the information providing apparatus 30 starts establishing communication with the Bluetooth transmit/receive 86 of the MFP 80 using the Bluetooth communication settings information, and determines whether Bluetooth communication is established with the Bluetooth transmit/receive 86 of the MFP 80. When it is determined that the Bluetooth communication is not established ("NO" at S317), the operation ends in error. When it is determined that the Bluetooth communication is established ("YES" at S317), the operation proceeds to S318.

At S318, the Bluetooth transmit/receive 32 determines specific processing to be performed using the function ID. In this example, it is assumed that the information providing apparatus 30 determines whether the function ID is the printer ID or the scanner ID. When it is determined that the function ID is the printer ID ("PRINTER" at S318), the operation proceeds to S319. At S319, the Bluetooth transmit/receive 32 obtains electronic data specified by the user from the memory 38, and transmits the specified electronic data to the MFP 80.

At S320, the Bluetooth transmit/receive 86 of the MFP 80 starts establishing communication with the Bluetooth transmit/receive 32 of the information providing apparatus 30 using the Bluetooth communication settings information, and determines whether Bluetooth communication is established with the Bluetooth transmit/receive 32 of the information providing apparatus 30. When is determined that the Bluetooth communication is not established ("NO" at S320), the operation ends in error. When it is determined that the Bluetooth communication is established ("YES" at S320), the operation proceeds to S321.

At S321, the usage determiner 87 determines specific processing to be performed using the function ID. In this example, it is assumed that the MFP 80 determines whether the function ID is the printer ID or the scanner ID. When it is determined that the function ID is the printer ID ("PRINTER" at S321), the operation proceeds to S322. At S322, the Bluetooth transmit/receive 86 receives image data to be processed from the information providing apparatus 30. At S323, the data processor 106 applies processing to the received image data according to the function settings information, such as the print settings information received from the information providing apparatus 30. At S324, the printer 82 forms an image of the processed image data on a recording sheet, and the operation ends.

In this example, the print settings may be set, for example, by a printer driver that is installed on the information providing apparatus 30 or available to the information providing apparatus 30 through a print server. Alternatively, the print settings may be embedded in the image data to be processing using a description language such as portable document format (PDF) or post script (PS).

Further, in this example, the image data that is received from the information providing apparatus 30 is any data, which is to be processed based on the print settings information previously set by the user. Alternatively, in case the information providing apparatus 30 is provided with data processing function, the MFP 80 may receive image data to be printed, to which specific print processing is applied. Alternatively, the information providing apparatus may perform a part of print processing to image data, while requesting the MFP 80 to perform a part of print processing to processed image data.

At S321, when the usage determiner 87 determines that the scanner function is performed ("SCANNER" at S321), the operation proceeds to S325. At S325, the scanner 81 scans an original document, which is provided to the MFP 80, into scanned image data. At S326, the data processor 106 applies processing to the scanned image data according to the function settings information, such as the scanner settings information, received from the information providing apparatus 30. At S327, the Bluetooth transmit/receive 86 transmits the processed image data to the information providing apparatus 30.

At S328, the Bluetooth transmit/receive 32 of the information providing apparatus 30 receives the processed image data, i.e., the scanned image data, from the Bluetooth transmit/receive 86 of the MFP 80. At S329, the file controller 39 assigns a file name to a data file of the scanned image data. In this example, the file name that is input through the navigation screen of FIG. 16 is assigned.

Figure 16:
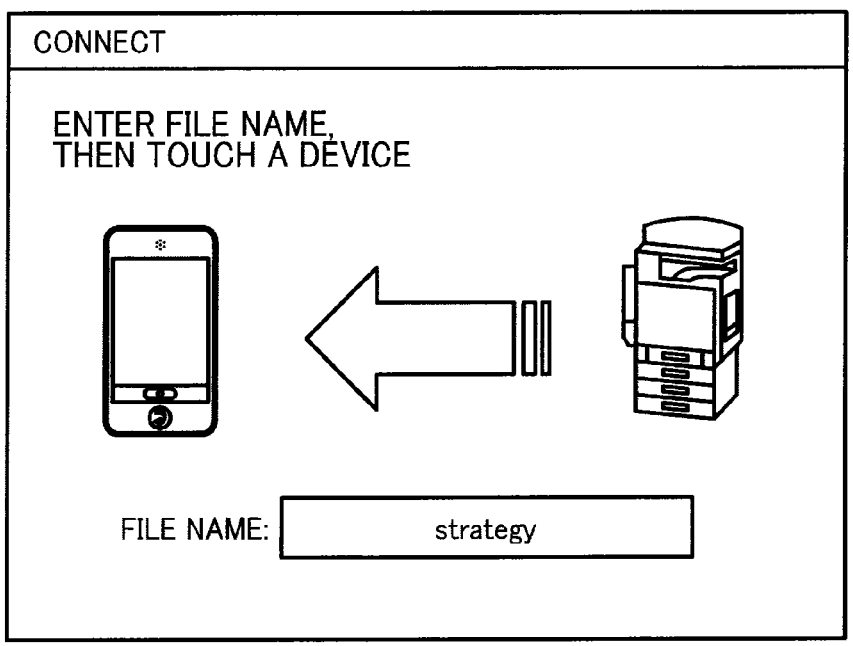
FIG. 16 is an example navigation screen displayed on the display of the information providing apparatus.

In case the navigation screen of FIG. 16 is not displayed, or in case there is no file name input through the navigation screen of FIG. 16, the file controller 39 may arbitrarily assign a file name to the data file of scanned image data, for example, based on the date and time at which the scanned image data is received. For example, assuming that the date and time at which the scanned image data is received is 10:10:30 on Sep. 1, 2011, the file controller 39 assigns the file name "20110901101030.pdf" to the PDF file of the scanned image data.

At S330, the memory control 37 stores the scanned image data, assigned with the file name, in a predetermined memory area of the memory 38.

At S331, the file controller 39 registers the file name and information indicating the memory area in which the data is stored in association with each other in the file management table of FIG. 10, and the operation ends.

As described above, through bringing the information providing apparatus 30 into close proximity to the MFP 80, the user is able to remotely control the MFP 80 through the information providing apparatus 30 to perform specific processing, such as scanning a paper document into scanned image data and transmitting the scanned image data to the information providing apparatus 30, or transmitting image data to the MFP 80 and printing an image of the image data by the MFP 80.

More specifically, through moving the information providing apparatus 30 to a location that is in close proximity to the MFP 80, the information providing apparatus 30 and the MFP 80 are able to communicate using the NFC communication standards to automatically exchange communication settings information that is required to establish the Bluetooth communication, and establish the Bluetooth communication.

Further, a user instruction regarding the function to be performed by the MFP 80 can be easily transmitted from the information providing apparatus 30 to the MFP 80, for example, using the function ID and the function settings information. Accordingly, the user does not have to input a user instruction regarding data transmission or reception or various settings at the MFP 80.

In alternative to the scanner function and the printer function, the user at the information providing apparatus 30 may request the MFP 80 to perform various other functions, depending on the functions that are available through the MFP 80. For example, the user may request the MFP 80 to transmit the scanned image data to a specific destination, for example, as facsimile data, a data file attached to email data, or electronic data. Further, the MFP 80, which generates the scanned image data using the scanner 81, may instruct the outside apparatus on the network such as another MFP to apply specific processing to the scanned image data based on the function settings information.

Now, operation of establishing communication between the information providing apparatus 30 and the terminal 10 is explained according to an example embodiment of the present invention. The terminal 10 is assumed to be communicating with one or more counterpart terminals 10.

Figure 20:
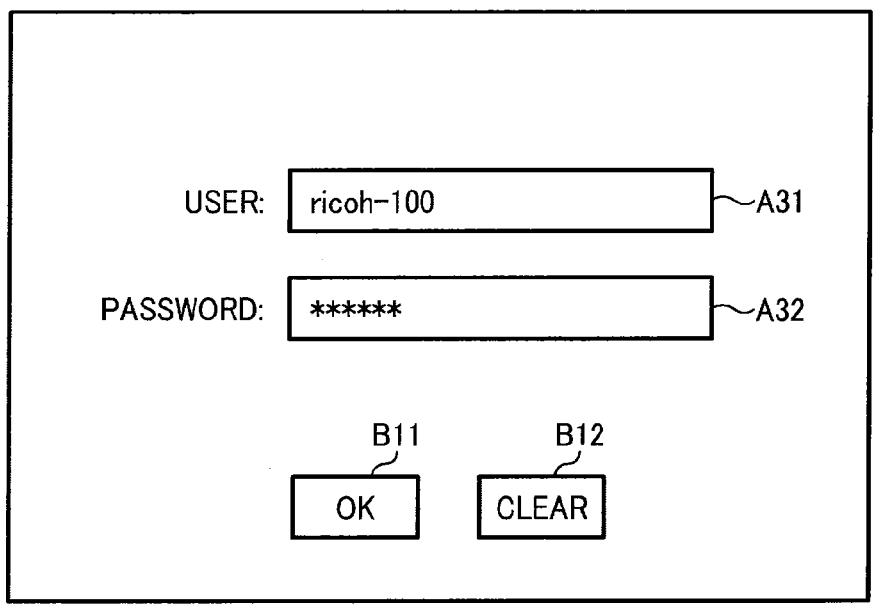
FIG. 20 is an example login screen displayed on the display of the information providing apparatus.

When the operation input 33 of the information providing apparatus 30 receives a user instruction for requesting login, the display control 34 displays a login screen of FIG. 20 on the display 306. The screen of FIG. 20 includes an area A31 in which a user ID is input, an area A32 in which a password is input, the "OK" button B11, and the "CLEAR" button B12.

The user may enter the authentication information, such as the user ID in the area A31 and the password in the area A32, using the operation button 308 or the operation panel 309. When the "OK" button B11 is selected, the CPU 301 functioning as the operation input 33 receives the authentication information entered in the area A31 and the area A32. When the "CLEAR" button B12 is selected, the display control 34 clears the authentication information entered in the area A31 and the area A32.

Figure 21:
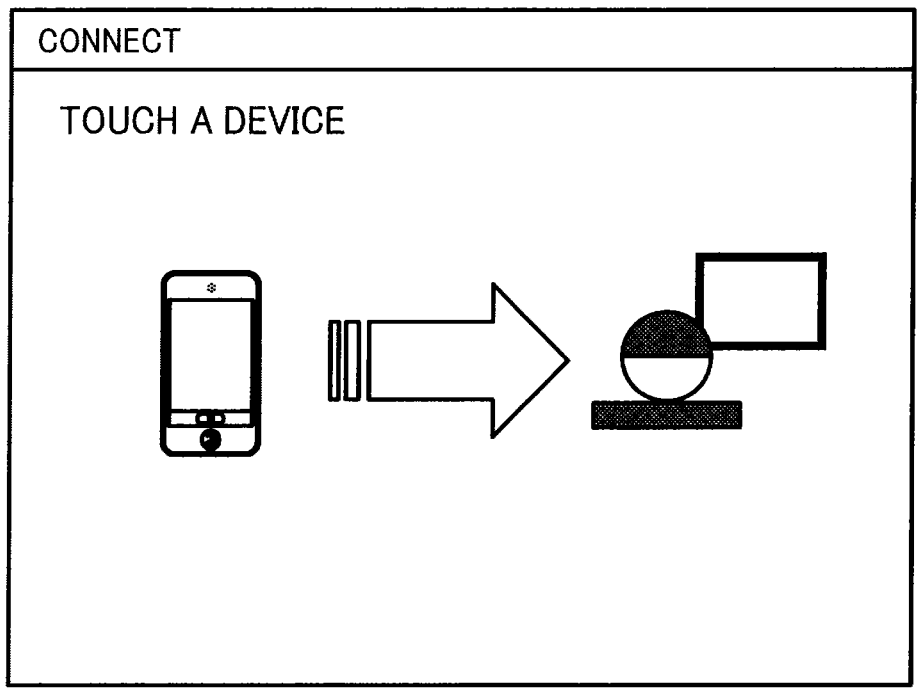
FIG. 21 is an example navigation screen displayed on the display of the information providing apparatus.

Assuming that the "OK" button B11 is selected after the authentication information is input, the display control 34 displays a navigation screen of FIG. 21 on the display 306. The navigation screen of FIG. 21 requests the user to touch the terminal 10 with the information providing apparatus 30 to establish the NFC communication between the terminal 10 and the information providing apparatus 30.

As the user moves the information providing apparatus 30 to a location in close proximity to the terminal 10, the NFC transmit/receive 31 of the information providing apparatus 30 and the NFC transmit/receive 21 of the terminal 10 establish the NFC communication. When the NFC communication is established, the display control 34 of the information providing apparatus 30 clears the screen of FIG. 21 from the display 306.

The Bluetooth transmit/receive 32 of the information providing apparatus 30 communicates with the Bluetooth transmit/receive 22 of the terminal 10, using the connection settings information that is received through the NFC communication, to mount the memory 23 of the terminal 10. The CPU 301 of the information providing apparatus 30 executes the display data obtaining program 233, which is stored in the memory 23, to cause the information providing apparatus 30 to additionally have the display data obtainer 35.

Figure 22:
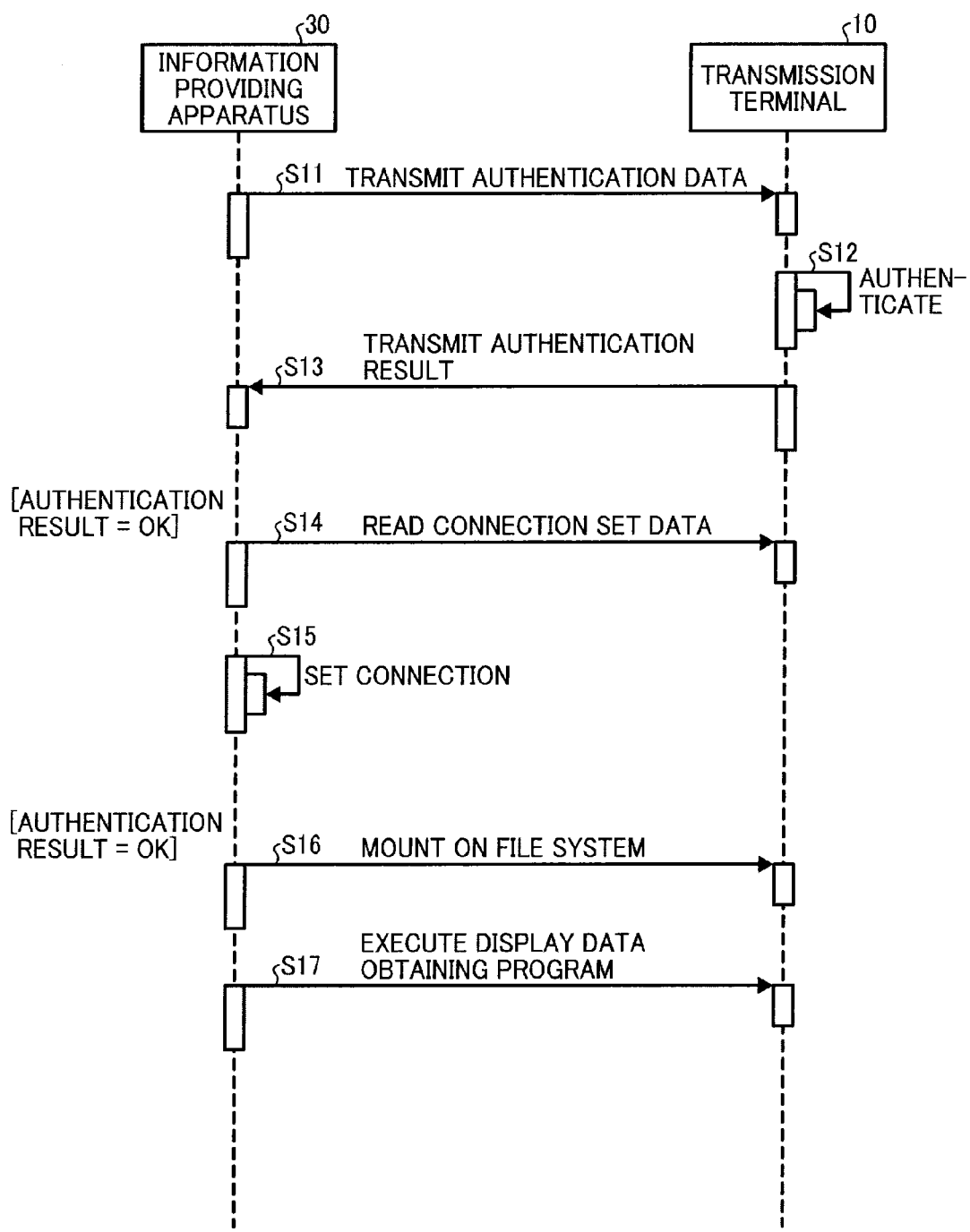
FIG. 22 is a data sequence diagram illustrating operation of executing display data obtaining program from the memory of the transmission terminal onto the information providing apparatus, according to an example embodiment of the present invention.

Referring now to FIG. 22, operation of establishing the Bluetooth communication between the terminal 10 and the information providing apparatus 30 and executing the display data obtaining program 233 on the information providing apparatus 30, is explained according to an example embodiment of the present invention. The operation of FIG. 22 is performed after establishing the NFC communication between the terminal 10 and the information providing apparatus 30.

At S11, the NFC transmit/receive 31 of the information providing apparatus 30 transmits the authentication information, which is obtained by the operation input 33, to the NFC transmit/receive 21 of the terminal 10.

When the NFC transmit/receive 21 of the terminal 10 receives the authentication information of the user, at S21, the external information determiner 20 refers to the authentication table 232 stored in the memory 23 to determine whether the user is an authenticated user based on the received authentication information. More specifically, the external information determiner 20 of the terminal 10 determines whether the authentication table 232 stores a user ID and a password that respectively match the received user ID and the received password. When there is the user ID and the password that match, the external information determiner 20 determines that the user, or the information providing apparatus 30, is authenticated. In this example illustrated in FIG. 22, it is assumed that the user is authenticated.

At S13, the NFC transmit/receive 21 of the terminal 10 transmits an OK signal indicating that the user is authenticated to the NFC transmit/receive 31 of the information providing apparatus 30.

When there is no user ID and password that match the received user ID and password, at S13, the NFC transmit/receive 21 of the terminal 10 transmits a NG signal indicating that authentication fails to the NFC transmit/receive 31 of the information providing apparatus 30. The information providing apparatus 30 causes the display control 34 to display an error screen, such as the screen of FIG. 23, and the operation ends.

When the NFC transmit/receive 31 of the information providing apparatus 30 receives the OK signal indicating that authentication is successful from the NFC transmit/receive 21 of the terminal 10, at S14, the NFC transmit/receive 31 reads out the connection settings information that is required for the Bluetooth communication, such as the connection settings information of the second communication I/F 112 functioning as the Bluetooth transmit/receive 22. At S14, the NFC transmit/receive 31 of the information providing apparatus 30 transmits the connection settings information to the terminal 10.

At S15, the Bluetooth transmit/receive 32 of the information providing apparatus 30 sets for the Bluetooth communication with the terminal 10, using the connection settings information that is obtained at S14. Further, the Bluetooth transmit/receive 22 of the terminal 10 starts establishing the Bluetooth communication with the Bluetooth transmit/receive 32 of the information providing apparatus 30. When the Bluetooth communication is established, the Bluetooth transmit/receive 22 of the terminal 10 transmits a OK signal to the Bluetooth transmit/receive 32 of the information providing apparatus 30. When the Bluetooth communication fails, the Bluetooth transmit/receive 22 of the terminal 10 transmits a NG signal to the Bluetooth transmit/receive 32 of the information providing apparatus 30.

When the Bluetooth communication is established, that is, when the Bluetooth transmit/receive 32 of the information providing apparatus 30 receives the OK signal from the Bluetooth transmit/receive 22 of the terminal 10, at S16, the display data communicator 36 of the information providing apparatus 30 accesses the memory 23 of the terminal 10 through the Bluetooth transmit/receive 32 and the Bluetooth transmit/receive 22 and mounts the memory area 23 of the terminal 10 on a file system of the information providing apparatus 30.

Figure 23:
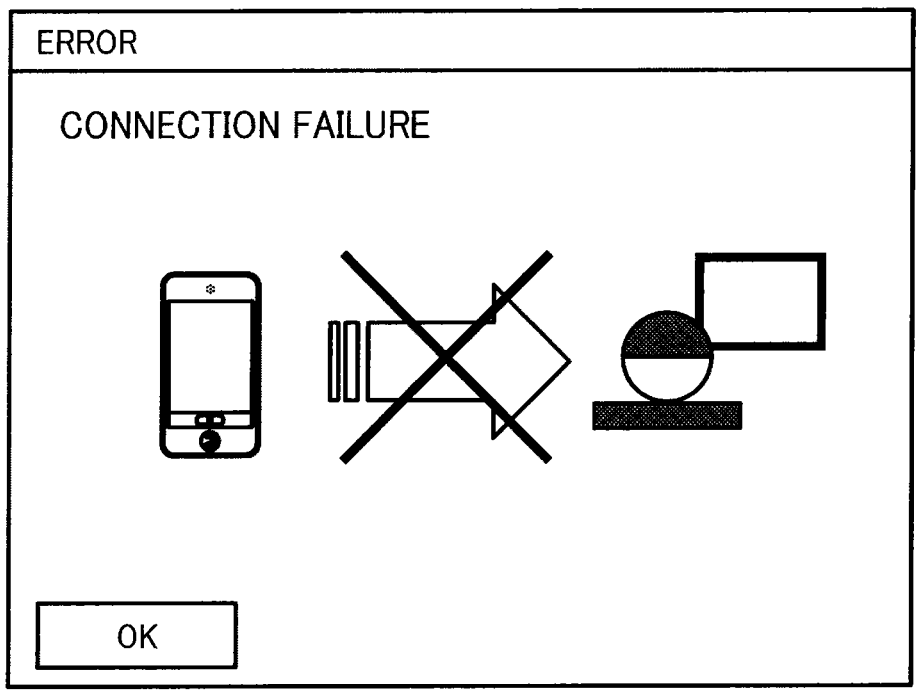
FIG. 23 is an example error screen displayed on the display of the information providing apparatus.

When the Bluetooth communication is not established, that is, when the Bluetooth transmit/receive 32 of the information providing apparatus 30 receives the NG signal from the Bluetooth transmit/receive 22 of the terminal 10, the display control 34 of the information providing apparatus 30 displays an error screen, such as the screen of FIG. 23, on the display 306 and the operation ends.

When mounting of the memory 23 is completed, at S17, the display data communicator 36 of the information providing apparatus 30 accesses a file of the display data obtaining program 233 stored in the memory 23 to execute the display data obtaining program 233. Upon execution of the display data obtaining program 233, the information providing apparatus 30 is additionally provided with the display data obtainer 35, which obtains data displayed by the display control 34 on the display 306 as display data.

Figure 24:
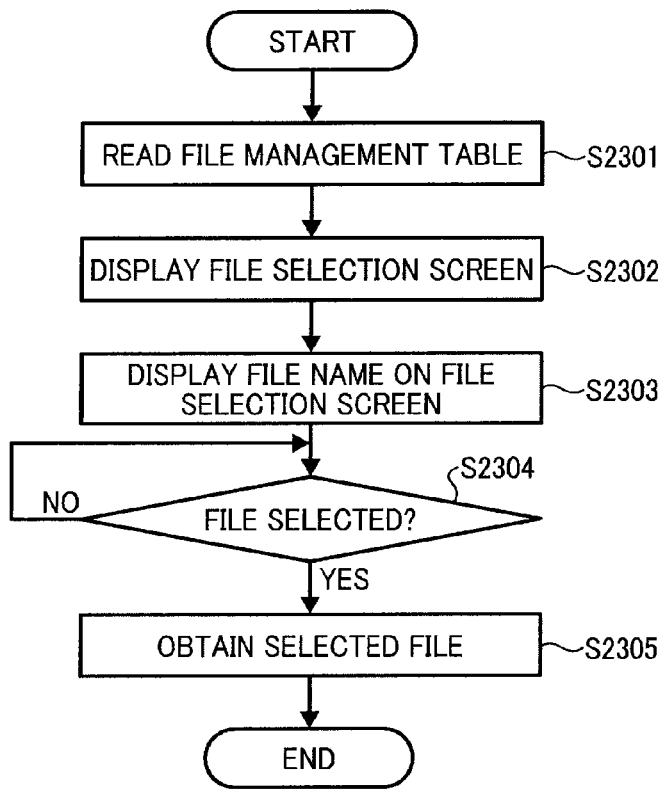
FIG. 24 is a flowchart illustrating operation of selecting electronic data as display data to be transmitted to the transmission terminal, performed by the information providing apparatus, according to an example embodiment of the present invention.

Referring now to FIG. 24, operation of obtaining the display data, performed by the information providing apparatus 30, is explained according to an example embodiment of the present invention.

At S2301, the memory control 37 of the information providing apparatus 30 reads out the file management table from the memory 38.

At S2302, the display control 34 displays a file selection screen on the display 306.

At S2303, the display control 34 displays a file name for each one of data files that are stored in the file management table, on the file selection screen, using information obtained from the file management table.

Figure 25:
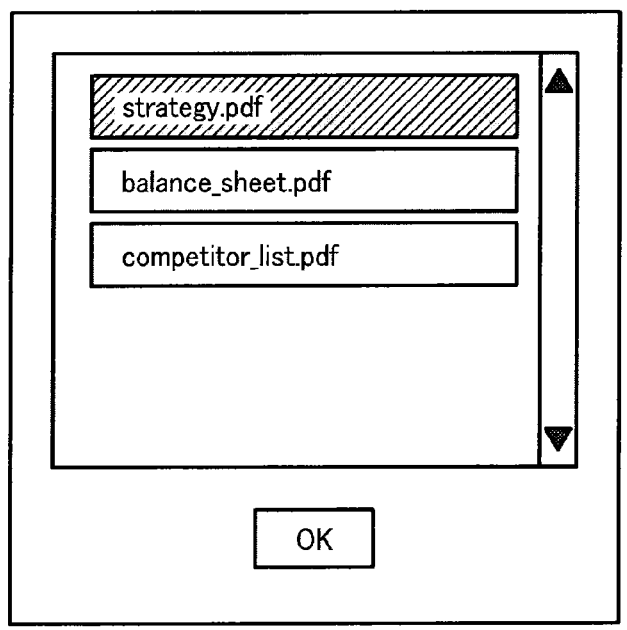
FIG. 25 is an example screen, which lists one or more data files for user selection, displayed by the display of the information providing apparatus.

FIG. 25 illustrates an example file selection screen displayed on the display 306, which lists a plurality of file names of the data files managed by the file management table of FIG. 10. In this example illustrated in FIG. 25, information indicating a location of the data file is not displayed. Alternatively, information indicating the location of the data file may be caused to be displayed.

At S2304, the file control 39 of the information providing apparatus 30 determines whether a file name displayed on the file selection screen is selected by the user. When selection of file name is received ("YES" at S2304), at S2305, the file controller 39 obtains electronic data assigned with the selected file name from the memory 38 through the memory control 37, and the operation ends.

In the above-described example, the information providing apparatus 30 requests the user to enter the authentication information through the login screen of FIG. 20. Alternatively, the information providing apparatus 30 may be previously stored with the authentication information, for example at the time of shipping, in a manner that is readable by the NFC transmit/receive 31. In such case, the user does not have to enter the authentication information, as the information providing apparatus 30 is able to automatically send the user authentication information to the outside apparatus.

As described above, the information providing apparatus 30 is authenticated when the connection between the information providing apparatus 30 and the terminal 10 is established. When authentication fails, the information providing apparatus 30 is not allowed to execute the display data obtaining program 233 to perform operation of the display data obtainer 35, thus preventing transmission of display data to the terminal 10. This improves the security in the transmission system, as the display data may contain confidential information. Further, as long as the communication is established between the information providing apparatus 30 and the terminal 10, the display data communicator 36 of the information providing apparatus 30 mounts the memory 23 of the terminal 10 to execute the display data obtaining program 233 stored in the memory 23. The display data obtaining program 233 does not have to be previously installed in the information providing apparatus 30, such that the display data obtainer 35 is added only when it is needed. This suppresses the workload for the user as the user does not have to prepare in prior to videoconference, and further saves a memory space of the memory 38 of the information providing apparatus 30. Further, the scanned image data, which is obtained by the MFP 80, can be easily shared among the terminals 10, through transmitting the scanned image data to the terminal 10.

Referring now to FIGS. 26A, 26B, 27, 28A, and 28B, operation of transmitting image data being displayed on the display 306 of the information providing apparatus 30, performed by the information providing apparatus 30, is explained according to an example embodiment of the present invention.

Figure 26A:
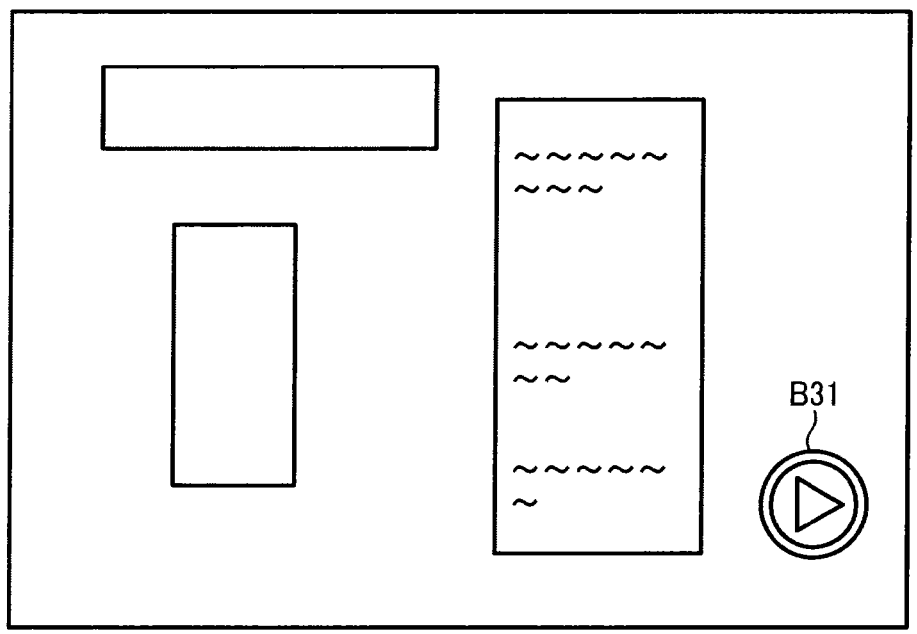
FIG. 26A is an example screen, displayed on the display of the information providing apparatus, which includes a start button to allow the user to start transmission of display data.
Figure 26B:
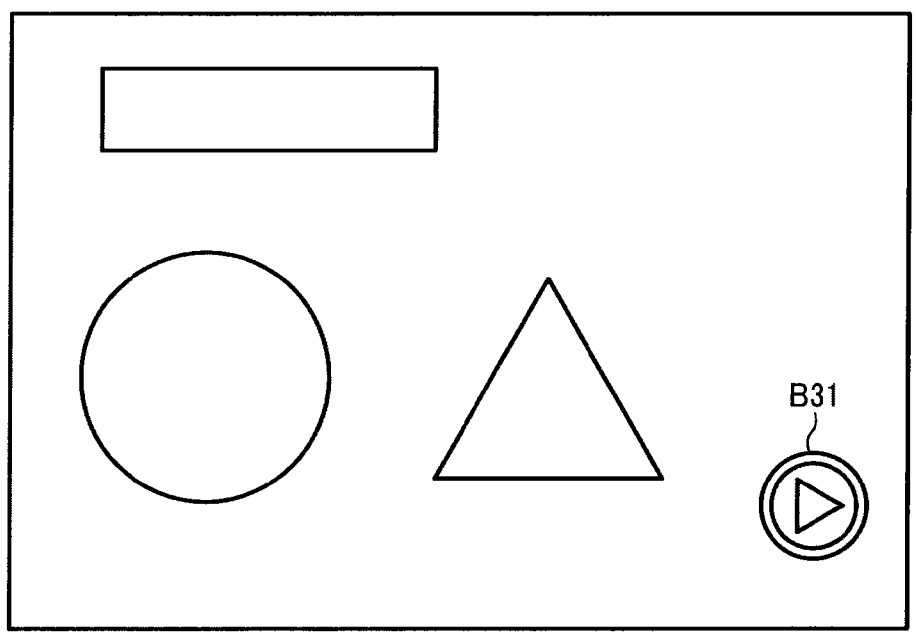
FIG. 26B is an example screen, displayed on the display of the information providing apparatus, which includes a start button to allow the user to start transmission of display data.

As illustrated in FIGS. 26A and 26B, the display data obtainer 35 of the information providing apparatus 30 displays a start button B31, which allows the user to instruct starting of transmission of display data to the terminal 10. The screens of FIG. 26A and 26B are displayed on the display 306, which respectively contain different display data.

When the display data obtainer 35 detects selection of the start button B31 through the operation input 33, the display data obtainer 35 obtains files of image data being displayed on the display 306, and transmits the obtained files of imaged data to the terminal 10 through the display data communicator 36. The start button B31, which is also displayed as a part of the screen, is not included as display data to be transmitted to the terminal 10.

Figure 27:
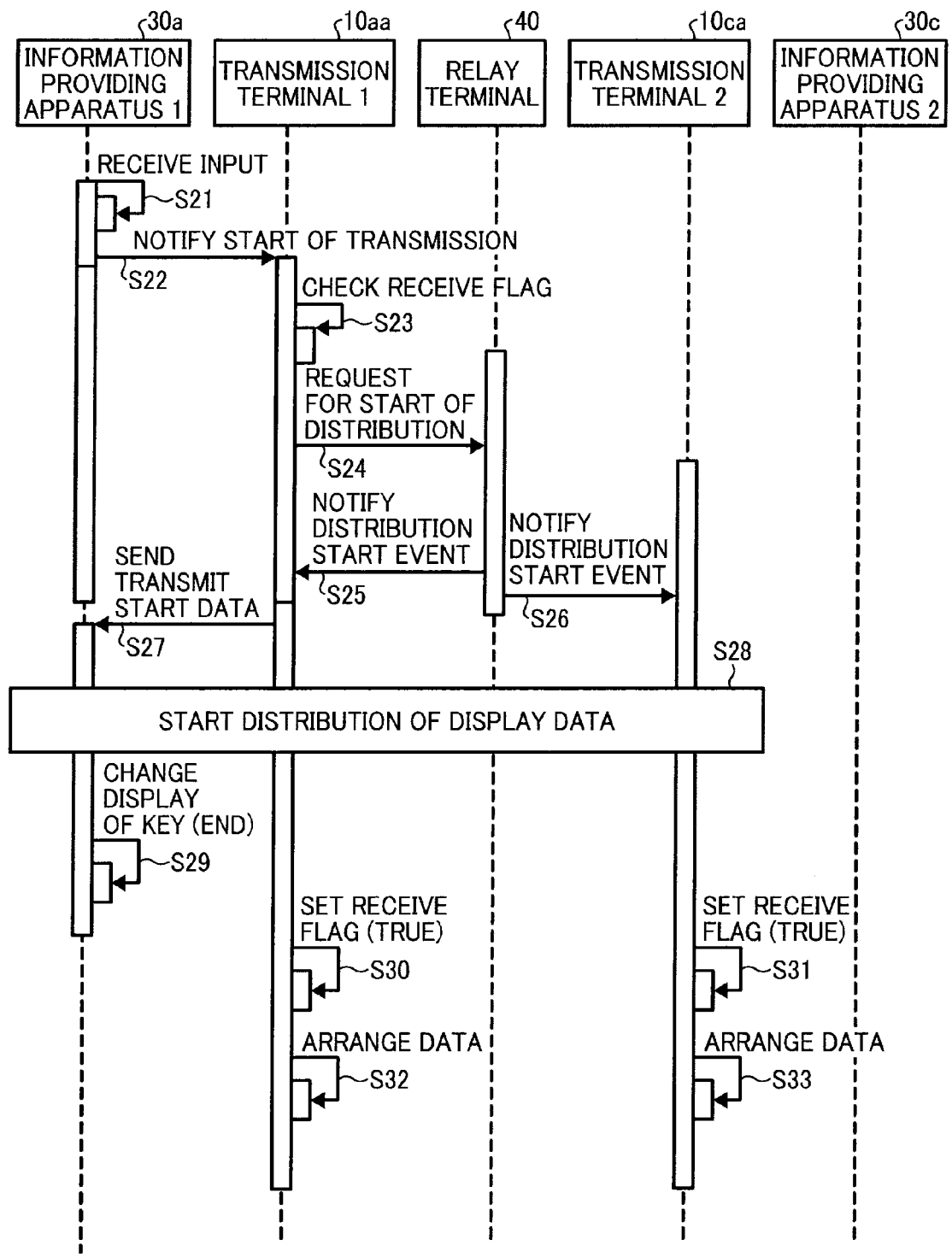
FIG. 27 is a data sequence diagram illustrating operation of transmitting display data from the information providing apparatus to the terminal, performed by the transmission system of FIG. 5, according to an example embodiment of the present invention.

FIG. 27 is a data sequence diagram illustrating operation of transmitting display data from the information providing apparatus 30 to the terminal 10, according to an example embodiment of the present invention. In this example, it is assumed that the first terminal 10aa at a first site communicates with the second terminal 10ca at a second site via the relay device 40. Further, the first information providing apparatus 30a, which is provided at the first site, establishes the Bluetooth communication with the first terminal 10aa. The second information providing apparatus 30c, which is provided at the second site, establishes the Bluetooth communication with the second terminal 10ca. The following explains the example case in which the display data, which is transmitted from the first information providing apparatus 30a to the first terminal 10aa, is shared among the terminals 10 participating in videoconference such as the second terminal 10ca.

The external information determiner 20 of the terminal 10 stores the value of a receive flag in a memory such as the RAM 103, which indicates whether transmission of the display data is completed at the counterpart terminal 10 based on information received from the relay device 40. The value of the receive flag indicates whether the display data is being transmitted from the information providing apparatus 30. The receive flag "true" indicates that the display data is being transmitted. The receive flag "false" indicates that the display data is not transmitted. The receive flag is initially set to "false".

At S21, the operation input 33 of the first information providing apparatus 30a receives a user instruction for starting transmission of image data being displayed on the display 306, through selection of the start button B31. At S22, the display data obtainer 35 of the information providing apparatus 30a transmits notice to the terminal 10aa, which indicates that transmission of display data is started.

At S23, the first terminal 10aa, which receives the notice indicating starting of transmission of display data, checks a status of a receive flag at the external information determiner 20.

When the status of the receive flag is false, at S24, the first terminal 10aa sends a distribution start request to the relay device 40, which requests starting of transmission of display data to the counterpart terminal 10 such as the second terminal 10ca. The relay device 40 is previously selected by the selection unit 18 of the first terminal 10aa as described above referring to FIG. 5. The first terminal 10aa refers to the management table 231 to obtain the terminal ID of the second terminal 10ca, and obtains the address information of the second terminal 10ca such as an IP address or a domain name of the second terminal 10ca using the obtained terminal ID. The first terminal 10aa transmits address information of the first terminal 10aa and the address information of the second terminal 10ca to the relay device 40 to request the relay device 40 to transmit the display data to the second terminal 10ca.

When the distribution start request is received from the first terminal 10aa, at S25 and S26, the relay device 40 sends a distribution start event to each one of the first terminal 10aa that sends the distribution start request and the second terminal 10ca that is communicating with the first terminal 10aa.

When the distribution start event is received from the relay device 40, at S27, the external information determiner 20 of the first terminal 10aa sends transmit start data, which requests the information providing apparatus 30a to start transmitting the display data.

At S28, the display data communicator 36 of the first information providing apparatus 30a transmits display data obtained by the display data obtainer 35 to the second terminal 10ca through the first terminal 10aa.

More specifically, the display data obtainer 35 of the first information providing apparatus 30a obtains image data of a screen being displayed on the display 306 as display data. The display data communicator 36 transmits the display data obtained by the display data obtainer 35 to the first terminal 10aa through the Bluetooth transmit/receive 32.

When the first terminal 10aa receives the display data from the first information providing apparatus 30a through the Bluetooth communication, the external information determiner 20 outputs the display data to the data transmit/receive 11. The data transmit/receive 11 transmits the display data, with captured image data captured by the imaging unit 14 and sound data captured by the sound input 15, to the relay device 40 through the communication network 2.

The relay device 40 transmits the conference data received from the first terminal 10aa to each one of the terminals 10 that are communicating, which includes the display data received from the first information providing apparatus 30a. The display control 17 of the first terminal 10aa displays the display data, which is received from the relay device 40, instead of displaying the display data received directly from the first information providing apparatus 30*a*. In a substantially similar manner, the display control 17 of the first terminal 10*aa* displays the captured image data, which is received from the relay device 40, instead of displaying the captured image data captured by the camera 113.

By displaying the conference data based on the conference data received from the relay device 10, the time at which the display data is received and displayed at each terminal 10 will be substantially the same for all the terminals 10 that are communicating. For example, assuming that the user at the information providing apparatus 30*a* displays a next page of the presentation material of the display data, the screen being displayed at each terminal 10 reflects the change in page being displayed at substantially the same time. Further, the screen at each site reflects the captured image data that is captured at each site at substantially the same time.

Figure 28A:
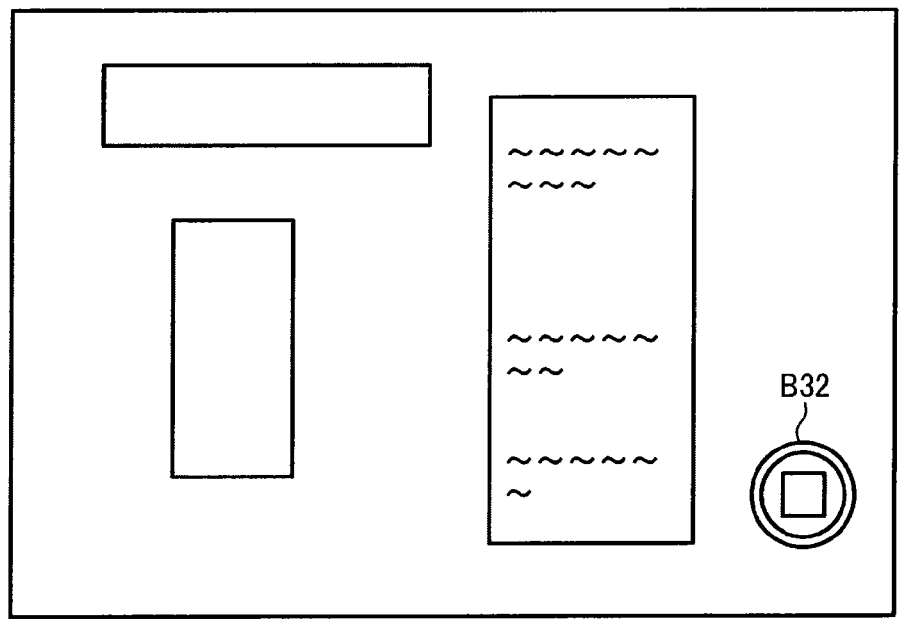
FIG. 28A is an example screen, displayed on the display of the information providing apparatus, which includes a stop button to allow the user to stop transmission of display data.
Figure 28B:
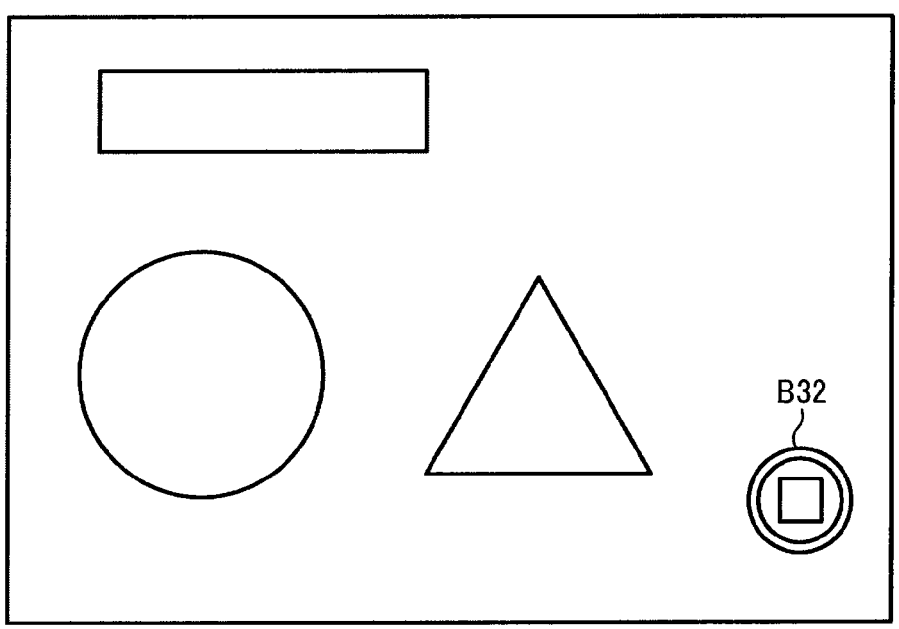
FIG. 28B is an example screen, displayed on the display of the information providing apparatus, which includes a stop button to allow the user to stop transmission of display data.

Referring back to FIG. 27, as the display data communicator 36 starts transmission of the display data, at S29, the display data obtainer 35 changes the start button B31 (FIGS. 26A and 26B) being displayed on the display 306 of the first terminal 10*aa* to a stop button B32 (FIGS. 28A and 28B). The stop button B32 is used to instruct the information providing apparatus 30 to stop transmission of the display data. For example, in case the display 306 of the information providing apparatus 30 displays the screen of FIG. 26A, the screen of FIG. 26A may be switched to a screen of FIG. 28A including the stop button B32 in replace of the start button B31. In case the display 306 of the information providing apparatus 30 displays the screen of FIG. 26B, the screen of FIG. 26B may be switched to a screen of FIG. 28B including the stop button B32 in replace of the start button B31. When the stop button B31 is selected by the user, transmission of the display data is stopped.

Referring back to FIG. 27, at S30 and S31, for the terminal 10 that is receiving the display data from the information providing apparatus 30*a*, the external information determiner 20 sets the receive flag to "true".

At S32 and S33, the display control 17 arranges image data to be displayed on the screen such as the display data or the captured image data. More specifically, as described above referring to FIG. 13, the display 130 of the terminal 10 may display the display data transmitted from the information providing apparatus 30*a* in the first display area A21, while displaying the captured image data of each terminal 10 in the second display areas A22 and A23.

By displaying the start button B31 on the screen, which instructs transmission of image data of the screen being displayed on the display 306, the user at the information providing apparatus 30 can easily instruct the information providing apparatus 30 to start transmission of the display data. Further, the information providing apparatus 30 changes between the start button B31 and the stop button B32, depending on whether the display data is being transmitted or not. With this button reflecting transmission of the display data, the user may be prevented from instructing the information providing apparatus 30 to transmit the display data, which should not be public, by mistake.

Referring now to FIG. 29, operation of switching the state in which the display data received from the first information providing apparatus 30*a* is displayed, to the state in which the display data received from the second information providing apparatus 30*c* is displayed, performed by the transmission system of FIG. 1, is explained according to an example embodiment of the present invention. In this example, it is assumed that operation of FIG. 29 is performed after operation of FIG. 27, in response to a user instruction for starting transmission of display data at the second terminal 10*ca*.

At S41, the operation input 33 of the second information providing apparatus 30*c* receives a user instruction for selecting the start button B31. At S42, the display data obtainer 35 of the second information providing apparatus 30*c* sends notification to the second terminal 10*ca*, which indicates starting of transmission of the display data.

At S43, the second terminal 10*ca*, which receives the notification indicating starting of transmission of the display data, checks the value of the receive flag using the external information determiner 20. When it is determined that the value of the receive flag is "true", at S44, the external information determiner 20 transmits a distribution end request, which requests the relay device 40 to stop transmission of the display data to the relay device 40.

When the distribution end request is received from the second terminal 10*ca*, at S45 and S46, the relay device 40 transmits a distribution end event to each one of the terminals 10 that are communicating. The distribution end event notifies stopping of distribution of the display data.

At S47 and S48, the external information determiner 20 of the terminal 10 that receives the distribution end event transmits transmission end data to the information providing apparatus 30, which requests to stop transmission of the display data.

At S49, the display data obtainer 35 of the first information providing apparatus 30*a*, which is transmitting the display data, stops transmission of the display data in response to the transmission end data.

Further, when the transmit end data is received, at S50 and S51, the display data obtainer 35 of each of the information providing apparatuses 30*a* and 30*c* changes a screen of the display 306 such that the start button B31 is displayed in replace of the stop button B32. For example, in alternative to displaying the stop button B32 on the display 306 of the first information providing apparatus 30*a* as illustrated in FIG. 28A, the first information providing apparatus 30*a* displays the start button B31 as illustrated in FIG. 26A. The second information providing apparatus 30*c*, which has been displaying the start button B31, continues to display the start button B31 as illustrated in FIG. 26A.

At S52 and S53, the external information determiner 20 of the terminal 10 sets the value of the receive flag to "false". At S54 and S55, the display control 17 clears the display data being displayed on the first display area A21 of the screen, and rearranges a location of the captured image data of each terminal 10 on the screen.

At S56, the external information determiner 20 of the second terminal 10*ca* transmits a distribution start request to the relay device 40. S57 to S65 are performed in a substantially similar manner as described above referring to S25 to S33 of FIG. 27.

As the display data received from the second information providing apparatus 30*c* is distributed to each terminal 10, the display control 17 of each terminal 10 arranges a layout of the screen such that the display data of the second information providing apparatus 30*c* is displayed in the first display area A21 and the captured image data of each terminal 10 in the second display area.

As described above, even when the display data received from the first information providing apparatus 30*a* is being displayed at each terminal 10, as the user instructs for starting distribution of the display data of the second information providing apparatus 30*c*, the display at each terminal changes the display from a screen displaying the display data of the first information providing apparatus 30a, to a screen displaying the display data of the second information providing apparatus 30c.

Referring now to FIG. 30, operation of stopping transmission of the display data being transmitted from the information providing apparatus 30, performed by the transmission system 1, is explained according to an example embodiment of the present invention. The operation of FIG. 30 is performed after performing the operation of FIG. 29, when the user selects the stop button B32 at the information providing apparatus 30c.

At S71, the operation input 33 of the second information providing apparatus 30c receives a user instruction for stopping transmission of display data being displayed on the display 306, through selection of the stop button B32. At S72, the display data obtainer 35 of the information providing apparatus 30c transmits notice to the second terminal 10ca, which indicates that transmission of display data is stopped. S73 to S85 are performed in a substantially similar manner as described above referring to S43 to S55 of FIG. 29.

As transmission of the display data from the information providing apparatus 30c is stopped, each terminal 10 displays only the captured image data of the terminals 10. For example, the terminal 10 may display a screen of FIG. 12, which arranges the image data of the user who is currently speaking in the first display area A21. By selecting the stop button B32, the user at the information providing apparatus 30 can easily stop transmission of the display data to the terminal 10.

In the above-described example illustrated in FIGS. 27, 29, and 30, the user just brings the information providing apparatus 30 into close proximity to the terminal 10 to start sharing the image data being displayed at the information providing apparatus 30 with the other terminals 10. The user does not have to previously connect the information providing apparatus 30 with the terminal 10 through the communication network 2, thus reducing the workload of the user in preparing for videoconference. Further, the administrator of the transmission system 1 does not have to provide any additional network infrastructure, which may otherwise be required to connect the information providing apparatus 30 with the terminal 10.

In the above-described example, the terminal 10 sends the distribution start request or the distribution end request to the relay device 40 according to a user instruction received from the information providing apparatus 30. Accordingly, the relay device 40 does not have to manage information indicating which one of the terminals 10 is transmitting the display data received from the information providing apparatus 30. This suppresses the workload of the relay device 40 such that one relay device 40 is able to manage a larger number of terminals 10, thus improving scalability of the transmission system 1.

In the above-described example, a graphical user interface (GUI) that allows the user to instruct whether to start transmission or stop transmission is displayed on the display 306 in the form of button. Alternatively, the GUI for instructing whether to start or stop transmission may be displayed in the form of a menu. Alternatively, the start button B31 and the stop button B32 may be labeled, respectively, with text data "Start image sharing" and "End image sharing". Alternatively, the start button B31 and the stop button B32 may be displayed together with the text data indicating a status of transmission of the display data such as "Image can be shared" and "Image is being shared".

As described above, in one example, the user brings the information providing apparatus 30 into close proximity to the MFP 80 to cause the MFP 80 to scan a paper document into scanned image data and send the scanned image data to the information providing apparatus 30. The information providing apparatus 30 stores the scanned image data in a predetermined memory area, and registers association information indicating the association between a file name and a memory area of the scanned image data in the file management table. The user further brings the information providing apparatus 30 into close proximity to the terminal 10 to cause the information providing apparatus 30 to transmit image data, i.e., display data to the terminal 10. The terminal 10 shares the display data received from the information providing apparatus 30 with the counterpart terminal 10. In this manner, the image data, even when it is originally provided in a paper form, can be easily shared among the terminals 10 during videoconference.

Figure 31:
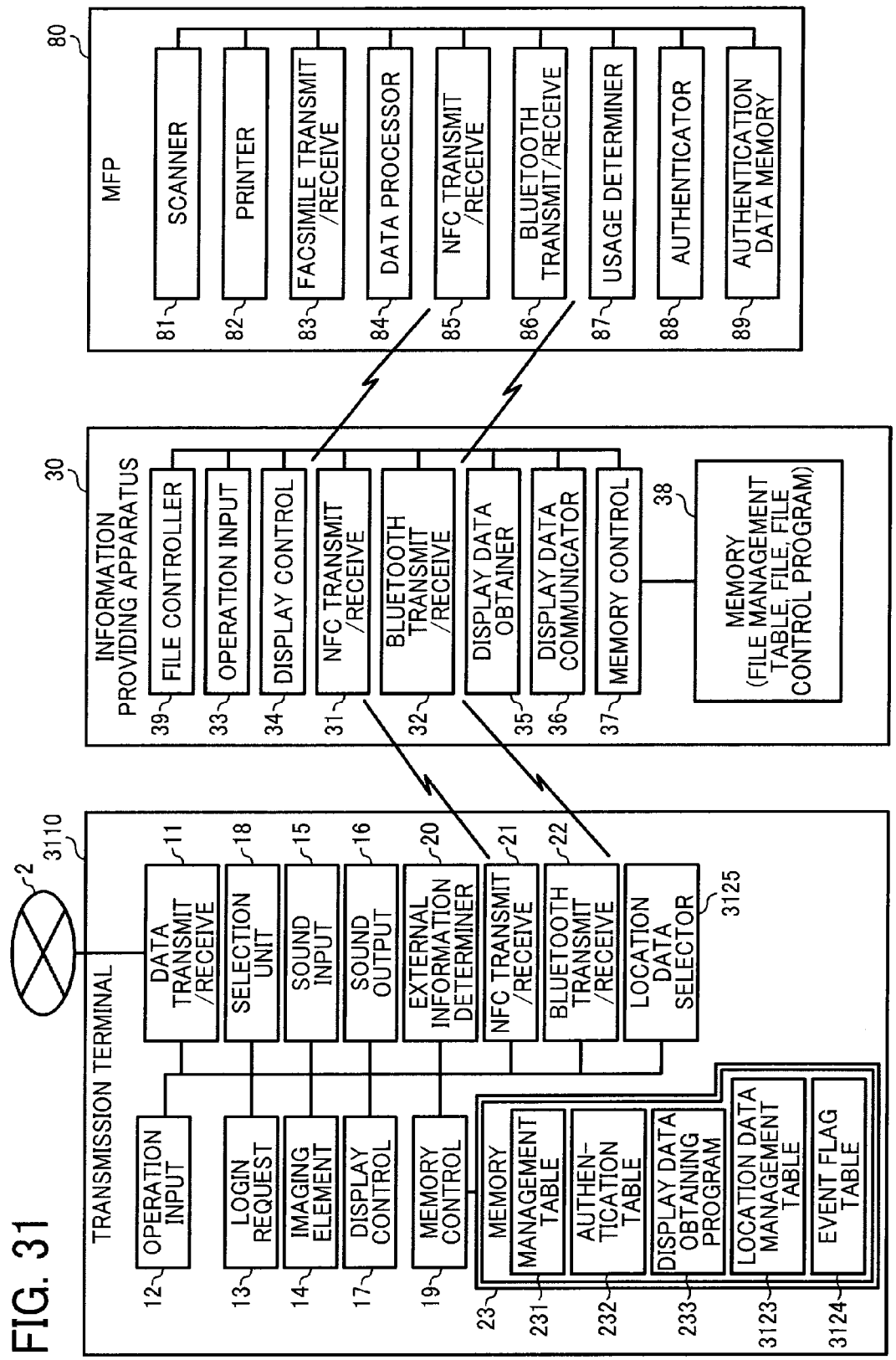
FIG. 31 is a schematic block diagram illustrating functional structures of the transmission terminal, the information providing apparatus, and the image forming apparatus of FIG. 1, according to an example embodiment of the present invention.

FIG. 31 is a schematic block diagram illustrating functional structures of a terminal 3110, the information providing apparatus 30, and the MFP 80, according to an example embodiment of the present invention. In this example, operation of controlling transmission of display data received from the information providing apparatus 30 is performed differently than the above-described operation.

As illustrated in FIG. 31, the terminal 3110 includes the data transmit/receive 11, the operation input 12, the login request 13, the imaging unit 14, the sound input 15, the sound output 16, the display control 17, the selection unit 18, the memory control 19, the external information determiner 20, a location data selector 3125, the NFC transmit/receive 21, and the Bluetooth transmit/receive 22. These units shown in FIG. 31 correspond to a plurality of functions or functional modules, which are executed according to an instruction of the CPU 101 (FIG. 2) that is generated according to the terminal control program being loaded from the flash memory 104 onto the RAM 103. The terminal 3110 further includes a memory 23, which may be implemented by the SSD 105 of FIG. 2.

In this example, the data transmit/receive 11, the operation input 12, the login request 13, the imaging unit 14, the sound input 15, the sound output 16, the display control 17, the selection unit 18, the memory control 19, the external information determiner 20, the NFC transmit/receive 21, and the Bluetooth transmit/receive 22 are substantially similar in function and operation to those units described above referring to FIG. 5.

The memory 23 includes the management table 231, the authentication table 232, the display data obtaining program 233, the driver that transmits or receives data, a location data management table 3123, and an event flag table 3124. The management table 231, the authentication table 232, the display data obtaining program 233, the driver for data transmission or reception are substantially similar in function and operation to those described above referring to FIG. 5.

The location data selector 3125 sends location data indicating a specific location of a screen in which the image data is displayed, to the display control 17. Based on the location data, the display control 17 displays the image data such as the captured image data and the display data at a specific area on the screen. More specifically, the location data selector 3125 selects the value of a shared flag stored in the event flag table 3124 based on a type of display data distribution event, and obtains location data that is associated with the selected value of the shared flag using the location data management table 3123.

Now, operation of controlling display of the display data is explained according to an example embodiment of the present invention.

Figures 32, 33:
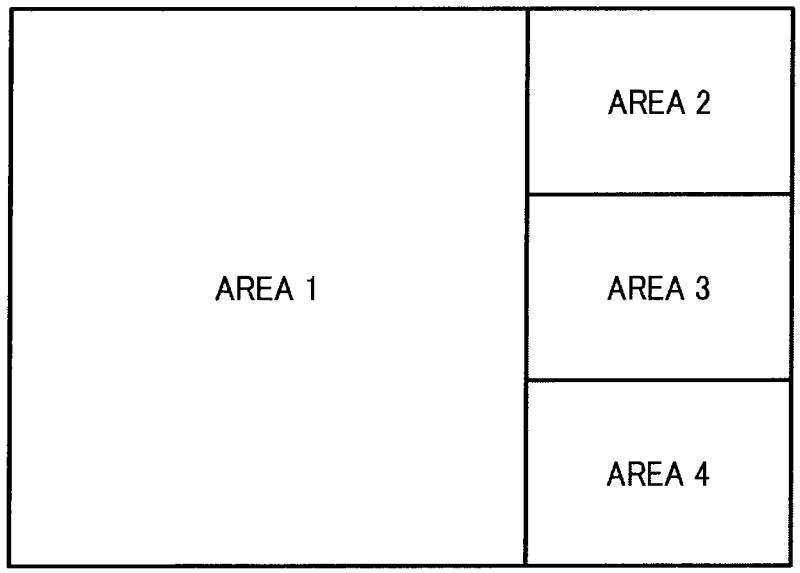
FIG. 32 is an example data structure of a location data management table, managed by the terminal of FIG. 31.
FIG. 33 is an example screen displayed by the terminal of FIG. 31.

FIG. 32 illustrates an example data structure of the location data management table 3123 stored in the memory 23. The location data management table 3123 stores information to be used for managing arrangement of the display data when the display data is displayed on the screen. The location data management table 3123 stores, for each one of location data numbers, location data and a shared flag value in association with each other.

The location data number is identification information that uniquely identifies each record of the information stored in the location data management table 3123. The location data is information indicating specific location at which the captured image data or the display data is displayed on a screen. The location data includes the value "VIEW_MULTI" and the value "SHARED_MULTI". When the value "VIEW_MULTI" is selected, the captured image data of the terminal 3110 is displayed. When the value "SHARED_MULTI" is selected, the captured image data of each terminal 3110 and the display data are displayed.

The value of shared flag is determined by the location data selector 3125. Using the event flag table 3124 of FIG. 36, the location data selector 3125 selects the value of shared flag based on a type of distribution event that is detected, and further obtains the location data that is associated with the obtained value of shared flag. More specifically, as illustrated in FIG. 36, the value of shared flag is determined so as to reflect a specific event regarding distribution of the display data.

The terminal 3110 receives the display data, either from the information providing apparatus 30 that is connected to the terminal 3110 or from the information providing apparatus 30 that is connected to the other terminal 3110, through the relay device 40. In either of these cases, the shared flag has the value "SHARED". When the terminal 3110 does not receive any display data, the shared flag has the value "UNSHARED".

In the location data management table 3123, the shared flag value "SHARED" is associated with the "SHARED_MULTI" of the location data. The shared flag value "UNSHARED" is associated with the "VIEW_MULTI" of the location data.

In alternative to the example case illustrated in FIG. 32, the shared flag value and the location data may be associated in various other ways. For example, the different values "SHARED 1" and "SHARED 2" of shared flag may be assigned to the first case in which the terminal 3110 receives the display data from the information providing apparatus 30 connected to the terminal 3110, and the second case in which the terminal 3110 receives the display data from the information providing apparatus 30 connected to the other terminal 3110, respectively. The shared flag values "SHARED 1" and "SHARED 2" may be associated with location data that are different from each other. The location data management table 3123 may be set by any user at the terminal 3110.

FIG. 33 illustrates an example screen, which may be displayed on the display 130 of the terminal 3110. The screen of FIG. 33 includes a plurality of areas 1 to 4, with the area 1 having a size larger than that of the other area. In this example, the captured image data or the display data may be displayed on one of the areas 1 to 4 such that up to four different image data may be displayed on the screen. The location data is used to assign one of the areas 1 to 4 to each of image data to be displayed on the screen.

In this example, for each one of the location data managed by the location data management table 3123, arrangement of captured image data or display data to each area on the screen of FIG. 33 is defined as illustrated in FIG. 34.

In case of the location data "VIEW_MULTI", the first captured image data 1, the second captured image data 2, etc. are respectively assigned to the areas 1, 2, etc. More specifically, the captured image data of the terminals 10 that are communicating are respectively assigned to the areas 1 to 4 in a predetermined order. For example, assuming that the first and second terminals 3110 are connected through the management system 50 to carry out videoconference, the screen of FIG. 33 includes the captured image data of one of the two terminals 3110 in the area 1, and the captured image data of the other one of the two terminals 3110 in the area 2. For example, at the first terminal 3110, the display control 17 displays the image data of the user at the second terminal 3110 in the area 1, and the image data of the user at the first terminal 3110 in the area 2.

In another example, the display control 17 displays the captured image data of the user who is currently speaking in the area 1, which is captured by the imaging unit 14 of the terminal 3110. For example, when the sound input 15 of the first terminal 3110 detects a sound signal that is greater than a predetermined level, the data transmit/receive 11 of the first terminal 3110 sends the terminal ID of the first terminal 3110 to the relay device 40. The relay device 40 transmits the terminal ID of the first terminal 3110 to the terminals 3110 participating in the videoconference. Based on the received terminal ID of the first terminal 3110, each terminal 3110 is able to specify the captured image data of the first terminal 3110 to be displayed in the first area 1. In alternative to transmitting the terminal ID of the first terminal 3110 to the relay device 40, the first terminal 3110 may transmit the terminal ID to the management system 50. In such case, the management system 50 manages each terminal 3110 to display the captured image data of the first terminal 3110 in the area 2. In this example, the captured image data of the user who is not currently speaking, which is obtained at the other terminal 3110, is displayed in the area 2.

In case of the location data "SHARED_MULTI", the display data is assigned to the area 1, while the captured image data are respectively assigned to the areas 2 to 4. For example, assuming that the first and second terminals 3110 are connected through the management system 50 to carry out videoconference, the screen of FIG. 33 includes the captured image data of one of the two terminals 3110 in the area 2, and the captured image data of the other one of the two terminals 3110 in the area 3. The display data is assigned with the first area 1.

The location data selector 3125 sets the value of shared flag to "SHARED" or "UNSHARED", depending on a type of display data distribution event. The distribution event indicates whether the terminal 3110 receives the display data from the information providing apparatus 30 connected to the terminal 3110, or receives the display data from the information providing apparatus 30 connected to the other terminal 3110. Further, in this example, the value of shared flag may be set to "SHARED", "1", or "ON", when the display data is being transmitted. The value of shared flag may be set to "UNSHARED", "0", or "OFF", when the display data is not transmitted.

When the value of shared flag is updated, the location data selector 3125 refers to the location data management table 3123 to obtain the location data that is associated with the updated value of shared flag. Based on the obtained location data, the location data selector 3125 causes the display control 17 to change layout of the image data, such as the captured image data or the display data, on the screen.

FIG. 35 illustrates the transitional change in state of the location data selected by the location data selector 3125. The initial state of the location data may be set to either the location data number "1" or the location data number "2", depending on whether the terminal 3110 receives the display data after being executed. As illustrated in FIG. 35, assuming that the initial state of the location data is the location data number "1", and the location data selector 3125 sets the value of shared flag to "SHARED", the location data selector 3125 selects the location data number "2". Assuming that the initial state of the location data is the location data number "2", and the location data selector 3125 sets the value of shared flag to "UNSHARED", the location data selector 3125 selects the location data number "1". Assuming that the initial state of the location data is the location data number "1", and the location data selector 3125 sets the value of shared flag to "UNSHARED", the location data selector 3125 selects the location data number "1". Assuming that the initial state of the location data is the location data number "2", and the location data selector 3125 sets the value of shared flag to "SHARED", the location data selector 3125 selects the location data number "2".

In addition to controlling display of the image data on the display 130, the terminal 3110 controls display of a screen such as a menu to be displayed on the display 306 of the information providing apparatus 30. The event flag table 3124 of FIG. 36 additionally stores, for each type of display data distribution event, the value of display control flag that is determined by the display control 17 in association with the value of shared flag that is determined by the location data selector 3125.

Examples of the distribution event, which is sent from the relay device 40, include the distribution start event transmitted from the terminal 3110 ("distribution start event"), the distribution start event transmitted from the other terminal 3110 ("distribution start from another event"), the distribution end event transmitted from the terminal 3110 ("distribution end event"), and the distribution end event transmitted from the other terminal 3110 ("distribution end from another event"). The value of shared flag is "SHARED" for the two types of distribution start event. The value of shared flag is "UNSHARED" for the two types of distribution end event.

The value of display control flag is "SHARED" for the first type of distribution start event "distribution start event". The value of display control flag is "SHARED_ANOTHER" for the second type of distribution start event "distribution start from another event". The value of display control flag is "UNSHARED" for the two types of distribution end event.

The terminal 3110 obtains the value of display control flag that is associated with the specific type of event from the event flag table 3124, and transmits the obtained value of the display control flag to the information providing apparatus 30. The display control 34 of the information providing apparatus 30 changes a menu to be displayed on the display 306, according to the value of display control flag.

Figures 37A, 37B:
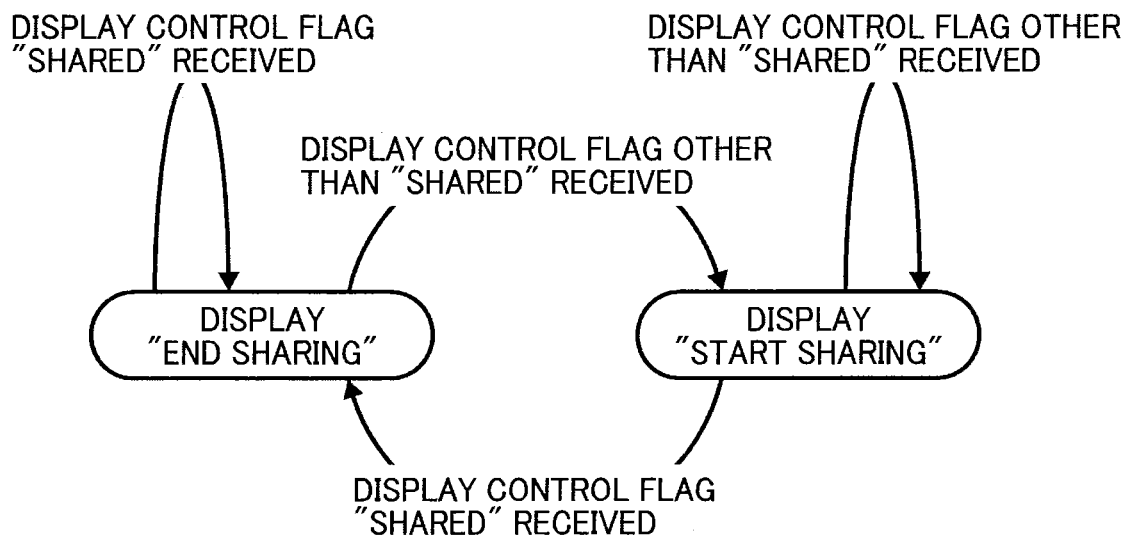
FIG. 37A is an illustration for explaining the transitional change in menu being displayed on the display of the information providing apparatus of FIG. 31.
FIG. 37B is an example data structure of association information indicating an association between the value of display control flag and shared state information.

FIG. 37A illustrates the transitional change in state of the menu to be displayed at the information providing apparatus 30. Information regarding the transitional change may be stored in the memory 38 in the form of transitional change table. The display 306, when executed, displays the menu "start sharing" based on assumption that the display data is not transmitted to the terminal 3110. The menu "start sharing" is a menu that starts sharing of display data being displayed on the display 306 among the terminals 3130, when selected. As described above referring to FIGS. 28A and 28B, the menu "start sharing" may be implemented by the "start sharing" button such as the start button B32, which is selected by the user to instruct transmission of display data.

Still referring to FIG. 37A, when the information providing apparatus 30, which displays the menu "start sharing" on the display 306, receives the display control flag "SHARED" from the terminal 3130, the display control 34 of the information providing apparatus 30 displays the menu "end sharing". When selected, the menu "end sharing" stops transmission of the display data being displayed on the display 306 with the other terminals 3110 to which the information providing apparatus 30 is not connected. As described above referring to FIGS. 26 and 28, the menu "end sharing" may be implemented by the stop button B32, which is selected by the user to instruct distribution of display data to be stopped.

Referring to FIG. 37A, when the information providing apparatus 30 receives the display control flag "UNSHARED" or "SHARED_ANOTHER" from the terminal 3130 while displaying the menu "end sharing", the display control 34 of the information providing apparatus 30 displays the menu "start sharing" to wait for a user instruction that starts sharing of display data.

When the information providing apparatus 30 receives the display control flag other than "SHARED" from the terminal 3130 while the menu "start sharing" is displayed, the display control 34 of the information providing apparatus 30 continues to display the menu "start sharing". When the information providing apparatus 30 receives the display control flag "SHARED" from the terminal 3130 while the menu "end sharing" is displayed, the display control 34 of the information providing apparatus 30 continues to display the menu "end sharing".

As described above, the display control flag is associated with each type of distribution event. Using this association information, the terminal 3110 selects the value of display control flag that is associated with a specific distribution event, and sends the display control flag to the information providing apparatus 30. The display control 34 of the information providing apparatus 30 determines appearance of the screen to be displayed on the display 306 of the information providing apparatus 30 based on the value of display control flag, such as whether to display the menu "start sharing" or the menu "end sharing".

The display control 34 may display shared state information indicating a current state of sharing the display data based on the value of display control flag, in addition to the button that reflects the menu "start sharing" or "end sharing".

FIG. 37B illustrates example shared state information indicating a state of sharing the display data, in association with the value of display control flag. The association information of FIG. 37B is stored in the memory 38, for example, together with the transitional change table of FIG. 37A. As described below referring to FIGS. 39A to 39D, the shared state information is displayed on the screen of the display 306 in the form of message such that the user is able to instantly recognize the current state of sharing the display data. In this example, there are three types of shared states including: (a) the terminal 3110 does not share any display data ("UNSHARED"); (b) the terminal 3110 shares the display data of the information providing apparatus 30 connected to the terminal 3110 (SHARED); and (c) the terminal 3110 shares the display data of the information providing apparatus 30 connected to the other terminal 3110 (SHARED_ANOTHER).

FIG. 38 is a data sequence diagram illustrating operation of controlling display of a screen at the terminal 3110 and a screen at the information providing apparatus 30, performed by the transmission system of FIG. 31, according to an example embodiment of the present invention. In this example, it is assumed that the first terminal 3110aa is having videoconference with the second terminal 3110ca through the relay device 40. The first information providing apparatus 30a is provided at a site where the first terminal 3110aa is provided. The second information providing apparatus 30c is provided at a site where the second terminal 3110ca is provided.

Unless the terminal 3110 starts receiving the display data, the location data selector 3125 selects the location data number "1", which corresponds to the display flag value "UNSHARED" of the location data management table 3123. In such case, the terminal 3110 displays the captured image data of each of the first terminals 3110aa and second terminal 3110ca on the display 130.

More specifically, referring back to FIG. 12, the display control 17 displays the captured image data of the first terminal 3110aa and the second terminal 3110ca, which are respectively received from the relay device 40, on the respective display areas of the screen. The display control 17 may select one of the captured image data to be displayed in the first display area A21, based on whether which site of the user is currently speaking or according to the user instruction that may be input through the operation input 12.

Unless the terminal 3110 detects a distribution event, the display control 17 does not send any information regarding the display control flag to the information providing apparatus 30, or sends the "UNSHARED" display control flag to the information providing apparatus 30. Accordingly, the display control 34 of the information providing apparatus 30 displays the menu "start sharing" on the display 306, which is associated with the display control flag "UNSHARED" that may be initially set or may be set according to the "UNSHARED" display control flag received from the terminal 3110.

FIGS. 39A to 39D illustrate example screens that may be displayed on the display 306 of the information providing apparatus 30. Each of the screens of FIGS. 39A to 39D include a first menu 401 and a second menu 402. The first menu 401 displays thereon the menu "start sharing" or "end sharing", which causes, when selected by the user, to change the state of sharing the display data. The second menu 402 displays thereon a message that describes the current state of sharing the display data.

Figure 39A:
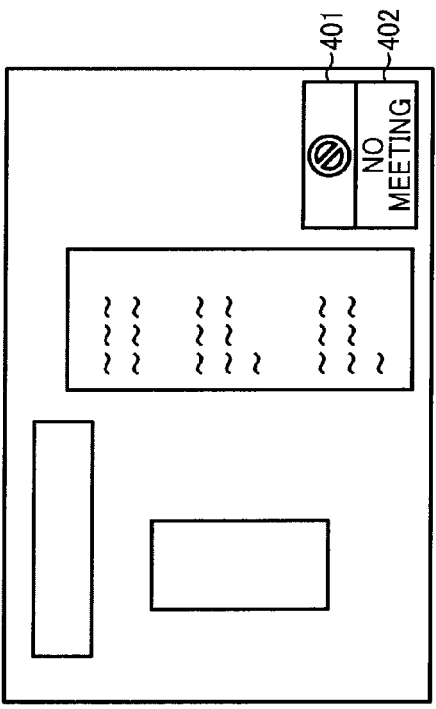
FIGS. 39A to 39D are example screens, displayed on the display of the information providing apparatus.

When there is no session established with the outside apparatus, the display 306 displays the screen of FIG. 39A. The first menu 401 shows a mark indicating that there is no information regarding sharing of the display data. The second menu 402 displays thereon the message "no meeting" to indicate that there is no conference being performed.

Figure 39B:
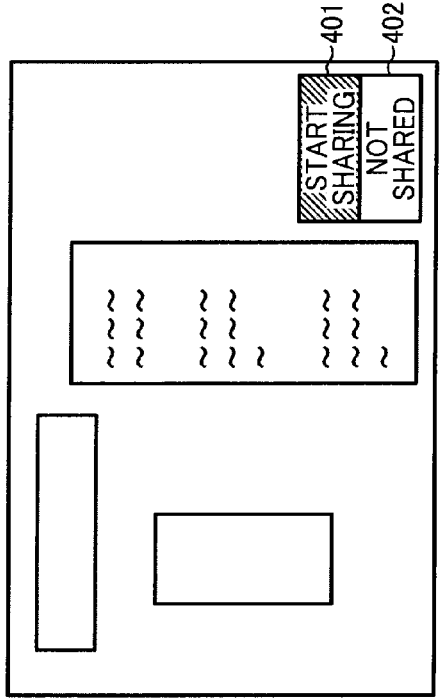

The screen of FIG. 39B is displayed when the display data is not shared among the terminals 3110. The screen of FIG. 39B displays presentation data that may be read out from the memory of the information providing apparatus 30, and a window displaying the state of the information providing apparatus 30. The first menu 401 displays thereon the "start sharing" button, which allows the user to request sharing of the display data when selected. The second menu 402 displays thereon the message "not shared" to indicate that the display data is not shared. When the user decides to share the display data being displayed on the screen with the other terminals 3110, the user selects the "start sharing" button 401. When selection of the "start sharing" button 401 is detected, the information providing apparatus 30 starts transmission of the display data to the terminal 3110. The user may select the "start sharing" button 401 by touch panel such as touching the operation panel 309 (FIG. 3) or by using the operation button 308 (FIG. 3) such as an operation key.

Referring back to FIG. 38, at S3801, the operation input 33 of the first information providing apparatus 30a receives a user instruction for selecting the "start sharing" button displayed on the display 306. At S3802, the display data communicator 36 sends notice indicating that transmission of the display data is started to the first terminal 3110aa, and starts transmitting the display data to the first terminal 3110aa.

At S3803, the display control 17 of the first terminal 3110aa requests the relay device 40 to start transmission of the display data, and starts transmitting the display data to the relay device 40.

At S3804, the relay device 40 sends notice including the "distribution start event" to the first terminals 3110aa, and starts transmitting the display data to the first terminal 3110aa. The relay device 40 may apply processing to the display data received from the first terminal 3110aa so as to change image quality of the display data, before transmitting the display data to the first terminal 3110aa.

When the first terminal 3110aa receives the distribution start event, at S3805, the first terminal 3110aa refers to the event flag table 3124 to set the shared flag value to "SHARED". At S3806, the location data selector 3125 of the first terminal 3110aa selects the location data number "2" in the location data management table 3123 using the shared flag "SHARED", and instructs the display control 17 to assign the captured image data and the display data to respective display areas of the screen to be displayed. More specifically, the display 130 of the first terminal 3110aa switches the screen of FIG. 12 to the screen of FIG. 13. Referring to FIG. 13, the display data received from the first information providing apparatus 30a is displayed in the first display area, and the captured image data of the first and second terminals 3110aa and 3110ca are respectively displayed in the second display areas.

At S3807, the display control 17 of the first terminal 3110aa refers to the event flag table 3124 to set the display control flag to "SHARED" according to the "distribution start event", and sends notice including the display control flag "SHARED" to the first information providing apparatus 30a.

At S3808, the display control 34 of the first information providing apparatus 30a refers to the transitional change table of FIG. 37A to determine whether display of the first menu 401 is changed according to the value of display control flag.

In this example, as illustrated in FIG. 39B, the first information providing apparatus 30a receives the display control flag "SHARED", while the "start sharing" button is being displayed. In such case, at S3809, the display control 34 changes display of the first menu 401 such that the first menu 401 displays the "stop sharing" button, for example, as illustrated in FIG. 39C.

Figure 39C:
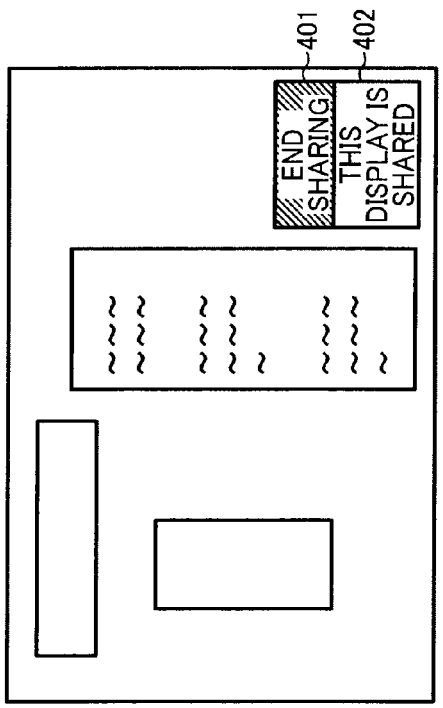

At S3810, the display control 34 causes the second menu 402 to display the message "This display is shared", according to the display control flag "SHARED", for example, as illustrated in FIG. 39C.

At S3811, the relay device 40 sends notice including the "distribution start from another event" to the second terminal 3110ca, and starts transmitting the display data to the second terminal 3110ca. The relay device 40 may apply processing to the display data received from the first terminal 3110aa so as to change image quality of the display data, before transmitting the display data to the second terminal 3110ca.

When the second terminal 3110ca receives the "distribution start from another event", at S3812, the second terminal 3110ca determines whether to request the relay device 40 to stop distribution of the display data received from the second information providing apparatus 30c. This process is needed when the second terminal 3110ca is distributing the display data received from the second information providing apparatus 30c to the other terminal. In such case, since only the display data received from one information providing apparatus 30 is shared at a time, this process of determining which display data is to be shared is performed. In this example, it is determined that the request for stopping distribution of the display is not necessary, as the shared flag value is set to "UNSHARED".

At S3813, the location data selector 3125 of the second terminal 3110ca refers to the event flag table 3124 to set the shared flag value to "SHARED", based on the received "distribution start from another event".

At S3814, the location data selector 3125 of the second terminal 3110ca selects the location data number "2" in the location data management table 3123 using the shared flag "SHARED", and instructs the display control 17 to assign the captured image data and the display data to respective display areas of the screen to be displayed. As described above referring to S3806, the display 130 of the second terminal 3110ca switches the screen of FIG. 12 to the screen of FIG. 13.

At S3815, the display control 17 of the second terminal 3110ca refers to the event flag table 3124 to set the display control flag to "SHARED_ANOTHER" according to the "distribution start from another event", and sends notice including the display control flag "SHARED_ANOTHER" to the second information providing apparatus 30c.

At S3816, the display control 34 of the second information providing apparatus 30c refers to the transitional change table of FIG. 37A to determine whether display of the first menu 401 is changed according to the value of display control flag.

In this example, as illustrated in FIG. 38B, the second information providing apparatus 30c receives the display control flag "SHARED_ANOTHER", while the "start sharing" button is being displayed. In such case, at S3816, the display control 34 does not change display of the first menu 401 such that the first menu 401 continuously displays the "start sharing" button, for example, as illustrated in FIG. 39D.

Figure 39D:
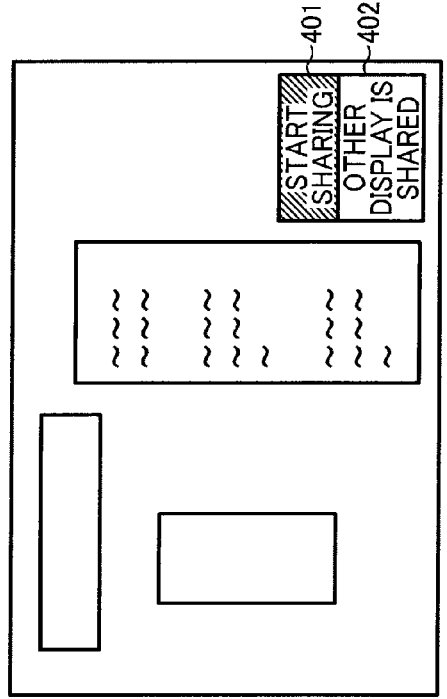

At S3817, the display control 34 causes the second menu 402 to display the message "The other display is shared", according to the display control flag "SHARED_AN-OTHER", for example, as illustrated in FIG. 39D.

The screen of FIG. 39D is displayed when the second terminal 3110ca displays the display data received from the first information providing apparatus 30a via the first terminal 3110aa. The first menu 401 displays therein the "start sharing" button. The second menu 402 displays therein the message "The other display is shared".

As described above, when the user instructs to share the display data being displayed at the first information providing apparatus 30a via the first terminal 3110aa, the first information providing apparatus 30a changes the "start sharing" button to the "end sharing" button, and changes the message "Not shared" to the "This display is shared". The second information providing apparatus 30ca starts receiving the display data from the first information providing apparatus 30a via the first terminal 3110aa. The second information providing apparatus 30ca continues to display the "start sharing" button, but changes the message "Not shared" to the "The other display is shared". The user at each site is able to start sharing the display data at its own site by selecting the first menu 401. The user is able to instantly recognize whether the display data at its own site is being shared by the other terminals 3110, by looking at the shared state information being displayed in the second menu 402.

Referring now to FIG. 40, operation of switching the display data to be shared is explained according to an example embodiment of the present invention. In this example, it is assumed that the user at the second information providing apparatus 30c instructs the second terminal 3110ca to share the display data being displayed on the display 306, when the display data received from the first information providing apparatus 30a is being shared as described above referring to FIG. 38. More specifically, the display 130 of the first terminal 3110aa and the display 130 of the second terminal 3110ca each display the screen of FIG. 13. The first information providing apparatus 30a displays the screen of FIG. 39C on the display 306. The second information providing apparatus 30c displays the screen of FIG. 39D on the display 306.

FIG. 40 is a data sequence diagram illustrating operation of controlling display of a screen at the terminal 3110 and a screen at the information providing apparatus 30, performed by the transmission system of FIG. 31, according to an example embodiment of the present invention.

S4001, S4002, S4003, and S4011 are performed in a substantially similar manner as described above referring to S3801, S3802, S3803, and S3811 of FIG. 38, except that the second information providing apparatus 30c requests the second terminal 3110ca to start sharing the display data.

When the first terminal 3110aa receives the "distribution start from another event", at S4012, the display control 17 of the first terminal 3110aa determines whether to request the relay device 40 to stop distribution of the display data received from the first information providing apparatus 30a.

Since the shared flag value "SHARED" is set for the first terminal 3110aa, at S4013, the display control 17 requests the relay device 40 to stop distribution of the display data received from the first information providing apparatus 30a. The relay device 40 stops transmission of the display data. In this example, since the relay device 40 receives the distribution start request from the second terminal 3110ca at substantially the same time, the relay device 40 does not generate the "distribution end event", even through the distribution end request is received from the first terminal 3110aa.

At S4014, the display control 17 of the first terminal 3110aa requests the first information providing apparatus 30a to stop transmission of the display data, in response to the "distribution start from another event". In this manner, the display data to be shared is limited to the display data received from one site. In alternative to sending the distribution end request, the first terminal 3110aa may send the display control flag "SHARED_ANOTHER" to the first information providing apparatus 30a to request for the change in state of sharing the display data.

At S4015, the display data communicator 36 of the first information providing apparatus 30a stops transmission of the display data.

At S4016, the location data selector 3125 of the first terminal 3110aa refers to the event flag table 3124 to set the shared flag value to "SHARED", according to the "distribution start from another event".

At S4017, the location data selector 3125 of the first terminal 3110aa selects the location data number "2" in the location data management table 3123 using the shared flag "SHARED", and instructs the display control 17 to assign the captured image data and the display data to respective display areas of the screen to be displayed.

At S4018, the display control 17 of the first terminal 3110aa refers to the event flag table 3124 to set the display control flag to "SHARED_ANOTHER" according to the "distribution start from another event", and sends notice including the display control flag "SHARED_ANOTHER" to the first information providing apparatus 30a.

At S4019, the display control 34 of the first information providing apparatus 30a refers to the transitional change table of FIG. 37A to determine whether display of the first menu 401 is changed according to the value of display control flag.

In this example, the first information providing apparatus 30*a* receives the "SHARED_ANOTHER", while the "stop sharing" button is being displayed. In such case, at S4020, the display control 34 changes display of the first menu 401 such that the "start sharing" button is displayed.

At S4021, the display control 34 causes the second menu 402 to display the message "The other display is shared", according to the display control flag "SHARED_ANOTHER", for example, as illustrated in FIG. 39D.

When the second terminal 3110*ca* receives the distribution stat event at S4004, at S4005, the second terminal 3110*ca* refers to the event flag table 3124 to set the shared flag value to "SHARED".

At S4006, the location data selector 3125 of the second terminal 3110*ca* selects the location data number "2" in the location data management table 3123 using the shared flag "SHARED", and instructs the display control 17 to assign the captured image data and the display data to respective display areas of the screen to be displayed. In this example, although the location data selector 3125 selects the location data number "2" at S3814 of FIG. 38, the location data selector 3125 selects the location data number "2", again, according to the shared flag value "SHARED".

At S4007, the display control 17 of the second terminal 3110*ca* refers to the event flag table 3124 to set the display control flag to "SHARED" according to the "distribution start event", and sends notice including the display control flag "SHARED" to the second information providing apparatus 30*c*.

At S4008, the display control 34 of the second information providing apparatus 30*c* refers to the transitional change table of FIG. 37A to determine whether display of the first menu 401 is changed according to the value of display control flag.

In this example, as illustrated in FIG. 39D, the second information providing apparatus 30*c* receives the display control flag "SHARED", while the "start sharing" button is being displayed. In such case, at S4009, the display control 34 changes display of the first menu 401 such that the first menu 401 displays the "stop sharing" button, for example, as illustrated in FIG. 39C.

At S4010, the display control 34 causes the second menu 402 to display the message "This display is shared", according to the display control flag "SHARED", for example, as illustrated in FIG. 39C.

As described above, when the operation of FIG. 40 is completed, the display 306 of the first information providing apparatus 30*a* displays the screen of FIG. 39D, and the display 306 of the second information providing apparatus 30*c* displays the screen of FIG. 39C. At the first information providing apparatus 30*a*, the menu 401 changes the "stop sharing" button to the "start sharing" button, and the menu 402 changes the message "This display is shared" to the message "The other display is shared". At the second information providing apparatus 30*c*, the menu 401 changes the "start sharing" button to the "stop sharing" button, and the menu 402 changes the message "The other display is shared" to the message "This display is shared".

As described above referring to S4014, the first information providing apparatus 30*a*, which is transmitting the display data to be shared, stops transmission of the display data in response to the "distribution start from another event" that is received from the relay device 40. Accordingly, the display data received from one site is shared at a time.

Figure 41:
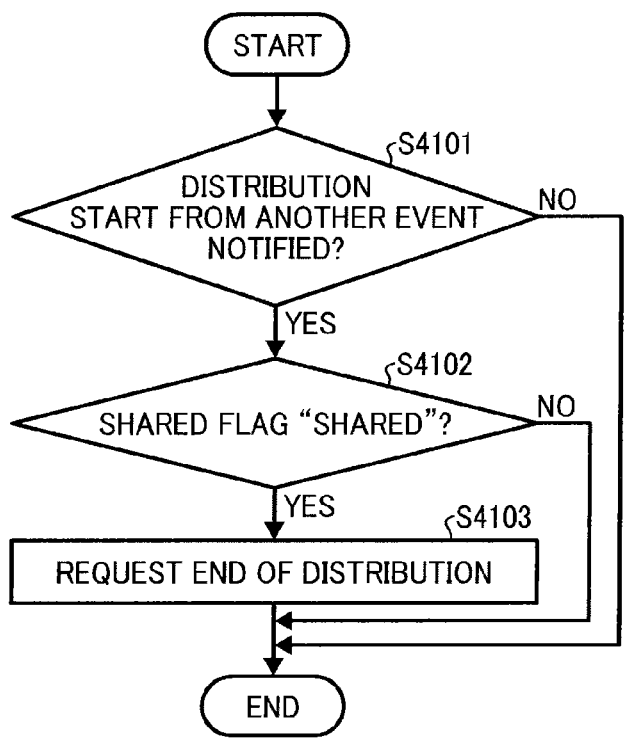
FIG. 41 is a flowchart illustrating operation of determining whether to send a distribution end request to the relay device, performed by the terminal of FIG. 31.

Referring now to FIG. 41, operation of determining whether to request the relay device 40 to stop distribution of the display data, performed by the terminal 3110 when the "distribution start from another event" is received from the relay device 40, is explained according to an example embodiment of the present invention. The operation of FIG. 41 may be performed at S3812 of FIG. 38, or at S4012 of FIG. 40.

At S4101, the display control 17 of the terminal 3110 determines whether the "distribution start from another event" is received at the terminal 3110. When it is determined that the "distribution start from another event" is received ("YES" at S4101), the operation proceeds to S4102. When it is determined that the "distribution start from another event" is not received ("NO" at S4101), the operation ends.

At S4102, the display control 17 determines whether the shared flag is set to "SHARED". When the shared flag "SHARED" is set, the display data of the information providing apparatus 30 connected to the terminal 3110 or to the other terminal 3110, which is received from the relay device 40, is being distributed among the terminals 10. In order to respond to the "distribution start from another event", the terminal 3110 has to change the state of sharing the display data.

When it is determined that the shared flag value is set to "SHARED" ("YES" at S4102), the operation proceeds to S4103. At S4103, the display control 17 requests the relay device 40 to stop transmission of the display data. In response to the distribution end request, the relay device 40 stops transmission of the display data to the terminal 3110 that sends the distribution end request, and the operation ends.

In the above-described example case of S3812 (FIG. 38), the display control 17 determines that there is no need to send the distribution end request, as the value of shared flag is "UNSHARED". In the above-described example case of S4012 (FIG. 40), the display control 17 determines to send the distribution end request, based on the shared flag "SHARED".

Figure 42:
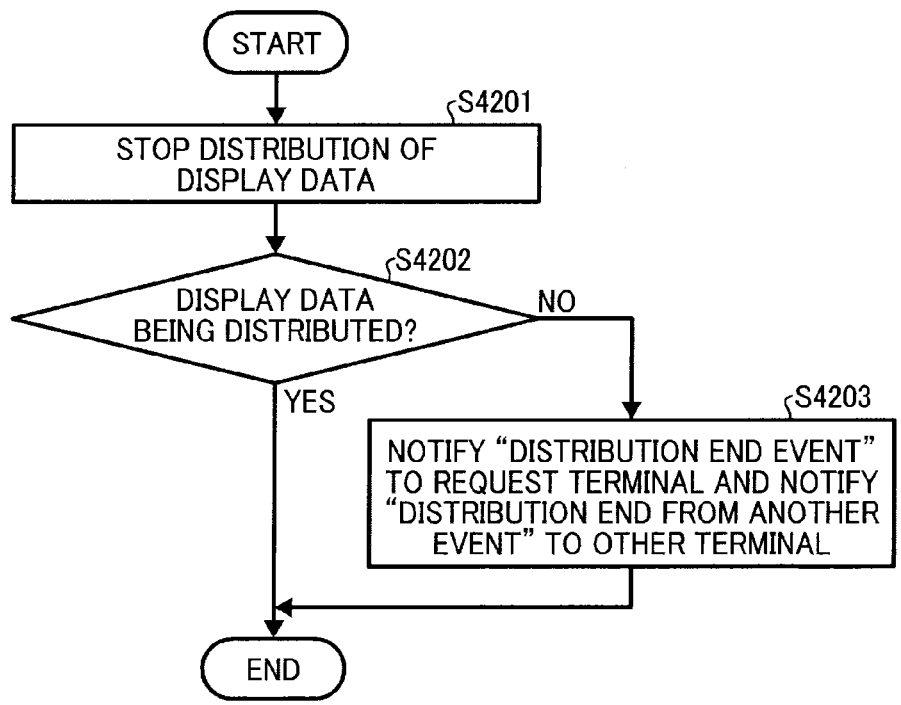
FIG. 42 is a flowchart illustrating operation of determining whether to send a distribution end event or a distribution end from another event to the terminal, performed by the relay device of FIG. 31, according to an example embodiment of the present invention.

Referring now to FIG. 42, operation of determining whether to transmit the "distribution end event" or the "distribution end from another event" to the terminal 3110, performed by the relay device 42 when the distribution end request is received from the terminal 3110, according to an example embodiment of the present invention. With the event reflecting the updated status, each terminal 3110 is able to change the value of display flag or the value of display control flag. The operation of FIG. 42 may be performed at S4013 of FIG. 40.

At S4201, the relay device 40 stops distribution of the display data according to the distribution end request received from the terminal 3110.

At S4202, the relay device 40 determines whether the display data is still being transmitted to one or more terminals 3110 other than the terminal 3110 that sends the distribution end request. More specifically, the relay device 40 determines whether the display data, which is received from the terminal 3110, is transmitted to the other terminals 3110.

When it is determined that the display data is still being transmitted to the other terminals 3110 ("YES" at S4202), the relay device 40 determines that distribution of the display data needs to be completed, and the operation ends without sending the "distribution end event".

When it is determined that the display data is not transmitted to the other terminals 3110 ("NO" at S4202), the relay device 40 determines that the distribution of the display data is completed, and the operation proceeds to S4203.

At S4203, the relay device 40 sends notice including the "distribution end event" to the terminal 3110 that sends the distribution end request, and notice including the "distribution end from another event" to the other communicating terminals 3110. With the "distribution end event" or the "distribution end from another event", the terminal 3110 is able to update the value of display flag and the value of display control flag.

As described above, when the display data is still being transmitted, the terminal 3110 continuously display the display data while displaying the menu based on the "SHARED" shared flag. When the display data is not transmitted, the terminal 3110 changes the shared flag value to "UNSHARED" to change display of the menu based on the "UNSHARED" shared flag.

Referring now to FIG. 43, operation of stopping transmission of the display data received from the second information providing apparatus 30*c* via the second terminal 3110*ca*, performed by the transmission system of FIG. 31, is explained according to an example embodiment of the present invention. In this example, it is assumed that the user at the second information providing apparatus 30*c* instructs the second terminal 3110*ca* to stop sharing the display data being displayed on the display 306, when the display data received from the second information providing apparatus 30*c* is being shared as described above referring to FIG. 40.

At S4301, the operation input 33 of the second information providing apparatus 30*c* receives a user instruction for selecting the "stop sharing" button of the first menu 401, which is displayed on the display 306.

At S4302, the display data communicator 36 sends notice indicating the user instruction for stopping transmission of the display data, to the second terminal 3110*ca*.

At S4303, the display control 17 of the second terminal 3110*ca* requests the relay device 40 to stop transmitting the display data received from the second information providing apparatus 30*c*. The relay device 40 determines whether to send notice including the "distribution end event" to each of the communicating terminals 3110 as described above referring to FIG. 42.

At S4304, the relay device 40 sends notice including the "distribution end event" to the second terminal 3110*ca*. At S4313 (S4203 of FIG. 42), the relay device 40 sends notice including the "distribution end from another event" to the first terminal 3110*aa*.

When the "distribution end event" is received, at S4305, the display control 17 of the second terminal 3110*ca* requests the second information providing apparatus 30*c* to stop transmission of the display data.

At S4306, the display data communicator 36 stops transmission of the display data. Alternatively, the display data communicator 36 of the second information providing apparatus 30*c* may stop transmission of the display data at S4302, right after the user instruction for stopping sharing of the display data is received at S4301.

At S4307, the display control 17 of the second terminal 3110*ca* refers to the event flag table 3124 of FIG. 36 to set the shared flag value to "UNSHARED".

At S4308, the location data selector 3125 of the second terminal 3110*ca* selects the location data number "1" in the location data management table 3123, which is associated with the shared flag value "UNSHARED". The display control 17 assigns the captured image data to respective display areas of a screen to be displayed, as illustrated in FIG. 12.

At S4309, the display control 17 of the second terminal 3110*ca* refers to the event flag table 3124 to set the display control flag to "UNSHARED" according to the "distribution end event", and sends notice including the display control flag "UNSHARED" to the second information providing apparatus 30*c*.

At S4310, the display control 34 of the second information providing apparatus 30*c* refers to the transitional change table of FIG. 37A to determine whether display of the first menu 401 is changed according to the value of display control flag.

In this example, the second information providing apparatus 30*c* receives the display control flag "UNSHARED", while the "stop sharing" button is being displayed. In such case, at S4311, the display control 34 changes display of the first menu 401 such that the first menu 401 displays the "start sharing" button.

At S4312, the display control 34 causes the second menu 402 to display the message "Not shared", according to the display control flag "UNSHARED".

S4314 to S4316 are performed in a substantially similar manner as described above referring to S4307 to S4309.

When the "distribution end from another event" is received, at S4314, the display control 17 of the first terminal 3110*aa* refers to the event flag table 3124 of FIG. 36 to set the event flag value to "UNSHARED" based on the "distribution end from another event". Since the display data is not transmitted, the relay device 40 does not have to request the first terminal 3110*aa* to stop transmission of the display data.

At S4315, the location data selector 3125 of the first terminal 3110*aa* selects the location data number "1" in the location data management table 3123, which is associated with the shared flag value "UNSHARED". The display control 17 assigns the captured image data to respective display areas of a screen to be displayed, as illustrated in FIG. 12.

At S4316, the display control 17 of the first terminal 3110*aa* refers to the event flag table 3124 to set the display control flag to "UNSHARED" according to the "distribution end from another event", and sends notice including the display control flag "UNSHARED" to the first information providing apparatus 30*a*.

At S4317, the display control 34 of the first information providing apparatus 30*a* refers to the transitional change table of FIG. 37A to determine whether display of the first menu 401 is changed according to the value of display control flag.

In this example, the first information providing apparatus 30*a* receives the display control flag "UNSHARED", while the "start sharing" button is being displayed. In such case, the display control 34 continues to display the "start sharing" button.

At S4318, the display control 34 causes the second menu 402 to display the message "Not shared", according to the display control flag "UNSHARED".

As described above, when the operation of FIG. 42 is completed, the displays 306 of the first information providing apparatus 30*a* and the second information providing apparatus 30*c* each display the screen of FIG. 39B. At the first information providing apparatus 30*a*, the menu 401 continues to display the "start sharing" button, but the menu 402 changes the message "The other display is shared" to the message "Not shared". At the second information providing apparatus 30*c*, the menu 401 changes the "stop sharing" to the "start sharing", and the menu 402 changes the message "This display is shared" to the message "Not shared".

The management system 50 and the program providing system 90 may be each implemented by a single computer. Alternatively, any number of parts, functions, or modules of the management system 50 and the program providing system 90 may be classified into a desired number of groups to be carried out by a plurality of computers. In case the program providing system 70 is implemented by the single computer, the program to be provided by the program providing system 70 may be transmitted, one module by one module, after dividing into a plurality of modules, or may be transmitted at once. In case the program providing system 90 is implemented as a plurality of computers, each computer may transmit each module that is stored in its memory, after the program is divided into a plurality of modules.

Further, in this example, the terminal 10 may be communicated in various ways. For example, at least two different terminals 10 that are located at different rooms in the same office, or at least two different terminals 10 that are located at different offices that are remotely located from one another, may communicate with one another. In another example, at least two different terminals 10 that are located in the same room may communicate with one another. In another example, one terminal 10 that is located indoor and another terminal 10 that is located outdoor, or at least two different terminals 10 that are both located outdoor, may communicate with one another. When the terminal 10 is located outdoor, the terminal 10 communicates with the other terminal 10 through a wireless network such as a wireless network designed for a mobile phone.

Further, in the above-described examples, the transmissions system 1 is implemented as a videoconference system for use at offices. Other examples of use of the transmission system 1 include, but not limited to, meetings, casual conversation among family members or friends, and distribution of information in one direction.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus.

In one example, the present invention may reside in an information providing apparatus including: a memory; communicating means for sending an instruction to an image forming apparatus to cause the image forming apparatus to form an image to generate image data and transmit the image data to the information providing apparatus; storing means for storing the received image data in a predetermined memory area of the memory; and controlling means for generating management information indicating an association between identification information identifying the image data and the memory area to which the image data is stored, the management information being stored in the memory. The communicating means transmits the image data stored in the memory area to a transmission terminal to cause the transmission terminal to share the image data with the counterpart transmission terminal.

Accordingly, the image data formed by the image forming apparatus can be easily shared among the transmission terminals.

For example, the memory corresponds to the memory 38 (FIG. 5), which may be implemented by any desired memory such as the ROM 302, RAM 303, HD 304, or the recording medium 310. The communicating means corresponds to the NFC transmit/receive 31. The storing means corresponds to the memory control 37 and the memory 38, which may be implemented by a reading device such as the HD 304 or the medium drive 311 that may operate in cooperation with any desired memory. The controlling means corresponds to the file controller 39, which may be implemented by the CPU 301.

In another example, the management information includes, for each of one or more files of the image data stored in the memory, identification information for identifying a specific file of the image data and information indicating the predetermined memory area to which the specific file of the image data is stored. The information providing apparatus further includes means for displaying a list of the identification information of the one or more files of the image data to the user for selection by the user, based on the management information.

The communicating means transmits the image data specified by the identification information being displayed and selected by the user to the transmission terminal.

The communicating means includes first communicating means and second communicating means. The first communicating means establishes first communication with the image forming apparatus based on first communication standards as the information providing apparatus is brought into close proximity to the image forming apparatus, and receives first connection settings information from the image forming apparatus. The second communicating means establishes second communication with the image forming apparatus based on second communication standards using the first connection settings information. The second communication provides a communication range that is wider than a communication range of the first communication. The second communicating means receives the image data from the image forming apparatus based on the second communication standards.

The first communicating means establishes the first communication with the transmission terminal based on the first communication standards as the information providing apparatus is brought into close proximity to the transmission terminal or the transmission terminal is brought into close proximity to the information providing apparatus, and receives second connection settings information from the transmission terminal. The second communicating means establishes the second communication with the transmission terminal based on the second communication standards using the second connection settings information, and transmits the image data to the transmission terminal based on the second communication standards.

For example, the first communication may be near field communication or non-contact IC communication, such as the NFC communication based on the NFC communication standards. The second communication may be wireless communication such as the Bluetooth communication based on the Bluetooth communication standards. The first communicating means corresponds to the NFC transmit/receive 31, which may be implemented by the first communication interface 312. The second communicating means corresponds to the Bluetooth transmit/receive 32, which may be implemented by the second communication interface 313.

In one example, the present invention may reside in a transmission system including an image forming apparatus, an information providing apparatus, and a transmission terminal. The image forming apparatus forms an image to generate image data according to an instruction received from the information providing apparatus, and sends the image data to the information providing apparatus. The information providing apparatus includes: a memory; communicating means for sending the instruction to the image forming apparatus; storing means for storing the received image data in a predetermined memory area of the memory; and controlling means for generating management information indicating an association between identification information identifying the image data and the memory area to which the image data is stored, the management information being stored in the memory. The communicating means transmits the image data stored in the memory area to a transmission terminal. The transmission terminal receives the image data from the information providing apparatus, and distributes the image data to the counterpart transmission terminal as data to be shared.

In one example, the present invention may reside in a method, performed by an information providing apparatus, the method including: sending an instruction to an image forming apparatus to cause the image forming apparatus to form an image to generate image data and transmit the image data to the information providing apparatus; storing the received image data in a predetermined memory area of a memory; generating management information indicating an association between identification information identifying the image data and the memory area to which the image data is stored, the management information being stored in the memory; and transmitting the image data stored in the memory area to a transmission terminal as data to be shared with the counterpart transmission terminal.

In one example, the present invention may reside in a non-transitory recording medium storing a plurality of instructions which, when executed by a processor, cause the processor to perform a method including: sending an instruction to an image forming apparatus to cause the image forming apparatus to form an image to generate image data and transmit the image data to the information providing apparatus; storing the received image data in a predetermined memory area of a memory; generating management information indicating an association between identification information identifying the image data and the memory area to which the image data is stored, the management information being stored in the memory; and transmitting the image data stored in the memory area to a transmission terminal as data to be shared with the counterpart transmission terminal.

What is claimed is:

1. An information providing apparatus capable of communicating with an external image forming apparatus and an external transmission terminal which performs video communication with one or more counterpart transmission terminals, the information providing apparatus, comprising:
    one or more communication interfaces that send an image forming instruction to the image forming apparatus to cause the image forming apparatus to form an image to generate image data, the image data being transmitted to the information providing apparatus;
    a memory that stores the image data received from the image forming apparatus;
    a display configured to display the image data received from the image forming apparatus; and
    circuitry configured to execute a process in conjunction with the transmission terminal after the information providing apparatus establishes a connection with the transmission terminal via the one or more communication interfaces, the process including obtaining the image data when it is displayed on the display and transmitting the displayed image data to the transmission terminal via the one or more communication interfaces while the transmission terminal is performing video communication with the one or more counterpart transmission terminals, as data to be distributed to the one or more counterpart transmission terminals during the video communication, such that the transmission terminal is already performing the video communication with the one or more counterpart transmission terminals prior to the one or more communication interfaces transmitting the image data to the transmission terminal, and when the one or more communication interfaces transmit the image data to the transmission terminal the transmission terminal is caused to display the image data as part of the ongoing video communication with the one or more counterpart transmission terminals.

2. The information providing apparatus of claim 1, further comprising:
    the circuitry being configured to control storage of identification information that uniquely identifies the image data and information indicating a memory area to which the image data is stored in association with each other to generate management information in the memory and that uses the management information to specify the image data to be transmitted to the transmission terminal; and the display is configured to display a selection screen, which lists, for one or more files of the image data stored in the memory, at least a part of the identification information each identifying a specific file of the one or more files of the image data, the at least a part of the identification information being displayed in a manner selectable by the user, wherein when the circuitry detects a user input selecting the at least a part of the identification information identifying a specific file of the image data, the circuitry obtains the information indicating the memory area to which the specific file of the image data is stored, using the management information stored in the memory.

3. The information providing apparatus of claim 2, wherein the one or more communication interfaces further obtain the specific file of the image data from the memory area of the memory that is specified by the obtained information indicating the memory area, and transmit the specific file of the displayed image data to the transmission terminal as the data to be distributed to one or more counterpart transmission terminals during the video communication.

4. The information providing apparatus of claim 3, wherein the one or more communication interfaces include:
   a first communication interface that establishes first communication with the image forming apparatus based on first communication standards when the information providing apparatus is brought into close proximity to the image forming apparatus, and receives first connection settings information from the image forming apparatus; and
   a second communication interface that establishes second communication with the image forming apparatus based on second communication standards using the first connection settings information, and receives the image data from the image forming apparatus based on the second communication standards, the second communication providing a communication range that is wider than a communication range of the first communication.

5. The information providing apparatus of claim 4, wherein the first communication interface establishes the first communication with the transmission terminal based on the first communication standards when one of the information providing apparatus or the transmission terminal is brought into close proximity to the other one of the information providing apparatus or the transmission terminal, and receives second connection settings information from the transmission terminal; and
   the second communication interface establishes the second communication with the transmission terminal based on the second communication standards using the second connection settings information, and transmits the image data to the transmission terminal based on the second communication standards.

6. The information providing apparatus of claim 5, wherein the first communication standards include near field communication (NFC) standards, and the second communication standards include wireless communication standards.

7. The information providing apparatus of claim 5, wherein the image forming instruction includes an instruction that requests the image forming apparatus to scan an original image into scanned image data and transmit the scanned image data to the information providing apparatus.

8. The information providing apparatus of claim 6, wherein, the display further displays a navigation screen, which requests the user to enter a file name to be assigned with the image data, the file name being used as the identification information of the image data.

9. A transmission system, comprising:
   an image forming apparatus to form an image to generate image data; and
   an information providing apparatus capable of communicating with the image forming apparatus and a transmission terminal, both of which are external to the information providing apparatus, the information providing apparatus including:
      one or more communication interfaces that send an image forming instruction to the image forming apparatus to cause the image forming apparatus to form an image to generate image data, the image data being transmitted to the information providing apparatus;
      a memory that stores the image data received from the image forming apparatus, and
   circuitry configured to execute a process in conjunction with the transmission terminal after the information providing apparatus establishes a connection with the transmission terminal via the one or more communication interfaces, the process including obtaining the image data when it is displayed on the display and transmitting the displayed image data to the transmission terminal via the one or more communication interfaces while the transmission terminal is performing video communication with one or more counterpart transmission terminals, as data to be distributed to the one or more counterpart transmission terminals during the video communication, such that the transmission terminal is already performing the video communication with the one or more counterpart transmission terminals prior to the one or more communication interfaces transmitting the image data to the transmission terminal, and when the one or more communication interfaces transmit the image data to the transmission terminal the transmission terminal is caused to display the image data as part of the ongoing video communication with the one or more counterpart transmission terminals.

10. The transmission system of claim 9, further comprising:
   the transmission terminal to receive the image data from the information providing apparatus, and to distribute the image data to the one or more counterpart transmission terminals as data to be shared during the video communication.

11. A non-transitory recording medium storing a plurality of instructions which, when executed by an information providing apparatus capable of communicating with the image forming apparatus and a transmission terminal, cause the information providing apparatus to perform a method comprising:
   sending an image forming instruction to the image forming apparatus to cause the image forming apparatus to form an image to generate image data, the image data being transmitted to the information providing apparatus;
   storing the image data received from the image forming apparatus in a memory,
   displaying the image data received from the image forming apparatus; and
   executing a process in conjunction with the transmission terminal after the information providing apparatus establishes a connection with the transmission terminal via one or more communication interfaces, the process including obtaining the image data when it is displayed on the display and transmitting the displayed image data to the transmission terminal via the one or more communication interfaces while the transmission terminal is performing video communication with one or more counterpart transmission terminals, as data to be distributed to the one or more counterpart transmission terminals during the video communication, such that the transmission terminal is already performing the video communication with the one or more counterpart transmission terminals prior to the transmitting of the image data to the transmission terminal, and when the information providing apparatus transmits the image data to the transmission terminal the transmission terminal is caused to display the image data as part of the ongoing video communication with the one or more counterpart transmission terminals.

12. The information providing apparatus of claim 6, wherein
the second communication standards include Bluetooth or 802.11 standards.

13. The information providing apparatus of claim 1, further comprising:
the circuitry being configured to control storage of identification information that uniquely identifies the image data and information indicating a memory area to which the image data is stored in association with each other to generate management information in the memory and that uses the management information to specify the image data to be transmitted to the transmission terminal.

14. The information providing apparatus of claim 1, wherein after the information providing apparatus establishes the connection with the transmission terminal via the one or more communication interfaces, the circuitry is configured to mount a memory of the transmission terminal and obtain a program stored at the transmission terminal to execute the process for obtaining the image data when it is displayed on the display and transmitting the displayed image data to the transmission terminal via the one or more communication interfaces.

15. The information providing apparatus of claim 1, wherein the one or more communication interfaces are wireless communication interfaces.

16. The information providing apparatus of claim 1, wherein the process includes displaying an input reception area on the display of the information providing apparatus in conjunction with displaying the image data, and when the information providing apparatus detects a user input at the input reception area, the process begins transmitting the displayed image data to the transmission terminal via the one or more communication interfaces.

17. An information providing apparatus capable of communicating with an external image forming apparatus and an external transmission terminal which performs video communication with one or more counterpart transmission terminals, the information providing apparatus, comprising:
one or more wireless communication interfaces that send an image forming instruction to the image forming apparatus to cause the image forming apparatus to form an image to generate image data, the image data being transmitted to the information providing apparatus;
a memory that stores the image data received from the image forming apparatus;
a display configured to display the image data received from the image forming apparatus; and
circuitry configured to transmit the displayed image data to the transmission terminal via the one or more wireless communication interfaces while the transmission terminal is performing video communication with the one or more counterpart transmission terminals, as data to be distributed to the one or more counterpart transmission terminals during the video communication, such that the transmission terminal is already performing the video communication with the one or more counterpart transmission terminals prior to the one or more communication interfaces transmitting the image data to the transmission terminal, and when the one or more communication interfaces transmit the image data to the transmission terminal the transmission terminal is caused to display the image data as part of the ongoing video communication with the one or more counterpart transmission terminals.

* * * * *